(12) United States Patent
Tanikella et al.

(10) Patent No.: US 12,064,850 B2
(45) Date of Patent: Aug. 20, 2024

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Brahmanandam V. Tanikella, Northborough, MA (US); Charles J. Gasdaska, Shrewsbury, MA (US)

(73) Assignees: SAINT-GOBAIN ABRASIVES, INC., Worcester, MA (US); SAINT-GOBAIN ABRASIFS, Conflans-sainte-Honorine (FR)

( * ) Notice: Subject to any disclaimer, the term of this patent is extended or adjusted under 35 U.S.C. 154(b) by 0 days.

(21) Appl. No.: 18/148,503

(22) Filed: Dec. 30, 2022

(65) Prior Publication Data
US 2023/0211469 A1  Jul. 6, 2023

Related U.S. Application Data

(60) Provisional application No. 63/266,279, filed on Dec. 30, 2021.

(51) Int. Cl.
*B24D 11/02* (2006.01)

(52) U.S. Cl.
CPC ................... *B24D 11/02* (2013.01)

(58) Field of Classification Search
CPC .......... B24D 11/02; B24D 18/0045; B24D 18/0054; B24D 18/009; B33Y 10/00; B33Y 80/00; B33Y 30/00
See application file for complete search history.

(56) References Cited

U.S. PATENT DOCUMENTS

| | | | |
|---|---|---|---|
| 2,242,877 | A | 5/1941 | Albertson |
| RE22,457 | E | 3/1944 | Jeppson et al. |
| 2,367,404 | A | 1/1945 | Kott |
| 3,023,551 | A | 3/1962 | Osenberg |
| 3,123,948 | A | 3/1964 | Kistler et al. |
| 3,258,817 | A | 7/1966 | Smiley |
| 3,594,141 | A | 7/1971 | Houston et al. |

(Continued)

FOREIGN PATENT DOCUMENTS

| | | |
|---|---|---|
| AU | 613584 B2 | 8/1991 |
| CN | 1147783 A | 4/1997 |

(Continued)

OTHER PUBLICATIONS

International Search Report and Written Opinion for PCT/US2022/082606, mailed May 9, 2023, 9 pages.

(Continued)

*Primary Examiner* — Joel D Crandall
(74) *Attorney, Agent, or Firm* — Abel Schillinger, LLP; Arpan Ghosh

(57) ABSTRACT

A method for forming an abrasive article via an additive manufacturing technique including forming a layer of powder material comprising a precursor bond material and abrasive particles, compacting at least a portion of the layer to form a compacted layer, binding at least a portion of the compacted layer and repeating the steps of forming, compacting and binding to form a green body abrasive article.

20 Claims, 18 Drawing Sheets

(56) References Cited

U.S. PATENT DOCUMENTS

| | | |
|---|---|---|
| 3,609,925 A | 10/1971 | Comella-Riera |
| 3,650,714 A | 3/1972 | Farkas |
| 3,871,840 A | 3/1975 | Wilder et al. |
| 4,128,971 A | 12/1978 | Dunnington et al. |
| 4,211,294 A | 7/1980 | Multakh |
| 4,274,769 A | 6/1981 | Multakh |
| 4,314,827 A | 2/1982 | Leitheiser et al. |
| 4,483,108 A | 11/1984 | Howard |
| 4,552,231 A | 11/1985 | Pay et al. |
| 4,574,003 A | 3/1986 | Gerk |
| 4,623,364 A | 11/1986 | Cottringer et al. |
| 4,661,126 A | 4/1987 | Inagami et al. |
| 4,744,802 A | 5/1988 | Schwabel |
| 4,770,671 A | 9/1988 | Monroe et al. |
| 4,881,951 A | 11/1989 | Wood et al. |
| 4,918,872 A | 4/1990 | Sato et al. |
| 4,923,512 A | 5/1990 | Timm et al. |
| 4,960,441 A | 10/1990 | Pellow et al. |
| 5,011,508 A | 4/1991 | Wald et al. |
| 5,067,969 A | 11/1991 | Matsuda |
| 5,090,968 A | 2/1992 | Pellow |
| 5,092,920 A | 3/1992 | Nakai et al. |
| 5,123,217 A | 6/1992 | Ishikawa et al. |
| 5,139,978 A | 8/1992 | Wood |
| 5,178,644 A | 1/1993 | Huzinec |
| 5,178,849 A | 1/1993 | Bauer |
| 5,201,916 A | 4/1993 | Berg et al. |
| 5,204,055 A | 4/1993 | Sachs et al. |
| 5,227,104 A | 7/1993 | Bauer |
| 5,252,264 A | 10/1993 | Forderhase et al. |
| 5,282,875 A | 2/1994 | Wood et al. |
| 5,354,155 A | 10/1994 | Adams |
| 5,366,523 A | 11/1994 | Rowenhorst et al. |
| 5,387,380 A | 2/1995 | Cima et al. |
| 5,429,647 A | 7/1995 | Larmie |
| 5,441,710 A | 8/1995 | Marois |
| 5,449,388 A | 9/1995 | Wiand |
| 5,490,882 A | 2/1996 | Sachs et al. |
| 5,498,269 A | 3/1996 | Larmie |
| 5,518,443 A | 5/1996 | Fisher |
| 5,547,479 A | 8/1996 | Conwell et al. |
| 5,551,963 A | 9/1996 | Larmie |
| 5,618,762 A | 4/1997 | Shirakawa et al. |
| 5,660,621 A | 8/1997 | Bredt |
| 5,725,162 A | 3/1998 | Garg et al. |
| 5,766,277 A | 6/1998 | DeVoe et al. |
| 5,776,214 A | 7/1998 | Wood |
| 5,868,125 A | 2/1999 | Maoujoud |
| 5,874,050 A | 2/1999 | Matias |
| 5,891,206 A | 4/1999 | Ellingson |
| 5,900,207 A | 5/1999 | Danforth et al. |
| 5,942,015 A | 8/1999 | Culler et al. |
| 5,976,205 A | 11/1999 | Andrews et al. |
| 5,996,571 A | 12/1999 | Jedick |
| 6,123,744 A | 9/2000 | Huzinec |
| 6,146,567 A | 11/2000 | Sachs et al. |
| 6,192,875 B1 | 2/2001 | Koroku et al. |
| 6,209,420 B1 | 4/2001 | Butcher et al. |
| 6,354,362 B1 | 3/2002 | Smith et al. |
| 6,376,590 B2 | 4/2002 | Kolb et al. |
| 6,403,002 B1 | 6/2002 | van der Geest |
| 6,413,286 B1 | 7/2002 | Swei et al. |
| 6,416,560 B1 | 7/2002 | Palmgren |
| 6,511,265 B1 | 1/2003 | Mirchandani et al. |
| 6,551,366 B1 | 4/2003 | D'Souza et al. |
| 6,593,391 B2 | 7/2003 | Teutsch et al. |
| 6,645,412 B2 | 11/2003 | Priedeman, Jr. |
| 6,767,499 B1 | 7/2004 | Hory et al. |
| 6,814,926 B2 | 11/2004 | Geving et al. |
| 6,858,050 B2 | 2/2005 | Palmgren |
| 7,015,268 B2 | 3/2006 | Manwiller et al. |
| 7,125,490 B2 | 10/2006 | Clendenning et al. |
| 7,311,752 B2 | 12/2007 | Tepper et al. |
| 7,332,140 B2 | 2/2008 | Matias |
| 7,497,977 B2 | 3/2009 | Nielsen et al. |
| 7,524,345 B2 | 4/2009 | Nevoret et al. |
| 7,867,302 B2 | 1/2011 | Nevoret et al. |
| 7,875,091 B2 | 1/2011 | Nevorct et al. |
| 7,883,563 B2 | 2/2011 | Kawata et al. |
| 7,887,608 B2 | 2/2011 | Schwabel et al. |
| 7,946,907 B2 | 5/2011 | Heyen |
| 8,109,177 B2 | 2/2012 | Kembaiyan |
| 8,252,087 B2 | 8/2012 | Burba, III et al. |
| 8,308,830 B2 | 11/2012 | Egan et al. |
| 8,486,490 B2 | 7/2013 | Fuwa et al. |
| 8,568,205 B2 | 10/2013 | Gosamo et al. |
| 8,597,088 B2 | 12/2013 | Hoang et al. |
| 8,668,859 B2 | 3/2014 | Pettis |
| 8,715,381 B2 | 5/2014 | Ramanath et al. |
| 8,870,571 B2 | 10/2014 | Lowder et al. |
| 8,991,211 B1 | 3/2015 | Arlotti et al. |
| 9,144,237 B2 | 9/2015 | Sakurada et al. |
| 9,156,999 B2 | 10/2015 | Ng et al. |
| 9,388,898 B2 | 7/2016 | Tokumo |
| 9,456,884 B2 | 10/2016 | Uckelmann et al. |
| 9,545,669 B2 | 1/2017 | Åklint et al. |
| 9,597,730 B2 | 3/2017 | Mironets et al. |
| 9,731,982 B2 | 8/2017 | Adams |
| 9,776,304 B2 | 10/2017 | Schulze |
| 9,783,718 B2 | 10/2017 | Stevenson et al. |
| 9,815,029 B2 | 11/2017 | Zhong et al. |
| 10,016,852 B2 | 7/2018 | Broda |
| 10,052,742 B2 | 8/2018 | Fukazawa et al. |
| 10,183,329 B2 | 1/2019 | Gunther |
| 10,188,975 B2 | 1/2019 | Fu et al. |
| 10,189,211 B2 | 1/2019 | Volk et al. |
| 10,328,372 B2 | 6/2019 | Mazumder et al. |
| 10,399,201 B2 | 9/2019 | Ganapathiappan et al. |
| 10,682,702 B2 | 6/2020 | Haro Gonzalez et al. |
| 10,723,041 B2 | 7/2020 | Wang |
| 10,882,160 B2 | 1/2021 | Redfield et al. |
| 10,888,973 B2 | 1/2021 | Franke et al. |
| 11,203,162 B2 | 12/2021 | Wighton et al. |
| 11,577,458 B2 | 2/2023 | Rifaut et al. |
| 2002/0095875 A1 | 7/2002 | D'Evelyn et al. |
| 2003/0150442 A1 | 8/2003 | Boland et al. |
| 2004/0226405 A1 | 11/2004 | Geving et al. |
| 2004/0244540 A1 | 12/2004 | Oldham et al. |
| 2004/0248770 A1 | 12/2004 | Grau et al. |
| 2006/0059785 A1 | 3/2006 | Sung |
| 2006/0162967 A1 | 7/2006 | Brackin et al. |
| 2006/0185255 A1 | 8/2006 | Nevoret et al. |
| 2006/0185256 A1 | 8/2006 | Nevoret et al. |
| 2006/0185257 A1 | 8/2006 | Nevoret et al. |
| 2006/0208388 A1 | 9/2006 | Bredt et al. |
| 2006/0231293 A1 | 10/2006 | Ladi et al. |
| 2007/0020457 A1 | 1/2007 | Adefris |
| 2007/0241482 A1 | 10/2007 | Giller et al. |
| 2008/0085660 A1 | 4/2008 | Orlhac |
| 2008/0182017 A1 | 7/2008 | Singh et al. |
| 2008/0187769 A1 | 8/2008 | Huzinec et al. |
| 2010/0035530 A1 | 2/2010 | Gosamo et al. |
| 2010/0193254 A1 | 8/2010 | Lind et al. |
| 2010/0193255 A1 | 8/2010 | Stevens et al. |
| 2010/0255254 A1 | 10/2010 | Culler et al. |
| 2010/0320005 A1 | 12/2010 | Burhan et al. |
| 2011/0243675 A1 | 10/2011 | Fach |
| 2011/0293918 A1 | 12/2011 | Lucas et al. |
| 2012/0298425 A1 | 11/2012 | Cuillier De Maindreville et al. |
| 2013/0052453 A1 | 2/2013 | Filou et al. |
| 2013/0168071 A1 | 7/2013 | Hugelier et al. |
| 2013/0240479 A1 | 9/2013 | Moriya et al. |
| 2013/0277891 A1 | 10/2013 | Teulet |
| 2013/0280994 A1 | 10/2013 | Kang |
| 2013/0283700 A1 | 10/2013 | Bajaj et al. |
| 2013/0316149 A1 | 11/2013 | Atkins et al. |
| 2014/0069023 A1 | 3/2014 | Hoang et al. |
| 2014/0163717 A1 | 6/2014 | Das et al. |
| 2014/0255198 A1 | 9/2014 | El-Wardany et al. |
| 2014/0262541 A1 | 9/2014 | Parsana et al. |
| 2015/0008046 A1 | 1/2015 | Cuillier De Maindreville et al. |
| 2015/0029071 A1 | 1/2015 | Hwang et al. |
| 2015/0069649 A1 | 3/2015 | Bai et al. |
| 2015/0089881 A1 | 4/2015 | Stevenson et al. |

(56) References Cited

U.S. PATENT DOCUMENTS

| | | |
|---|---|---|
| 2015/0126099 A1 | 5/2015 | Krishnan et al. |
| 2015/0183089 A1 | 7/2015 | Iyengar |
| 2015/0259986 A1 | 9/2015 | Stockey |
| 2015/0290771 A1 | 10/2015 | Li |
| 2015/0306664 A1 | 10/2015 | Åklint et al. |
| 2015/0330154 A1 | 11/2015 | Pearce et al. |
| 2015/0360289 A1 | 12/2015 | Liou et al. |
| 2015/0375368 A1 | 12/2015 | Gosamo |
| 2016/0010469 A1 | 1/2016 | Guo |
| 2016/0038866 A1 | 2/2016 | Gibson et al. |
| 2016/0159699 A1 | 6/2016 | Lazur |
| 2016/0184972 A1 | 6/2016 | Serebrennikov et al. |
| 2016/0221122 A1 | 8/2016 | D'Orlando et al. |
| 2016/0271757 A1 | 9/2016 | Kanyanta et al. |
| 2016/0289520 A1 | 10/2016 | Bujnowski et al. |
| 2016/0332236 A1 | 11/2016 | Stoyanov |
| 2017/0050241 A1 | 2/2017 | Thomas et al. |
| 2017/0057011 A1 | 3/2017 | Hyatt et al. |
| 2017/0066873 A1 | 3/2017 | Gardet |
| 2017/0072469 A1 | 3/2017 | Maderud et al. |
| 2017/0136540 A1 | 5/2017 | Dods |
| 2017/0144242 A1 | 5/2017 | McQueen et al. |
| 2017/0216915 A1 | 8/2017 | Holcomb et al. |
| 2017/0291372 A1 | 10/2017 | Milshtein et al. |
| 2017/0297106 A1 | 10/2017 | Myerberg et al. |
| 2018/0001548 A1 | 1/2018 | Dietrich et al. |
| 2018/0104793 A1 | 4/2018 | Franke et al. |
| 2018/0117793 A1 | 5/2018 | Wang |
| 2018/0126515 A1 | 5/2018 | Franke et al. |
| 2018/0133803 A1 | 5/2018 | Karuppoor |
| 2018/0178348 A1 | 6/2018 | Xiao et al. |
| 2018/0178351 A1 | 6/2018 | Lindvall et al. |
| 2018/0214988 A1 | 8/2018 | Alves |
| 2018/0237329 A1 | 8/2018 | Drewnowski et al. |
| 2018/0305266 A1 | 10/2018 | Gibson et al. |
| 2018/0333781 A1 | 11/2018 | Ederer et al. |
| 2019/0022826 A1 | 1/2019 | Franke et al. |
| 2019/0047214 A1 | 2/2019 | Franke et al. |
| 2019/0112422 A1* | 4/2019 | Tallia ............ B33Y 70/10 |
| 2019/0168305 A1* | 6/2019 | Boyle ............ B33Y 50/00 |
| 2019/0185351 A1 | 6/2019 | Huang et al. |
| 2019/0243339 A1 | 8/2019 | Katogi et al. |
| 2020/0001429 A1 | 1/2020 | Rapaka et al. |
| 2020/0070311 A1 | 3/2020 | Smithson et al. |
| 2020/0079028 A1 | 3/2020 | Miller et al. |
| 2020/0101534 A1 | 4/2020 | Gibson |
| 2020/0139507 A1 | 5/2020 | Yamamura et al. |
| 2020/0230695 A1 | 7/2020 | Protzmann et al. |
| 2020/0384694 A1 | 12/2020 | Ceriani |
| 2021/0001452 A1 | 1/2021 | Xiao et al. |
| 2021/0196436 A1 | 7/2021 | Raby et al. |
| 2021/0379836 A1 | 12/2021 | Fadurdo Orellana et al. |
| 2022/0203616 A1 | 6/2022 | Korten et al. |
| 2022/0282144 A1 | 9/2022 | Tanikella et al. |
| 2022/0332651 A1 | 10/2022 | Tanikella et al. |
| 2023/0111065 A1 | 4/2023 | Schumacher et al. |
| 2023/0211463 A1 | 7/2023 | Tanikella et al. |
| 2023/0211469 A1 | 7/2023 | Tanikella et al. |
| 2023/0211471 A1 | 7/2023 | Tanikella et al. |

FOREIGN PATENT DOCUMENTS

| | | |
|---|---|---|
| CN | 1212494 C | 7/2005 |
| CN | 1640596 A | 7/2005 |
| CN | 1962061 A | 5/2007 |
| CN | 102233269 B | 11/2011 |
| CN | 102462996 A | 5/2012 |
| CN | 102658528 A | 9/2012 |
| CN | 102824789 A | 12/2012 |
| CN | 102936141 A | 2/2013 |
| CN | 202777185 U | 3/2013 |
| CN | 103264361 A | 8/2013 |
| CN | 103748309 A | 4/2014 |
| CN | 104014215 A | 9/2014 |
| CN | 104047547 A | 9/2014 |
| CN | 102873401 B | 11/2014 |
| CN | 203944262 U | 11/2014 |
| CN | 203980474 U | 12/2014 |
| CN | 203984693 U | 12/2014 |
| CN | 104259892 B | 1/2015 |
| CN | 104531065 B | 4/2015 |
| CN | 104566665 A | 4/2015 |
| CN | 104908166 A | 9/2015 |
| CN | 104924499 A | 9/2015 |
| CN | 104990154 A | 10/2015 |
| CN | 105563352 A | 5/2016 |
| CN | 105921793 A | 9/2016 |
| CN | 104285281 B | 6/2017 |
| CN | 106926446 A | 7/2017 |
| CN | 106938335 A | 7/2017 |
| CN | 107150154 A | 9/2017 |
| CN | 107206570 A | 9/2017 |
| CN | 107538359 A | 1/2018 |
| CN | 107825305 A | 3/2018 |
| CN | 107838820 A | 3/2018 |
| CN | 107866752 A | 4/2018 |
| CN | 107866753 A | 4/2018 |
| CN | 107900927 A | 4/2018 |
| CN | 107914216 A | 4/2018 |
| CN | 107921471 A | 4/2018 |
| CN | 108081158 A | 5/2018 |
| CN | 207415166 U | 5/2018 |
| CN | 108326764 A | 7/2018 |
| CN | 108620583 A | 10/2018 |
| CN | 109157296 A | 1/2019 |
| CN | 109483418 A | 3/2019 |
| CN | 108620583 B | 4/2021 |
| DE | 3937697 A1 | 5/1991 |
| DE | 19834559 A1 | 2/2000 |
| DE | 19909882 A1 | 9/2000 |
| DE | 102009006189 A1 | 7/2010 |
| DE | 10-2019-219859 A1 | 6/2021 |
| DE | 10-2019-219867 A1 | 6/2021 |
| EP | 0127339 B1 | 3/1988 |
| EP | 1066134 B1 | 5/2002 |
| EP | 1878486 A1 | 1/2008 |
| EP | 3053677 A1 | 8/2016 |
| EP | 1778601 B1 | 9/2017 |
| EP | 3281695 A1 | 2/2018 |
| EP | 2025454 B1 | 4/2018 |
| EP | 3307483 B1 | 6/2020 |
| JP | H02237759 A | 9/1990 |
| JP | H04372366 A | 12/1992 |
| JP | H05046404 U | 6/1993 |
| JP | H0691536 A | 4/1994 |
| JP | H0811051 A | 1/1996 |
| JP | H09309108 A | 12/1997 |
| JP | 2982661 B2 | 11/1999 |
| JP | H11322408 A | 11/1999 |
| JP | 3086103 B2 | 9/2000 |
| JP | 2005199619 A | 7/2005 |
| JP | 2006187848 A | 7/2006 |
| JP | 2008119312 A | 5/2008 |
| JP | 2008-302454 A | 12/2008 |
| JP | 2010527888 A | 8/2010 |
| JP | 2014000155 A | 1/2014 |
| JP | 2014-221499 A | 11/2014 |
| JP | 2014529523 A | 11/2014 |
| JP | 2016049579 A | 4/2016 |
| JP | 5996195 B2 | 9/2016 |
| JP | 6010834 B2 | 10/2016 |
| JP | 2017-154411 A | 9/2017 |
| JP | 6643643 B2 | 2/2020 |
| KR | 10-0578045 B1 | 5/2006 |
| KR | 20070108378 A * | 11/2007 |
| KR | 10-1062801 B1 | 9/2011 |
| KR | 20150117723 A | 10/2015 |
| KR | 101760271 B1 | 7/2017 |
| KR | 10-2323009 B1 | 11/2021 |
| MX | 2011001443 A | 4/2011 |
| WO | 93-25336 A1 | 12/1993 |
| WO | 94-02562 A1 | 2/1994 |
| WO | 96-33638 A1 | 10/1996 |
| WO | 98-56566 A1 | 12/1998 |

(56) References Cited

FOREIGN PATENT DOCUMENTS

| | | |
|---|---|---|
| WO | 99-15293 A1 | 4/1999 |
| WO | 99-48646 A1 | 9/1999 |
| WO | 01-72502 A1 | 10/2001 |
| WO | 2003026714 A1 | 4/2003 |
| WO | 2003092748 A1 | 11/2003 |
| WO | 03-106148 A1 | 12/2003 |
| WO | 2004-110719 A2 | 12/2004 |
| WO | 2005075000 A1 | 8/2005 |
| WO | 2007026387 A2 | 3/2007 |
| WO | 2009009558 A1 | 1/2009 |
| WO | 2010016959 A2 | 2/2010 |
| WO | 2013-026972 A1 | 2/2013 |
| WO | 2014-140689 A1 | 9/2014 |
| WO | 2014137890 A1 | 9/2014 |
| WO | 2014-165390 A1 | 10/2014 |
| WO | 2014161816 A2 | 10/2014 |
| WO | 2015-069849 A1 | 5/2015 |
| WO | 2015069849 A1 | 5/2015 |
| WO | 2016022449 A1 | 2/2016 |
| WO | 2016032883 A1 | 3/2016 |
| WO | 2016-058091 A1 | 4/2016 |
| WO | 2016123505 A1 | 8/2016 |
| WO | 2016-192140 A1 | 12/2016 |
| WO | 2016-209696 A1 | 12/2016 |
| WO | 2016-210057 A1 | 12/2016 |
| WO | 2016209696 A1 | 12/2016 |
| WO | 2017-007999 A1 | 1/2017 |
| WO | 2017034951 A1 | 3/2017 |
| WO | 2017-137482 A1 | 8/2017 |
| WO | 2017127887 A1 | 8/2017 |
| WO | 2017-173009 A1 | 10/2017 |
| WO | 2017214179 A1 | 12/2017 |
| WO | 2018010730 A2 | 1/2018 |
| WO | 2018-080778 A1 | 5/2018 |
| WO | 2019210111 | 10/2019 |
| WO | 2019230214 A1 | 12/2019 |
| WO | 2020012501 A1 | 1/2020 |
| WO | 2020102025 A1 | 5/2020 |
| WO | 2020-128779 A2 | 6/2020 |
| WO | 2020128779 A2 | 6/2020 |
| WO | 2020220143 A1 | 11/2020 |
| WO | 2021-001730 A1 | 1/2021 |
| WO | 2021-009673 A1 | 1/2021 |
| WO | 2021-038438 A1 | 3/2021 |
| WO | 2021-038465 A1 | 3/2021 |
| WO | 2021076986 A1 | 4/2021 |
| WO | 2021-116859 A1 | 6/2021 |
| WO | 2021119290 A1 | 6/2021 |
| WO | 2021119319 A1 | 6/2021 |
| WO | 2021156730 A1 | 8/2021 |
| WO | 2021221918 A1 | 11/2021 |
| WO | 2022006201 A1 | 1/2022 |
| WO | 2022-107038 A1 | 5/2022 |
| WO | 2022090904 A1 | 5/2022 |
| WO | 2022187721 A1 | 9/2022 |
| WO | 2023130059 A1 | 7/2023 |
| WO | 2023130082 A1 | 7/2023 |
| WO | 2023130088 A1 | 7/2023 |

OTHER PUBLICATIONS

Cao, S., et al., "Investigation on urea-formaldehyde resin as an in-powder adhesivefor the fabrication of Al2O3/borosilicate-glass composite parts bythree dimensional printing (3DP)", Journal of Materials Processing Technology 217 (2015) pp. 241-252.

Melcher, R., et al., "Fabrication of Al2O3-based composites by indirect 3D-printing", Materials Letters 60 (2006) pp. 572-575.

Seleznev, Maxim, et al., "Novel Near-Net-Shape Tool-Less Method for Manufacturing Cast Metal Matrix Composites: Three-Dimensional Printing of Ceramic Preforms Combined with Investment Casting Technology", SAE Transactions, vol. 109, Section 5: Journal of Materials & Manufacturing (2000), pp. 235-242.

Winkel, Alexander, et al., "Sintering of 3D-Printed Glass/Hap Composites", Journal of the American Ceramic Society, vol. 95, No. 11, Nov. 2012, pp. 3387-3393.

Zhang, Wei, et al., "Three-Dimensional Printing of Complex-Shaped Alumina/Glass Composites", Advanced Engineering Materials 2009, 11, No. 12, pp. 1038-1043.

Spierings, Adriaan Bernardus, et al., "Processing of metal-diamond-composites using selective laser melting", Rapid Prototyping Journal, vol. 21, No. 2, 2015, pp. 130-136.

Zocca, Andrea, et al., "Additive Manufacturing of Ceramics: Issues, Potentialities, and Opportunities", Journal of the American Ceramic Society, Jul. 2015, vol. 98, No. 7, pp. 1983-2001.

Guo, Nannan, et al., "Additive Manufacturing: technology, applications and research needs," Front. Mech. Eng., 2013, 8(3), pp. 215-243.

Yin, Xiaowei, et al., "Three-Dimensional Printing of Nanolaminated Ti3AlC2 Toughened TiAl3—Al2O3 Composites," Journal of the American Ceramic Society, Jul. 2007, vol. 90, No. 7, pp. 2128-2134.

Rosso, M., "Ceramic and metal matrix composites: route and properties", Polytechnic of Turin, Dep. Of Material Science and Chemical Engineering, 12th International Scientific Conference: Achievements in Mechanical and Materials Engineering, 16 pages.

Bak, David, "Rapid prototyping or rapid production? 3D printing processes move industry towards the latter", Assembly Automation, 2003, vol. 23, No. 4, pp. 340-345.

Search Results, Mar. 4, 2021, 14 pages.

3M Technology, "3D Printed Abrasives", YouTube Video, Uploaded Jun. 4, 2019, 1 page. <https://www.youtube.com/watch?v=TtYte1l-BsM>.

"New Infographic: How It Works . . . Software-Driven 3D Post-Printing with AUTOMAT3D™", Jun. 20, 2018, 5 pages.

AmericaMakes, "Success Story: Hybrid Direct Manufacturing: Integrating Additive and Subtractive Methods—Improving Productivity by Integrating Automatic Finishing with Direct Metal Additive Manufacturing," 2017, 2 pages.

Kumbhar_N.N. et al., "Post Processing Methods used to Improve Surface Finish of Products which are Manufactured by Additive Manufacturing Technologies: A Review", J. Inst. Eng. India Ser. C (Aug. 2018) 99(4):481-487, 7 pages.

International Search Report from PCT Application No. PCT/US2019/029239 dated Sep. 11, 2019, 5 pages.

International Search Report from PCT Application No. PCT/US2020/056111 dated Feb. 10, 2021, 5 pages.

International Search Report from PCT Application No. PCT/US2020/064322 dated Mar. 16, 2021, 5 pages.

International Search Report for PCT/US2021/028910 dated Aug. 5, 2021, 4 pages.

International Search Report for PCT/US2022/019047 dated Jun. 17, 2022, 5 pages.

International Search Report for PCT/US2022/019046 dated Jun. 17, 2022, 4 pages.

Beyer, Dr. Peter, "Exploring the New Dimensions of 3D Abrasives Technology," The Meister Toolbox, Jul. 7, 2016, 2 pages.

Lewis, Jennifer A., et al., "Direct Ink Writing of Three-Dimensional Ceramic Structures," J. Am. Ceram. Soc., 89 [12] 3599-3609, 2006, 11 pages.

Cabala et al., "Silver nanoparticle surface functionalized alumina filters for disinfection of potable water," Material Today: Proceedings 2 (2015) 321-330.

Wehling et al. "Silver nanoparticle-doped zirconia capillaries for enhanced bacterial filtration." Material Science and Engineering C 48 (2015) 179-187.

Yang et al., "Development and Characterization of Porous Silver-Incorporated Hydroxyapatite Ceramic for Separation and Elimination of Microorganisms." Published online Wiley InterScience Aug. 29, 2006.

Li et al. "Removal and retention of viral aerosols by a novel alumina nanofiber filter." Aerosol Science 40 (2009) 65-71.

Negus et al., "Simple methods to incroporate silver and copper generate antmicrobial glasses and porous glass-bonded ceramics." ACS bulletin vol. 96, No. 5.

Tepper, et al., "Novel Nanofibre Filter Medium Attracts Waterborne Pathogens," Jul./Aug. 2002, www.filtsep.com, 4 pages.

(56) References Cited

OTHER PUBLICATIONS

Virus Absorbing Air Filter, 21.2, (1991), 521-523.
International Search Report for Application No. PCT/US2020/064282 dated Apr. 8, 2021, 3 pages.
International Search Report & Written Opinion for PCT/US2017/058808, mailed Feb. 19, 2018, 12 pages.
International Search Report for Application No. PCT/US2022/082650 dated May 4, 2023, 4 pages.
International Search Report for Application No. PCT/US2022/082641 dated May 2, 2023, 4 pages.
International Search Report for Application No. PCT/US2022/082606 dated May 9, 2023, 4 pages.
ExOne Binder Jetting Technology, "What is Binder Jetting?", <https://www.exone.com/en-US/case-studies/what-is-binder-jetting>, retrieved Oct. 3, 2019, 2 pages.
Abrasive Technology—Current Development and Applications I, Proceedings of the Third International Conference on Abrasive Technology (ABTEC '99), Brisbane, Australia, Nov. 1999, 556 pages (Abstract).
Beyer, Dr. Peter, "Exploring the New Dimensions of 3D Abrasives Technology," The Meister Toolbox, Jul. 7, 2016, 2 pages, <https://meister-abrasives-toolbox.com/2016/07/07/exploring-the-new-dimensions-of-3d-abrasives-technology/>.
Doremalen, et al., "Aerosol and Surface Stability of SARS-CoV-2 as Compared with SARS-CoV-1", The New England Journal of Medicine, 382;16, Apr. 16, 2020, 4 pages <https://www.nejm.org/doi/full/10.1056/NEJMc2004973>.
Ensoll Tools, "CBN Wire Loops or Diamond Wire Loops is Fit for Metal Cutting?", <http://www.ensolltools.com/en/news/new-88-81.html> Accessed May 12, 2022.
Chaplin, Brian P., "Critical Review of Electrochemical Advanced Oxidation Processes for Water Treatment Applications," Department of Chemical Engineering, University of Illinois at Chicago, Environmental Science: Processes and Impacts, The Royal Society of Chemistry, 2013, 24 pages.
Morawska, Lidia, et al., "Airborne transmission of SARS-CoV-2: The world should face the reality", International Laboratory for Air Quality and Health, Environment International 139 (2020) 105730.
Olsen, Sonja J., et al., "Transmission of the Severe Acute Respiratory Syndrome on Aircraft", The New England Journal of Medicine, 349:25, Dec. 18, 2003.

* cited by examiner

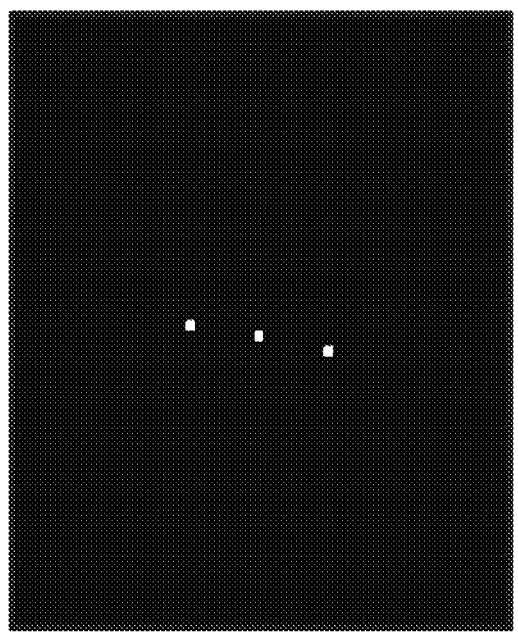
FIG. 4E
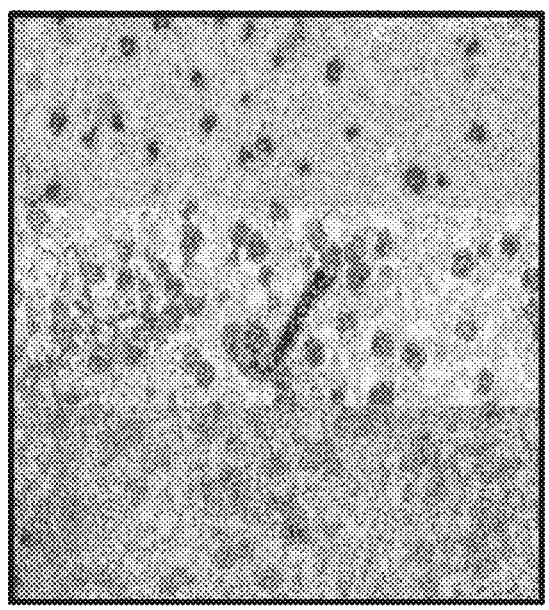 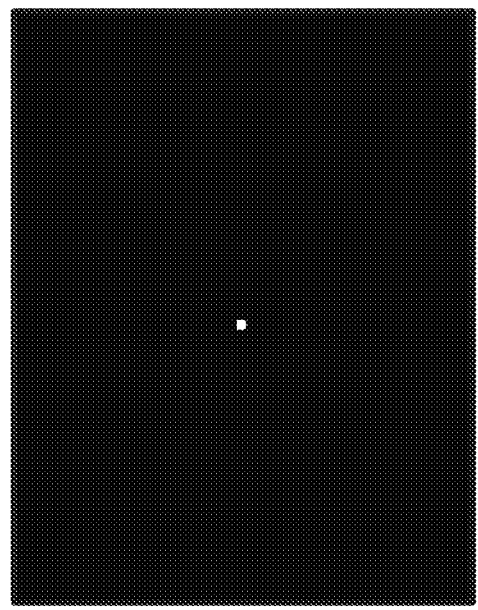
FIG. 5A                    FIG. 5B

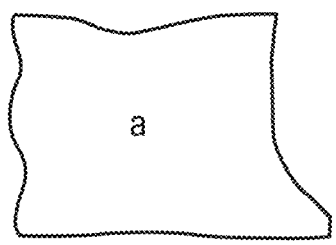 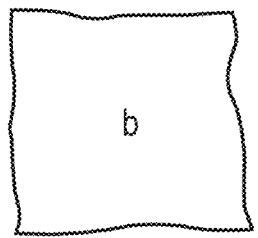 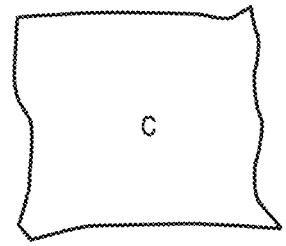
FIG. 7B
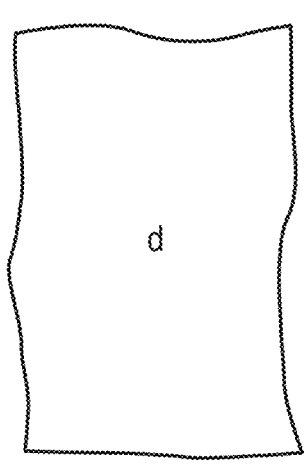 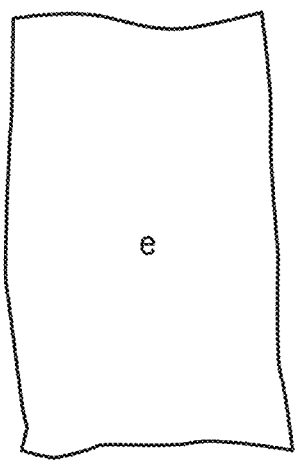 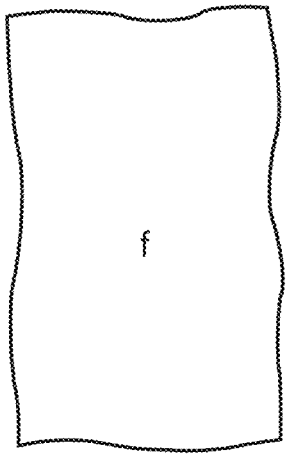
FIG. 7C
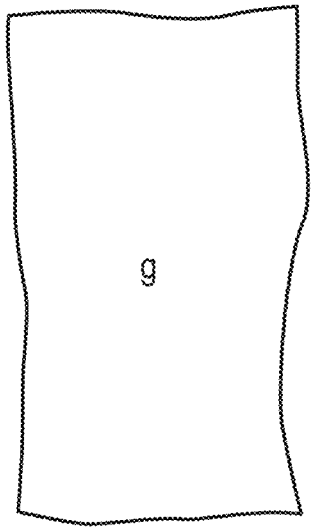 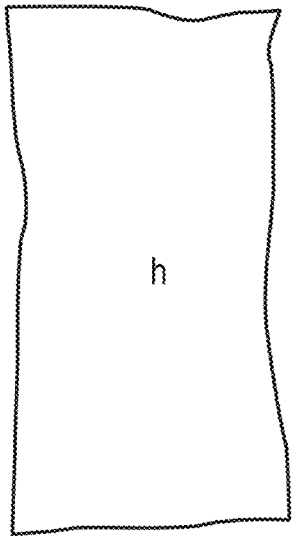 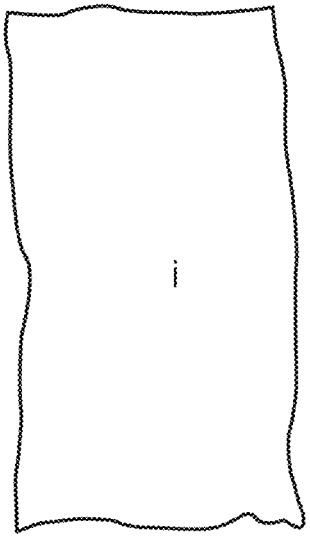
FIG. 7D

ABRASIVE ARTICLES AND METHODS FOR FORMING SAME

CROSS-REFERENCE TO RELATED APPLICATION(S)

This application claims priority under 35 U.S.C. § 119(e) to U.S. Provisional Patent Application No. 63/266,279, filed Dec. 30, 2021, by Brahmanandam V. TANIKELLA et al., entitled "ABRASIVE ARTICLES AND METHODS FOR FORMING SAME," which is assigned to the current assignee hereof and incorporated herein by reference in its entirety for all purposes.

FIELD OF THE DISCLOSURE

The present disclosure relates to forming abrasive articles and aspects of one or more green bodies and/or finally-formed abrasive articles.

BACKGROUND

Abrasive articles are used in material removal operations, such as cutting, grinding, or shaping various materials. Abrasive articles or green bodies of abrasive articles can be formed via additive manufacturing. There is a need to develop improved abrasive articles.

BRIEF DESCRIPTION OF THE DRAWINGS

The present disclosure may be better understood, and its numerous features and advantages made apparent to those skilled in the art by referencing the accompanying drawings.

FIG. 4A-E includes a scanning electron microscopic images of a cross section of a body according to an embodiment.

FIG. 5A-5B include images from a bonded abrasive formed through conventional processing techniques.

FIG. 7B includes three cross-sectional images of cross-sections "a", "b," and "c" along a length of the body according to an embodiment.

FIG. 7C includes three cross-sectional images of cross-sections "d", "e," and "f" along the width of the body according to an embodiment.

FIG. 7D includes three cross-sectional images of cross-sections "g", "h," and "i" along the thickness of the body according to an embodiment.

Figure 1A:
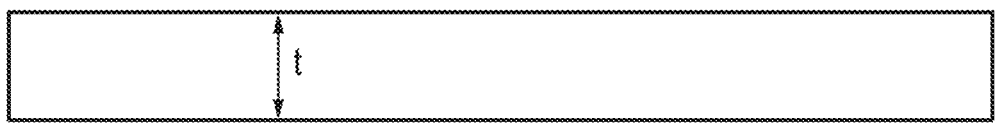
FIG. 1A-D includes an illustration of a process for forming one or more layers of powder material in accordance with an embodiment.

Skilled artisans appreciate that elements in the figures are illustrated for simplicity and clarity and have not necessarily been drawn to scale.

DETAILED DESCRIPTION

The present disclosure may be better understood, and its numerous features and advantages made apparent to those skilled in the art by referencing the accompanying drawings.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to methods for forming abrasive articles and the features of the resulting abrasive articles. While prior disclosures have provided some limited examples of forming abrasive articles via additive manufacturing, such abrasive articles are limited in their size, quantity, and quality. In fact, Applicants of the present disclosure have conducted notable empirical studies and have found that the knowledge necessary to create high quality abrasive articles according to conventional additive manufacturing techniques is noted, specifically in the context of dry powder layering and binding techniques. To-date, disclosures in the prior art are limited to micro-abrasive bodies. This is because formation of large-scale, high-quality abrasive articles via dry powder layering and binding techniques is not easily scalable. Numerous hurdles limit the advance of the technology, including but not limited to, the capability of creating dense parts, dimensional stability during and after forming, and the empirical studies needed to fully understand and appreciate the complexities of the process variables. Such process variables include, but is not limited to, composition of the powder material, flowability of the powder material, a force applied by a compaction object to the layer or a plurality of layers of powder, a traverse speed of a compaction object, average thickness of the layer prior to compaction, a particle size distribution of the powder, number of previously formed layers underlying the layer of powder, the number of compacted layers underlying the layer of powder, the density of any layers underlying the layer of powder, the amount of binder in any layers underlying the layer of powder, the relative dimensions of the layer relative to one or more layers underlying the layer, an average thickness of the layer prior to compaction, a printhead deposition resolution, saturation limits of the binder, composition of the binder material, and others. In one aspect, the additive manufacturing techniques of the embodiments herein may be part of a binder jetting manufacturing process.

FIG. 1A includes an illustration of a portion of the process including forming one or more layers of powder material that can include abrasive particles and may include a mixture of abrasive particles and precursor bond material.

In an embodiment, the layer of powder material can have an average thickness (t) that may facilitate improved manufacturing and/or performance of the abrasive article. In an embodiment, the layer of powder material can have an average thickness (t) of at least 1 micron, such as at least 5 microns or at least 10 microns or at least 15 microns or at least 20 microns or at least 25 microns. In still another embodiment, the layer of powder material can have an average thickness (t) of not greater than 500 microns, such as not greater than 400 microns or not greater than 300 microns or not greater than 200 microns or not greater than 100 microns or not greater than 90 microns or not greater than 80 microns or not greater than 70 microns or not greater than 60 microns or not greater than 50 microns or not greater than 40 microns or not greater than 30 microns or not greater than 20 microns. The average thickness (t) of the layer of powder material may be a value between any of the minimum and maximum values noted above, including for example, but not limited to, within a range of at least 1 microns to not greater than 500 microns or within a range of at least 10 microns to not greater than 300 microns or within a range of at least 25 micron to not greater than 100 microns.

In a particular embodiment, forming one or more layers of powder material can include depositing the powder material from a container via agitation of the powder material in the container, which then flows through a screen in the container, and wherein the powder material drops from the container via gravity into a build box or a previously deposited layer of powder material. In still other embodiments, the method of agitation and the screen size can be selected based upon the particle size distribution of the powder.

In one aspect, the powder material may include a precursor bond material that may facilitate improved manufacturing and/or performance of the abrasive article. For example, in one embodiment, the bond material may include one of an organic material, an inorganic material, a metal, a metal alloy, a ceramic, an oxide, a carbide, a nitride, a boride, an amorphous material, a crystalline material, or any combination thereof. In a particular embodiment, the precursor bond material may be converted chemically or undergo a phase change during processing from a precursor bond material to a bond material of a finally-formed abrasive article. In still another embodiment, the precursor bond material does not necessarily undergo any physical or chemical changes during processing and is present as a bond material in the finally-formed abrasive article.

In one aspect, the powder material may include abrasive particles that may facilitate improved manufacturing and/or performance of the abrasive article. For example, in one embodiment, the abrasive particles can include an oxide, a carbide, a nitride, a boride, a superabrasive, or any combination thereof. In an embodiment, the abrasive particles can include diamond, silica, cubic boron nitride, silicon carbide, boron carbide, alumina, silicon nitride, tungsten carbide, zirconia, or any combination thereof.

In an embodiment, the abrasive particles may include a particle size distribution having an average particle size (D50a) that may facilitate improved manufacturing and/or performance of the abrasive article. As used herein, the D50 value signifies the size value in the distribution, up to and including which, 50% of the total counts of the abrasive particles defining the distribution are 'contained'. For example, in a non-limiting example, if the D50 is 25 microns, 50% of the abrasive particles have a size of 25 microns or smaller. It will be appreciated, the D50 value may also be referred to as the median value of a sample. In one embodiment the average particle size (D50a) of the abrasive particles may be at least 0.025 microns, such as at least 0.05 or at least 0.1 microns or at least at least 0.3 microns or at least 0.4 microns or at least 0.5 microns or at least 0.8 microns or at least 1 micron or at least 1.5 microns or at least 2 microns or at least 3 microns or at least 5 microns or at least 10 microns or at least 50 microns or at least 100 microns or at least 200 microns or at least 300 microns. In still another non-limiting embodiment, the average particle size (D50a) of the abrasive particles may be not greater than 500 microns, such as not greater than 400 microns or not greater than 300 microns or not greater than 200 microns or not greater than 100 microns or not greater than 50 microns or not greater than 10 microns or not greater than 5 microns or not greater than 4 microns or not greater than 3 microns or not greater than 3 micron or not greater than 1 microns. The average particle size (D50a) of the abrasive particles may be a value between any of the minimum and maximum values noted above, including for example, but not limited to, within a range of at least 0.25 microns to not greater than 500 microns or within a range of at least 0.5 microns to not greater than 300 microns or within a range of at least 1 micron to not greater than 10 microns.

In still other embodiments, the abrasive particles include abrasive particles having a Mohs hardness of at least 6 such as at least 7 or at least 8 or at least 9. In still another embodiment, the abrasive particles include abrasive particles having a Mohs hardness of not greater than 30, such as not greater than 25 or not greater than 20 or not greater than 15 or not greater than 10. It will be appreciated the Mohs hardness of the abrasive particles may be a value between any of the minimum and maximum values noted above, including for example, but not limited to, within a range of at least 6 to not greater than 30 or at least 8 and not greater than 20.

Figure 1B:
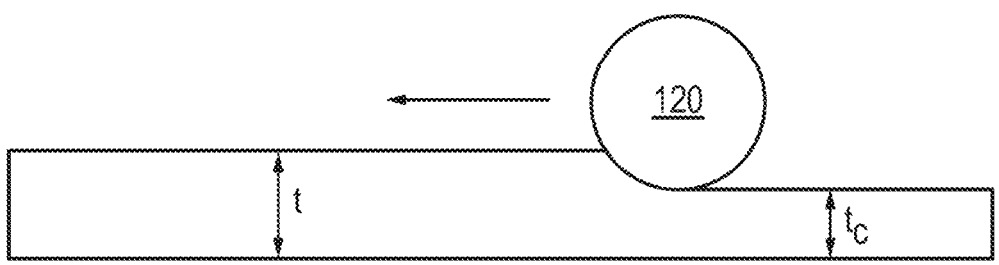

FIG. 1B includes an illustration of a process of compacting at least a portion of the layer with a compaction object (120).

The compaction object 120 can traverse the layer and compact the layer to form a compacted layer having an average thickness (tc). The compacted layer thickness (tc) can be less than the layer thickness (t) prior to compaction.

In an embodiment, the compacted layer may include an average compacted layer thickness that may facilitate improved manufacturing and/or performance of the abrasive article. In one embodiment, the average compacted layer thickness may be at least 0.1 microns such as at least 0.5 microns or at least 0.8 microns or at least 1 micron or at least 2 microns or at least 3 microns or at least 4 microns or at least 5 microns or at least 6 microns or at least 7 microns or at least 8 microns or at least 9 microns or at least 10 microns or at least 11 microns or at least 12 microns or at least 13 microns or at least 14 microns or at least 15 microns or at least 16 microns or at least 17 microns or at least 18 microns or at least 19 microns or at least 20 microns or at least 21 microns or at least 22 microns or at least 23 microns or at least 24 microns or at least 25 microns or at least 26 microns or at least 27 microns or at least 28 microns or at least 29 microns or at least 30 microns or at least 31 microns or at least 32 microns or at least 33 microns or at least 34 microns or at least 35 microns or at least 36 microns or at least 37 microns or at least 38 microns or at least 39 microns or at least 40 microns or at least 41 microns or at least 42 microns or at least 43 microns or at least 44 microns or at least 45 microns or at least 46 microns or at least 47 microns or at least 48 microns or at least 49 microns or at least 50 microns or at least 51 microns or at least 52 microns or at least 53 microns or at least 54 microns or at least 55 microns or at least 56 microns or at least 57 microns or at least 58 microns or at least 59 microns or at least 60 microns or at least 65 microns or at least 70 microns or at least 75 microns or at least 80 microns or at least 85 microns or at least 90 microns or at least 95 microns or at least 100 microns or at least 110 microns or at least 120 microns or at least 130 microns or at least 140 microns or at least 150 microns or at least 160 microns or at least 170 microns or at least 180 microns or at least 190 microns or at least 200 microns or at least 210 microns or at least 220 microns or at least 230 microns or at least 240 microns or at least 250 microns. In still another non-limiting embodiment, the average compacted layer thickness may be not greater than 400 microns such as not greater than 300 microns or not greater than 200 microns or not greater than 100 microns or not greater than 90 microns or not greater than 80 microns or not greater than 70 microns or not greater than 60 microns or not greater than 50 microns or not greater than 40 microns or not greater than 30 microns or not greater than 20 microns or not greater than 15 microns or not greater than 10 microns or not greater than 8 microns or not greater than 5 microns or not greater than 3 microns or not greater than 1 micron or not greater than 0.8 microns. The average compacted layer thickness may be a value between any of the minimum and maximum values noted above, including for example, but not limited to, within a range of at least 0.1 microns to not greater than 400 microns or within a range of at least 1 micron to not greater than 200 microns or within a range of at least 5 microns to not greater than 90 microns.

In an embodiment, compacting may include increasing the density of the compacted layer by at least 2% as compared to the layer prior to compacting such as at least 3% or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% or at least 100% or at least 102% or at least 105% or at least 108% or at least 110% or at least 115% or at least 120% or at least 125% or at least 130% or at least 140% or at least 150%. In still another non-limiting embodiment, compacting may include increasing the density of the compacted layer by not greater than 2000% as compared to the layer prior to compacting such as not greater than 1500% or not greater than 1000% or not greater than 900% or not greater than 800% or not greater than 700% or not greater than 600% or not greater than 500%. Compacting may include increasing the density of the compacted layer by any of the minimum and maximum percentages noted above as compared to the layer prior to compacting, including for example, but not limited to, within a range of at least 2% to not greater than 2000% or within a range of at least 13% to not greater than 1000%.

In an embodiment, compacting may include compacting the layer of powder material by at least 1% to not greater than 95% of the original layer thickness of the layer, such as compaction of at least 2% of the original layer thickness of the layer prior to compaction or at least 3% or at least 4% or at least 5% or at least 6% or at least 7% or at least 8% or at least 9% or at least 10% or at least 11% or at least 12% or at least 13% or at least 14% or at least 15% or at least 16% or at least 17% or at least 18% or at least 19% or at least 20% or at least 21% or at least 22% or at least 23% or at least 24% or at least 25% or at least 26% or at least 27% or at least 28% or at least 29% or at least 30% or at least 31% or at least 32% or at least 33% or at least 34% or at least 35% or at least 36% or at least 37% or at least 38% or at least 39% or at least 40% or at least 41% or at least 42% or at least 43% or at least 44% or at least 45% or at least 46% or at least 47% or at least 48% or at least 49% or at least 50% or at least 51% or at least 52% or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94%. In still another non-limiting embodiment, compacting may include compacting the layer of powder material by at least 1% to not greater than 95% of the original layer thickness of the layer, such as compaction of not greater than 94% of the original layer thickness of the layer prior to compaction or not greater than 93% or not greater than 92% or not greater than 91% or not greater than 90% or not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2%. Compacting may include compacting the layer of powder material by any of the minimum and maximum percentages noted above.

As will be appreciated, in some instances, multiple layers of powder material may be formed and compaction can be completed on more than one layer of powder material simultaneously. In some optional embodiments, a smoothing roller may traverse the surface of the layer of powder, but smoothing rollers do not apply sufficient force to cause compaction, rather they scrape the surface of the layer to remove and smooth any large undulations. In still another embodiment, the smoothing roller is configured to contact the upper surface of the layer sufficiently to spread the powder material and smooth the upper surface after forming the layer.

Figure 1C:
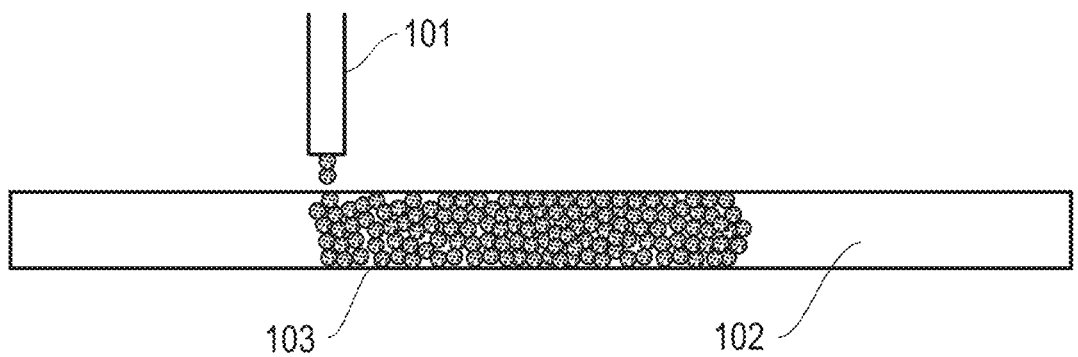

FIG. 1C includes binding at least a portion of the compacted layer of powder material with a binder material. In an embodiment, binding at least a portion of the compacted layer may include the use of a printhead 101 wherein the printhead deposition resolution impacts the amount of binder material selectively deposited. As further depicted, the layer may include a region 102 including loose or unbound powder material without binder material and a region 103 including a region of powder material and binder. In an embodiment, the binder material may include a liquid vehicle and a polymer material wherein the polymer material can be dissolved in the liquid vehicle. In a particular embodiment, the liquid vehicle may include one or more organic solvents, water, or a combination thereof. In still another embodiment, the organic solvents may include at least one of alcohols (e.g., butanol, ethylene glycol monomethyl ether), ketones, ethers, or any combination thereof. In still another embodiment, the alcohol may include as methyl alcohol, ethyl alcohol, n-propyl alcohol, isopropyl alcohol, n-butyl alcohol, sec-butyl alcohol, t-butyl alcohol, and isobutyl alcohol; ketones or ketoalcohols such as acetone, methyl ethyl ketone, and diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylolpropane ethoxylate; lower alkyl ethers such as ethylene glycol methyl or ethyl ether, diethylene glycol ethyl ether, triethylene glycol methyl or ethyl ether, ethylene glycol n-butyl ether, diethylene glycol n-butyl ether, diethylene glycol methyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, and dipropylene glycol dimethyl ether; nitrogen-containing compounds such as 2-pyrrolidinone and N-methyl-2-pyrrolidinone; sulfur-containing compounds such as dimethyl sulfoxide, tetramethylene sulfone, and thioglycol; and combinations of any of the foregoing. In still another embodiment, the polymer may include at least one of polyvinyl pyrrolidones, polyvinyl caprolactams, polyvinyl alcohols, polyacrylamides, poly(2-ethyl-2-oxazoline) (PEOX), polyvinyl butyrate, copolymers of methyl vinyl ether, and maleic anhydride, certain copolymers of acrylic acid and/or hydroxyethyl acrylate, methyl cellulose, natural polymers (e.g., dextrin, guar gum, xanthan gum). In an embodiment, the binder material may include one or more free-radically polymerizable or otherwise radiation-curable materials, including at least one of acrylic monomers and/or oligomers and/or epoxy resins, a photoinitiator, and/or photocatalysts for curing the free-radically polymerizable or otherwise radiation-curable materials. In a particular embodiment, the organic solvents may have a flash point above 100° C. In an aspect, the one or more organic solvents may be configured to control drying speed of the liquid vehicle, to control surface tension of the liquid vehicle, or to allow dissolution of an ingredient (e.g., of a surfactant).

The amount of binder material is sufficient to bind the powder material. The regions that do not include binder material can be loose or unbound powder, which may be removed and captured after processing is completed and used as recycled powder. Notably, at the edges of the region between the bound powder material and unbound powder material, the binder material may exist in some of the loose powder. Accordingly, the recycled powder may include some content of organic material, such as binder material that was included in the captured loose or unbound powder material, particularly at the regions bordering the bound and unbound powder. Methods may be used to treat the loose powder material including organic material to remove a certain content of organic material prior to recycling the powder material and using in one or more subsequent additive manufacturing processes to form abrasive articles.

Figure 1D:
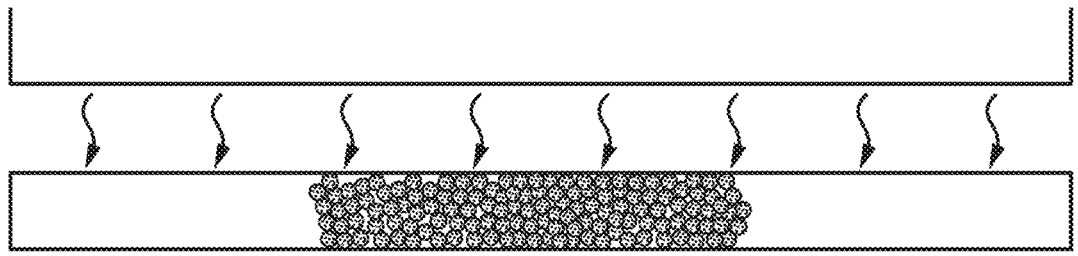

FIG. 1D includes a process for binding the powder material by treating the layer to convert the binder from a liquid material to a solid material to bind the powder material. The process can include curing of at least a portion of the binder material. In a particular embodiment, binding may include evaporation, thermal curing, chemical curing, radiation curing, or any combination thereof.

In an embodiment, forming the green body abrasive article may be conducted at a forming rate that may facilitate improved manufacturing and/or performance of the abrasive article. In an embodiment, forming the green body abrasive article may be conducted at a forming rate of at least 120 cc/hr such as at least 130 cc/hr or at least 150 cc/hr or at least 180 cc/hr or at least 200 cc/hr or at least 300 cc/hr or at least 400 cc/hr or at least 500 cc/hr or at least 600 cc/hr or at least 700 cc/hr or at least 800 cc/hr or at least 900 cc/hr or at least 1000 cc/hr or at least 1200 cc/hr or at least 1400 cc/hr or at least 1600 cc/hr or at least 1800 cc/hr or at least 2000 cc/hr or at least 2200 cc/hr or at least 2400 cc/hr or at least 2600 cc/hr or at least 2800 cc/hr or at least 3000 cc/hr. In still another embodiment, the forming rate may be not greater than 7000 cc/hr such a not greater than 6000 cc/hr or not greater than 5000 cc/hr or not greater than 4000 cc/hr. It will be appreciated the forming rate may be between any of the minimum and maximum values noted above, including for example, but not limited to, within a range of at least 120 cc/hr to not greater than 7000 cc/hr such as within a range of at least 200 cc/hr to not greater than 5000 cc/hr or at least 800 cc/hr to not greater than 3000 cc/hr.

Figure 1E:
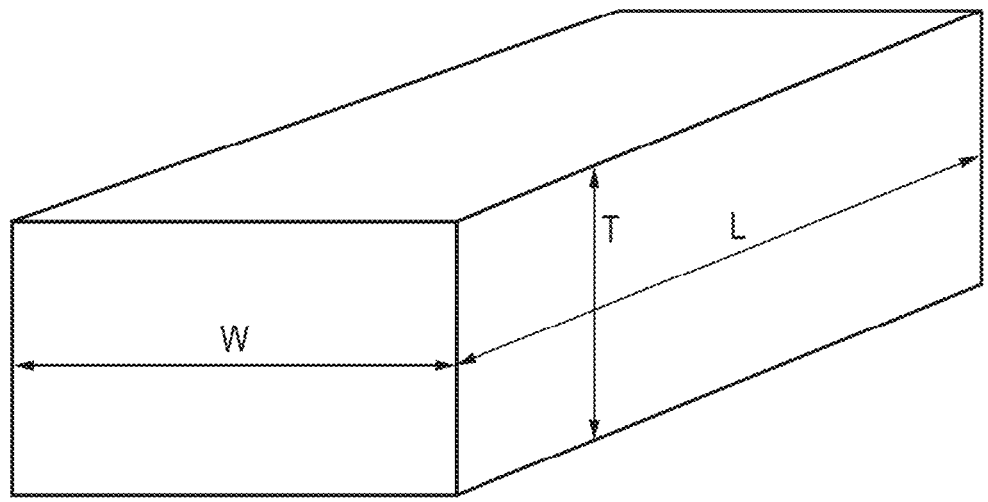
FIG. 1E includes an illustration of an abrasive article in accordance with an embodiment.

FIG. 1E is an illustration of an abrasive article, which may represent a green body, finally-formed abrasive article. It will be appreciated that the abrasive articles of the embodiments herein can have any three-dimensional shape and FIG. 1E is illustrative of only one possible shape. The length (L) defines the longest dimension of the body and the width (W) defines a dimension of the body substantially perpendicular to the length and may be a value less than the length and greater than the thickness (T). The thickness (T) of the body may extend in a direction perpendicular to a plane defined by the length and width. The dimensions of any body of embodiments herein may have a relationship of length, width, and thickness defined as L≥W≥T. In those instances wherein the body is in the form of a cylinder with the axial axis being the longest, the length is the longest dimension in the axial direction, the width can be a first diameter of an end surface, and the thickness can be another diameter. In the case of an abrasive article in the form of a disk, wherein the diameter is the greatest dimension, the diameter defines the length of the body, the width defines a diameter perpendicular to the length (and may be the same as the length, and the thickness defines the dimension of the body in an axial direction perpendicular to the plane of the circular end surface. It will be appreciated reference to a length may be reference to a diameter of a circular shape or surface or reference to a primary axis of an elliptical shape or surface. It will also be appreciated reference to a width may be reference to a diameter of a circular shape or surface that is substantially perpendicular to a diameter defining the length or reference to a lateral (secondary) axis of an elliptical shape or surface that extends substantially perpendicular to the primary axis.

In an embodiment, the green body may include a content of abrasive particles that may facilitate improved manufacturing and/or performance of the abrasive article. In an embodiment, the green body may include at least 1 vol % abrasive particles for a total volume of the green body such as at least 2 vol % or at least 3 vol % or at least 4 vol % or at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % or at least 60 vol % or at least 61 vol % or at least 62 vol % or at least 63 vol % or at least 64 vol % or at least 65 vol % or at least 66 vol % or at least 67 vol % or at least 68 vol % or at least 69 vol % or at least 70 vol % or at least 71 vol % or at least 72 vol % or at least 73 vol % or at least 74 vol % or at least 75 vol % or at least 76 vol % or at least 77 vol % or at least 78 vol % or at least 79 vol % or at least 80 vol %. In still other embodiment, the green body may include not greater than 90 vol % abrasive particles for a total volume of the green body such as not greater than 85 vol % or not greater than 80 vol % or not greater than 75 vol % or not greater than 70 vol % or not greater than 69 vol % or not greater than 68 vol % or not greater than 67 vol % or not greater than 66 vol % or not greater than 65 vol % or not greater than 64 vol % or not greater than 63 vol % or not greater than 62 vol % or not greater than 61 vol % or not greater than 60 vol % or not greater than 59 vol % or not greater than 58 vol % or not greater than 57 vol % or not greater than 56 vol % or not greater than 55 vol % or not greater than 54 vol % or not greater than 53 vol % or not greater than 52 vol % or not greater than 51 vol % or not greater than 50 vol % or not greater than 49 vol % or not greater than 48 vol % or not greater than 47 vol % or not greater than 46 vol % or not greater than 45 vol % or not greater than 44 vol % or not greater than 43 vol % or not greater than 42 vol % or not greater than 41 vol % or not greater than 40 vol % or not greater than 39 vol % or not greater than 38 vol % or not greater than 37 vol % or not greater than 36 vol % or not greater than 35 vol % or not greater than 34 vol % or not greater than 33 vol % or not greater than 32 vol % or not greater than 31 vol % or not greater than 30 vol % or not greater than 29 vol % or not greater than 28 vol % or not greater than 27 vol % or not greater than 26 vol % or not greater than 25 vol % or not greater than 24 vol % or not greater than 23 vol % or not greater than 22 vol % or not greater than 21 vol % or not greater than 20 vol % or not greater than 19 vol % or not greater than 18 vol % or not greater than 17 vol % or not greater than 16 vol % or not greater than 15 vol % or not greater than 14 vol % or not greater than 13 vol % or not greater than 12 vol % or not greater than 11 vol % or not greater than 10 vol % or not greater than 9 vol % or not greater than 8 vol % or not greater than 7 vol % or not greater than 6 vol % or not greater than 5 vol %. It will be appreciated the green body may include a percentage of abrasive particles for a total volume of the green body between any of the minimum and maximum values noted above, including for example, but not limited to, within a range of at least 1 vol % to not greater than 99 vol % abrasive particles for a total volume of the green body such as at least 2 vol % to not greater than 80 vol % or at least 10 vol % to not greater than 75 vol %.

In an embodiment, the green body may include a content of precursor bond material that may facilitate improved manufacturing and/performance of the abrasive article. In an embodiment, the green body may include at least 1 vol % precursor bond material for a total volume of the green body such as at least 2 vol % or at least 3 vol % or at least 4 vol % or at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % or at least 60 vol % or at least 61 vol % or at least 62 vol % or at least 63 vol % or at least 64 vol % or at least 65 vol % or at least 66 vol % or at least 67 vol % or at least 68 vol % or at least 69 vol % or at least 70 vol % or at least 71 vol % or at least 72 vol % or at least 73 vol % or at least 74 vol % or at least 75 vol % or at least 76 vol % or at least 77 vol % or at least 78 vol % or at least 79 vol % or at least 80 vol %. In still other embodiment, the green body may include not greater than 90 vol % precursor bond material for a total volume of the green body such as not greater than 85 vol % or not greater than 80 vol % or not greater than 75 vol % or not greater than 70 vol % or not greater than 69 vol % or not greater than 68 vol % or not greater than 67 vol % or not greater than 66 vol % or not greater than 65 vol % or not greater than 64 vol % or not greater than 63 vol % or not greater than 62 vol % or not greater than 61 vol % or not greater than 60 vol % or not greater than 59 vol % or not greater than 58 vol % or not greater than 57 vol % or not greater than 56 vol % or not greater than 55 vol % or not greater than 54 vol % or not greater than 53 vol % or not greater than 52 vol % or not greater than 51 vol % or not greater than 50 vol % or not greater than 49 vol % or not greater than 48 vol % or not greater than 47 vol % or not greater than 46 vol % or not greater than 45 vol % or not greater than 44 vol % or not greater than 43 vol % or not greater than 42 vol % or not greater than 41 vol % or not greater than 40 vol % or not greater than 39 vol % or not greater than 38 vol % or not greater than 37 vol % or not greater than 36 vol % or not greater than 35 vol % or not greater than 34 vol % or not greater than 33 vol % or not greater than 32 vol % or not greater than 31 vol % or not greater than 30 vol % or not greater than 29 vol % or not greater than 28 vol % or not greater than 27 vol % or not greater than 26 vol % or not greater than 25 vol % or not greater than 24 vol % or not greater than 23 vol % or not greater than 22 vol % or not greater than 21 vol % or not greater than 20 vol % or not greater than 19 vol % or not greater than 18 vol % or not greater than 17 vol % or not greater than 16 vol % or not greater than 15 vol % or not greater than 14 vol % or not greater than 13 vol % or not greater than 12 vol % or not greater than 11 vol % or not greater than 10 vol % or not greater than 9 vol % or not greater than 8 vol % or not greater than 7 vol % or not greater than 6 vol % or not greater than 5 vol %. It will be appreciated the green body may include a percentage of precursor bond material for a total volume of the green body between any of the minimum and maximum values noted above, including for example, but not limited to, within a range of at least 1 vol % to not greater than 99 vol % precursor bond material for a total volume of the green body such as at least 2 vol % to not greater than 80 vol % or at least 10 vol % to not greater than 75 vol %.

Figure 2A:
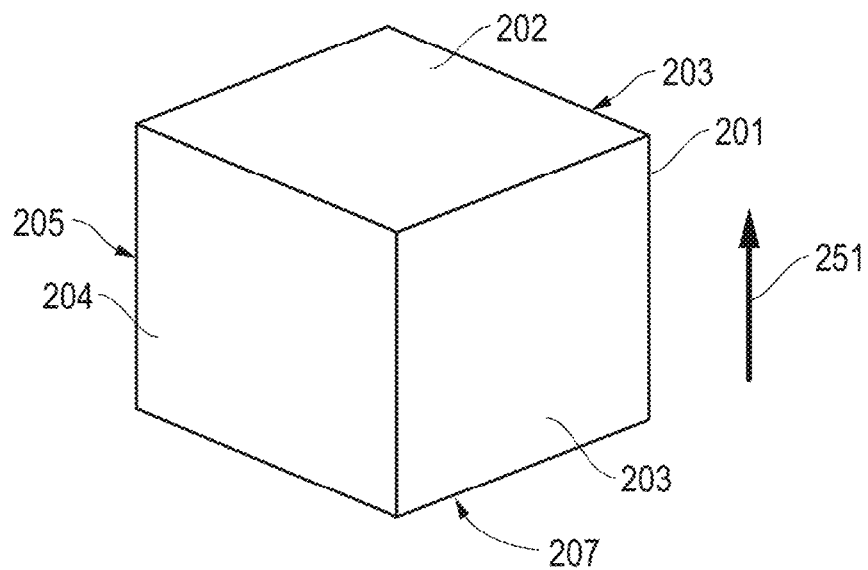
FIG. 2A-2B include perspective view illustrations of abrasive articles in accordance with an embodiment.
Figure 2B:
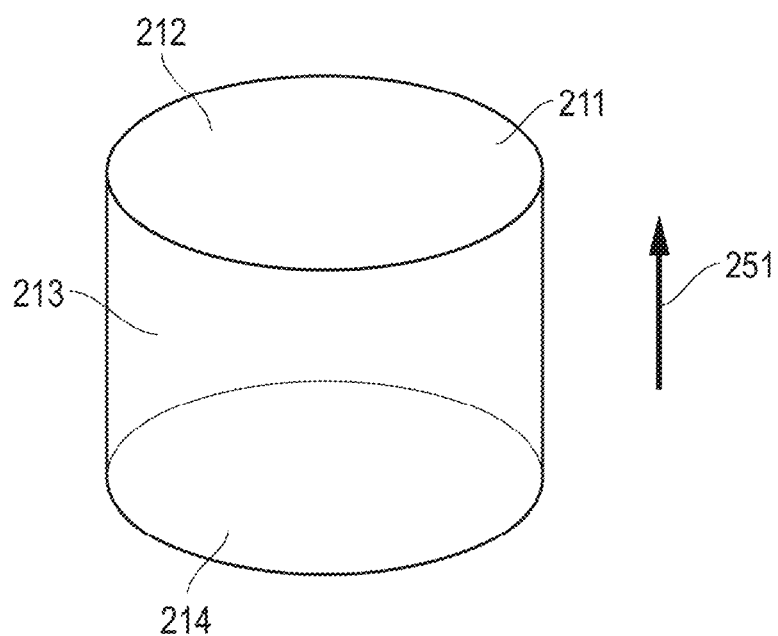

FIGS. 2A and 2B include perspective view illustrations of abrasive articles, which may be green bodies, finally-formed abrasive articles, a green body from a batch of green bodies, or an abrasive article body from a batch of abrasive article bodies according to embodiments herein. The bodies of FIGS. 2A and 2B can be formed by any of the methods of the embodiments herein and formed in a build direction 251. The body 201 can have surfaces 201, 203, 204, and 205 that are transverse relative to the build direction 251 and surfaces 202 and 207 that are not transverse to the build direction 251. The body 211 can be in the shape of a cylinder having a surface 213 transversely relative to the build direction and surfaces 212 and 214 that are not transverse to the build direction 251. It will be appreciated that the abrasive articles may be in any number of shapes and not limited to those explicitly shown herein. It will be appreciated that the bodies may be formed using a variety of build directions. In certain embodiments, the build direction may impact certain features of the abrasive articles, as green body abrasive articles and/or finally-formed abrasive articles. In certain instances, the transverse surfaces may have a different Sdr (developed interfacial area ratio) than the other surfaces. In an embodiment, the transverse surfaces may have a higher Sdr than surfaces having a different orientation to the transverse surfaces, and more specifically, surfaces having different orientations relative to the build direction 251. It will be appreciated that the build direction may be manipulated to control which surfaces have a relatively high or low Sdr. For example, an abrasive may be constructed such that the smallest surfaces are not transverse to the build direction, minimizing the amount of surface area with a low Sdr. Different Sdr values may be valuable for different applications. For example, a high Sdr surface may be useful as an abrasive working surface in low pressure grinding applications. A high or low Sdr surface may also more easily bind or adhere to a substrate or another surface using a binder, an adhesive, or other coupling means, depending on the composition of the coupling means. In an embodiment, a transverse surface can be an abrasive working surface of the body. In another embodiment, a surface that is not a transverse surface can be an abrasive working surface of the body. In embodiments, either a transverse surface or a surface that is not transverse can be coupled to another surface via a binder or adhesive. In an embodiment, the transverse surfaces may have visible layering or roughness that is not present on the other surfaces.

Figure 3:
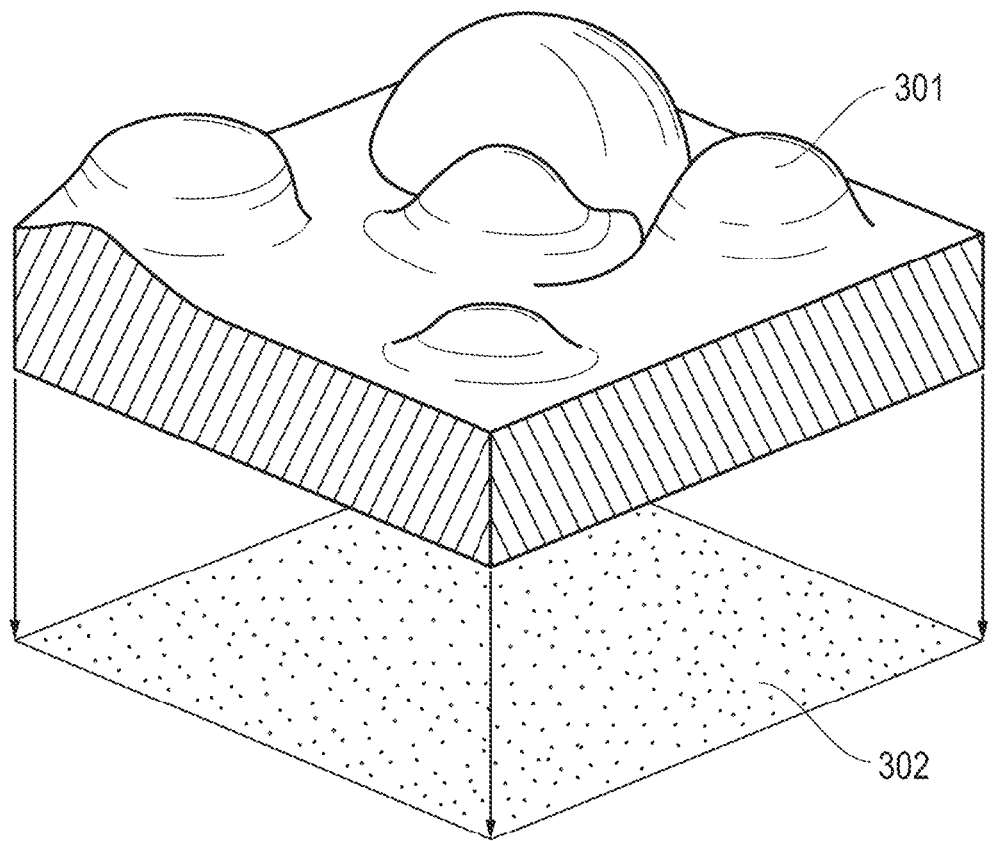
FIG. 3 includes an illustration of the measuring principle of the developed interfacial area ratio according to an embodiment.

FIG. 3 includes an illustration of the measuring principle of the developed interfacial area ratio Sdr. The developed interfacial area ratio Sdr expresses the percent increase in surface area 301 (provided by the surface texture) in relation to a corresponding underlying projected area 302 (ideal flat plane), and was measured according to ISO standard method ISO25178-2:2012.

The developed interfacial area ratio Sdr expresses the percentage rate of an increase in a surface area $A_1$ 301 that is related to the surface texture in comparison to a projected area $A_0$ 702, wherein $A_0$ 302 corresponds to an ideal plane underneath the measured surface texture. An illustration of the relation of surface area $A_1$ 301 to projected area $A_0$ 302 is shown in FIG. 3. The Sdr measurements were conducted with an Olympus LEXT OLS5000 laser confocal microscope. The analyzed surface area was 257×257 µm, at a 50 times magnification, with a filter cylinder. Four measurements per sample were conducted at different locations and an average Sdr value was calculated according to the equation:

$$= \frac{1}{A}\left[\int\int_A \left(\sqrt{1 + \left(\frac{\partial z(x,y)}{\partial x}\right)^2 + \left(\frac{\delta z(x,y)}{\delta y}\right)^2} - 1\right) dxdy\right].$$

The Sdr can be also expressed by the following formula: Sdr=$[(A_1/A_0)-1]\times 100(\%)$.

In an embodiment, the additive manufacturing process can be performed with a specific printer head deposition resolution that may result in improved manufacturing or performance of the abrasive body. It will be appreciated that the printhead deposition resolution may be between any of the minimum and maximum values claimed herein. Without wishing to be tied to one theory, some data suggests that manipulating the resolution may alter the Sdr on the surfaces of the body. A small resolution may lead to a smaller Sdr on surfaces transverse to the build direction, as well as a smaller difference in Sdr between transverse surfaces and surfaces that are not transverse to the build direction. The same may be true for the thickness of the layers before and/or after compaction.

In one aspect, the additive manufacturing process can include using as starting material a powder material having a multi-modal particle distribution. The multi-modal particle size distribution of the powder material may be related to different sizes of a single phase material or creation of a mixture from different powder components, including for example, but not limited to, a mixture including a first particulate material (e.g., abrasive particles having a first particle size distribution) and a second particulate material (e.g., particulate bond material or bond material precursor having a second particle size distribution that is different from the first particle size distribution).

In one particular aspect, the powder material for the additive manufacturing process can be bi-modal particle distribution, wherein a first plurality of particles can have an average particle size (D50) of at least 1 µm and not greater than 10 µm, and a second plurality of particles can have an average particle size (D50) of at least 20 µm and not greater than 50 µm.

In another aspect, a weight % ratio of the first plurality of particles to the second plurality of particles can be from 1:0.1 to 1:10. In certain aspects, the weight % ratio can be not greater than 1:0.3 or not greater than 1:0.5 or not greater than 1:1 or not greater than 1:2 or not greater than 1:3 or not greater than 1:4 or not greater than 1:5 or not greater than 1:6 or not greater than 1:7 or not greater than 1:8 or not greater than 1:9 or not greater than 1:10.

In an embodiment, the abrasive body can include at least 2 vol % abrasive particles for a total volume of the body or at least 5 vol % or at least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %. In an embodiment, the body can include not greater than 95 vol % abrasive particles for a total volume of the body or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %. It will be appreciated that the vol % of abrasive particles can be between any of the minimum and maximum values noted above.

In an embodiment, the body can include a bond material or bond material precursor comprising an organic material or inorganic material or any combination thereof. In an embodiment, the bond material can comprise thermoplastics, thermosets, resins or any combination thereof. In an embodiment, the bond material can comprise phenolic resin, polyimides, polyamides, polyesters, aramids, epoxies, or any combination thereof. In an embodiment, the bond material can comprise a transition metal element. In still another embodiment, the bond material may include an amorphous phase, polycrystalline phase, or any combination thereof. In an embodiment, the bond material can comprise ceramic material, vitreous material, or any combination thereof, or wherein the ceramic material is polycrystalline, or wherein the vitreous material is amorphous. In an embodiment, the bond material can comprise an oxide. In an embodiment, the bond material can comprise an alumina-containing vitreous material. In an embodiment, the bond material can comprise silica-containing vitreous material. In an embodiment, the bond material can comprise at least one of alumina, silica, boron oxide, bismuth oxide, zinc oxide, barium oxide, magnesium oxide, calcium oxide, lithium oxide, sodium oxide, potassium oxide, cesium oxide, strontium oxide, zirconium oxide, manganese oxide, or any combinations thereof.

In an embodiment, an abrasive body can have a first surface having a first (Sdr1) and a second surface having a second developed interfacial area ratio (Sdr2). In an embodiment, Sdr1 can be greater than Sdr2. In another embodiment, Sdr1 can be less than Sdr2. In an embodiment, the first surface can be a transverse surface relative to the build direction of the abrasive article.

In an embodiment, a certain percentage of the surface area of the body can be a relatively high Sdr surface. It will be understood that a surface with a relatively high Sdr has an Sdr greater than the average Sdr of the entire body. In an embodiment at least 5% of the exterior surface area of the body can be a relatively high Sdr surface or at least 7% or at least 10% or at least 12% or at least 14% or at least 16% or at least 20% or at least 22% or at least 24% or at least 26% or at least 28% or at least 30% or at least 32% or at least 34% or at least 36% or at least 38% or at least 40% or at least 42% or at least 44% or at least 46% or at least 48% or at least 50% or at least 52% or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 93% or at least 95%. In an embodiment not greater than 95% of the exterior surface area of the body can be a relatively high Sdr surface or not greater than 93% or not greater than 90% or not greater than 88% or not greater than 86% or not greater than 84% or not greater than 82% or not greater than 80% or not greater than 78% or not greater than 76% or not greater than 74% or not greater than 72% or not greater than 70% or not greater than 68% or not greater than 66% or not greater than 64% or not greater than 62% or not greater than 60% or not greater than 58% or not greater than 56% or not greater than 54% or not greater than 52% or not greater than 50% or not greater than 48% or not greater than 46% or not greater than 44% or not greater than 42% or not greater than 40% or not greater than 38% or not greater than 36% or not greater than 34% or not greater than 32% or not greater than 30% or not greater than 28%, or not greater than 26% or not greater than 24% or not greater than 22% or not greater than 20% or not greater than 18% or not greater than 16% or not greater than 14% or not greater than 10% or not greater than 7% or not greater than 5%. It will be appreciated that the percent of surface area with a relatively high Sdr can be between any of the minimum and maximum values noted above.

In an embodiment, the first surface may have a particular Sdr1 that may facilitate improved performance and/or manufacturing of the abrasive article. In an embodiment, Sdr1 may be at least 40% or at least 42% or at least 44% or at least 46% or at least 48% or at least 50% or at least 52% or at least 54% or at least 56% or at least 58% or at least 60% or at least 62% or at least 64% or at least 66% or at least 68% or at least 70%. In another embodiment, Sdr1 is not greater than 140% or not greater than 135% or not greater than 130% or not greater than 125% or not greater than 120% or not greater than 115% or not greater than 110% or not greater than 105% or not greater than 100% or not greater than 95% or not greater than 90% or not greater than 85% or not greater than 80%. It will be appreciated that Sdr1 will be between any of the minimum and maximum values noted above.

In an embodiment, the abrasive body may have a second surface with a particular Sdr2 that may facilitate improved performance of the abrasive article. In an embodiment, Sdr2 may be not greater than 110% or not greater than 105% or not greater than 100% or not greater than 95% or not greater than 90% or not greater than 85% or not greater than 80% or not greater than 75%. In another embodiment, Sdr2 is at least 5%, at least 10%, at least 15%, at least 20%, at least 25%, at least 30% or at least 35% or at least 40% or at least 45%. It will be appreciated that Sdr2 will be between any of the minimum and maximum values noted above.

In an embodiment, a first surface can have an Sdr1 that is different than the Sdr2 of a second surface by a particular amount that may facilitate improved manufacturing or performance of the abrasives article. In one non-limiting embodiment, Sdr1 can have a value that is greater relative to Sdr2. In an embodiment, the first surface can have an Sdr1 that is at least 1% different than Sdr2 or at least 2% or at least 3% or at least 4% or at least 5% or at least 6% or at least 7% or at least 8% or at least 9% or at least 10%, different than the Sdr2 of the second surface. In another embodiment, the first surface can have an Sdr1 that is not greater than 25% different than Sdr2 or not greater than 24% or not greater than 23% or not greater than 22% or not greater than 21% or not greater than 20% or not greater than 19% or not greater than 18% or not greater than 17% or not greater than 16% or not greater than 15% different than Sdr2. It will be appreciated that the percent difference between Sdr1 and Sdr2 can be between any of the minimum and maximum values noted above. It will be appreciated that there may be more than two surfaces with different Sdr values, and the differences noted above in Sdr1 and Sdr2 can be equally applicable between two or more surfaces (e.g., exterior surfaces) of a body.

In a embodiment, the ratio of Sdr1:Sdr2 can be not greater than 1:2 or not greater than 1:1.9 or not greater than 1:1.8 or not greater than 1:1.7 or not greater than 1:1.6 or not greater than 1:1.5 or not greater than 1:1.4 or not greater than 1:1.3. In an embodiment the ratio of Sdr1:Sdr2 can be at least 1:1.01 or at least 1:1.03 or at least 1:1.05.

In an embodiment, the first surface, optionally a working surface, may be oriented at a particular angle relative to the second surface. The angle can be at least 2°, at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90°. In another embodiment, the angle can be at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°. It will be appreciated that the angle between the first surface and the second surface may be between any of the minimum and maximum values noted above. In a non-limiting embodiment, the first surface and the second surface may be orthogonal to each other.

In an embodiment, the first surface may have a particular surface roughness (Sa1) that may facilitate improved performance and/or manufacturing of the abrasive body. In an embodiment, Sa1 may be at least 1 micron or at least 1.5 microns or at least 2 microns or at least 2.5 microns or at least 3 microns or at least 3.5 microns or at least 4 microns or at least 4.5 microns or at least 5 microns. In another embodiment, Sa1 may not be greater than 30 microns, not greater than 28 microns, not greater than 25 microns, not greater than 22 microns, not greater than 18 microns or not greater than 15 microns. It will be appreciated that Sa1 may be between any of the minimum and maximum values noted above.

In an embodiment, the second surface may have a particular surface roughness (Sa2) that may facilitate improved performance and/or manufacturing of the abrasive body. In an embodiment, Sa2 may be at least 1 micron, such as at least 2 microns, or at least 3 microns, or at least 4 microns or at least 5 microns. In another embodiment, Sa2 may not be greater than 25 microns, not greater than 23 microns, not greater than 21 microns, not greater than 19 microns, not greater than 17 microns or not greater than 15 microns or not greater than 14 microns or not greater than 13 microns. It will be appreciated that Sa2 may be between any of the minimum and maximum values noted above.

In an embodiment, a first surface can have a Sa1 that is different than the Sa2 of a second surface by a particular amount that may facilitate improved manufacturing or performance of the abrasive article. In an embodiment, the first surface can have a Sa1 that is at least 0.2 microns different than the Sdr2 of the second surface or at least 0.4 microns such as at least 0.6 microns or at least 0.8 microns or at least 1 micron. In another embodiment, the first surface can have a Sa1 that is not greater than 6 microns different than Sa2 or not greater than 5.5 microns or not greater than 5 microns or not greater than 4.5 microns or not greater than 4 microns or not greater than 3.5 microns or not greater than 3 microns, different than Sa2. It will be appreciated that the percent difference between Sa1 and Sa2 can be between any of the minimum and maximum values noted above.

Figure 4A:
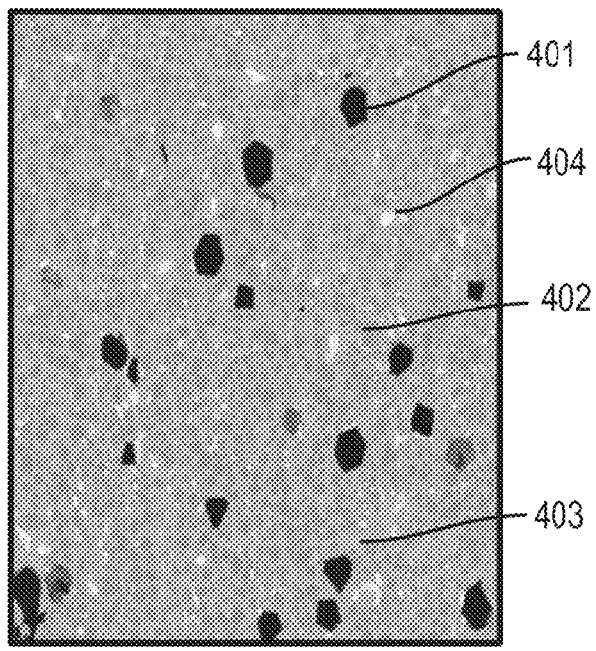
Figure 4B:
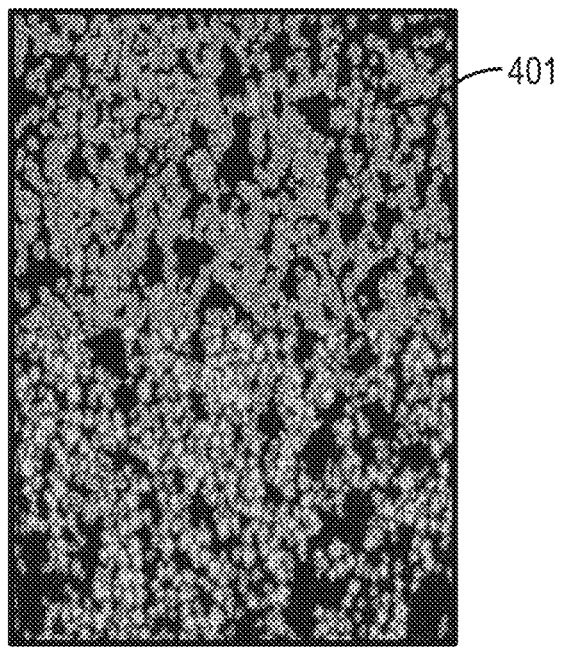
Figure 4C:
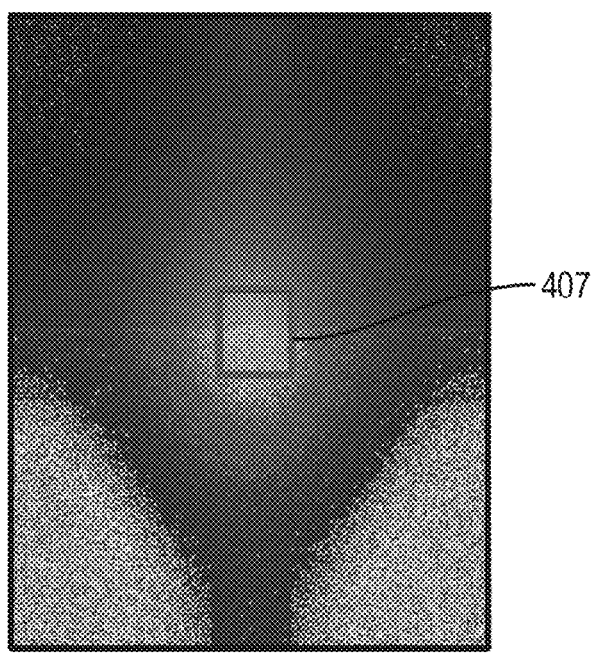
Figure 4D:
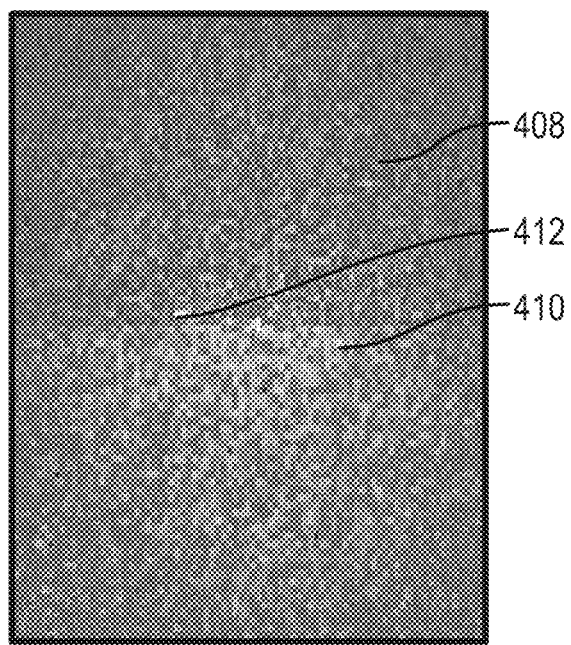

The frequency domain images are obtained by utilizing the Fourier Transform through Python to process the SEM images. Three SEM images of three cross sections of a bonded abrasive body are taken. FIGS. 4A to 4E include images of a cross section of a body of a finally-formed abrasive article formed in accordance with additive manufacturing technique. FIG. 4A includes a scanning electron microscopic image of a cross section of a body. As illustrated, the abrasive body can include abrasive particles 401 joined by a bond matrix including a bond material 402 and an infiltrant material 403, and a filler material 404. FIG. 4A can be processed by adjusting the threshold such that only the bond material remains present in the image of FIG. 4B. FIG. 4C includes an image that has been further processed by focusing on the center, the brightest area, of FIG. 4B. FIG. 4D is an image of the magnified area within the box 407 in FIG. 4C. As illustrated in FIG. 4D, noise 408 is in greyscale, and frequency signals 410 and 412 have brightness above the noise. Removing the noise from FIG. 4D, a frequency domain image is generated and illustrated in FIG. 4E. The bright dot in the center is the zero frequency component indicating the average brightness of the image in FIG. 4B, and the other two symmetrically distributed bright dots represent the frequency of the bond material 402. The Fast Fourier Transform value refers to the average number of dots other than the zero frequency components shown in frequency domain images of at least three cross-sectional images from the same body. For example, the Microstructure Feature value can be determined by dividing the sum of the number of dots that are not the center dot of each frequency domain image by the total number of the frequency domain images.

In an embodiment, the body of the abrasive article may include a Microstructure Feature value that may facilitate improved performance of the abrasive article. In an embodiment, the Microstructure Feature may be at least 1, such as at least 2 or at least 3 or at least 4 or at least 5 or at least 6 or at least 7. In still another embodiment, the Microstructure Feature may be not greater than 10 or not greater than 9 or not greater than 8 or not greater than 7 or not greater than 6 or not greater than 5 or not greater than 4 or not greater than 3. It will be appreciated the Microstructure Feature may be a value between and of the minimum and maximum values noted above, including, for example, within a range of at least 1 to not greater than 10 or within a range of at least 2 and not greater than 10.

In a further embodiment, the Microstructure Feature can include a Spacing Value. The abrasive body can include an average distance determined based on frequency domain images (i.e., the image of FIG. 4E) of at least three cross-sectional images of the body of an abrasive article. As used herein, the Spacing Value can be determined using the average distance. The average distance is an averaged value of the distance between the zero frequency component (i.e., the center dot) and one other dot of frequency domain images of at least three cross-sections of the abrasive body. For example, the average distance can be calculated by dividing the total of the distance between the center dot and one other dot of each of the frequency domain images by the number of the distances that make up the total. The Spacing Value of an abrasive body can be a relative value that can be obtained by dividing the average distance of the abrasive body by the average distance of an abrasive body having layers having the printed thickness of 120 microns.

More particularly, the Spacing Value can be determined as follows. The bonded abrasive body includes layers having a printed thickness of 120 microns. All the SEM images are processed to obtain images illustrated in FIG. 4E. As illustrated in the frequency domain image of FIG. 4E, the distance from the center of the center dot to the center of one other dot is measured using Image J for each of the frequency domain images. The average of the 3 distances is calculated and referred to as Da1. The average distance is then divided by itself to have a Spacing Value of the body.

In still another embodiment, the body of the abrasive article may include a Microstructure Feature including a Spacing Value that may facilitate improved performance of the abrasive article. In an embodiment, the Spacing Value may be at least 0.01 or at least 0.03 or at least 0.04 or at least 0.06 or at least 0.08 or at least 0.1 or at least 0.2, at least 0.3 or at least 0.4 or at least 0.5 or at least 0.6 or at least 0.7 or at least 0.8 or at least 0.9 or at least 1, at least 1.1 or at least 1.3 or at least 1.4 or at least 1.5 or at least 1.6 or at least 1.8 or at least 1.9 or at least 2 or at least 2.1 or at least 2.3 or at least 2.5 or at least 2.6 or at least 2.8 or at least 3 or at least 3.1 or at least 3.3 or at least 3.5 or at least 3.6 or at least 3.8 or at least 4, at least 4.2 or at least 4.5 or at least 4.7, or at least 5 or at least 6 or at least 7 or at least 8 or at least 9 or at least 10 or at least 11 or at least 12 or at least 15 or at least 20 or at least 30 or at least or at least 80 or at least 100 or at least 200 or at least 300 or at least 400 or at least 500. In still another embodiment, the spacing value may be not greater than 2000 or not greater than 1000 or not greater than 500 or not greater than 400 or not greater than 300 or not greater than 200 or not greater than 100 or not greater than 80 or not greater than 50 or not greater than 40 or not greater than 30 or not greater than 20 or not greater than 10 or not greater than 9.8, not greater than 9.6, not greater than 9.5, not greater than 9.3 or not greater than 9 or not greater than 8.8, not greater than 8.6, not greater than 8.4, not greater than 8.2 or not greater than 8 or not greater than 7.8, not greater than 7.6, not greater than 7.4, not greater than 7.2 or not greater than 7 or not greater than 6.8, not greater than 6.6, not greater than 6.4, not greater than 6.2 or not greater than 6 or not greater than 5.8, not greater than 5.6, not greater than 5.5, not greater than 5.2 or not greater than 5 or not greater than 4.8, not greater than 4.6, not greater than 4.4, not greater than 4.2 or not greater than 4 or not greater than 3.8, not greater than 3.6, not greater than 3.4, not greater than 3.2 or not greater than 3 or not greater than 2.8, not greater than 2.6, not greater than 2.4, not greater than 2.2 or not greater than 2 or not greater than 1.8 or not greater than 1.6 or not greater than 1.5 or not greater than 1.4 or not greater than 1.3 or not greater than 1.2 or not greater than 1 or not greater than 0.8, not greater than 0.6, not greater than 0.4, not greater than 0.2 or not greater than 0.1. It will be appreciated the spacing value may be a value between and of the minimum and maximum values noted above, including, for example, within a range of at least 1 to not greater than 1000.

FIGS. 5A and 5B represent images from a bonded abrasive formed through conventional processing techniques of hot pressing. FIG. 5A is a cross-sectional SEM image processed in the same manner as noted above according to the Fast Fourier Transform to obtain the image of FIG. 5B. The Microstructure Feature value of the sample is 1.

Figure 6A:
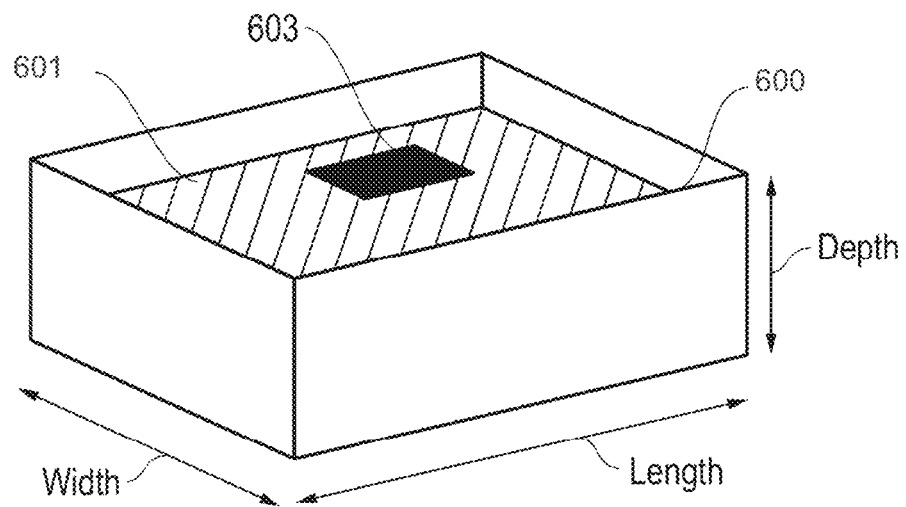
FIG. 6A includes an illustration of a build box for forming an abrasive article according to an embodiment.

FIG. 6A includes an illustration of a build box for forming an abrasive article according to an embodiment. The build box 600 is configured to contain the powder material as it is deposited. As illustrated in FIG. 6A, the build box 600 can include a portion including loose or unbound powder 601. The build box 600 can further include a portion representing a region of bound powder defining a green body abrasive article 603 surrounded by the portion of loose or unbound powder 601.

Figure 6B:
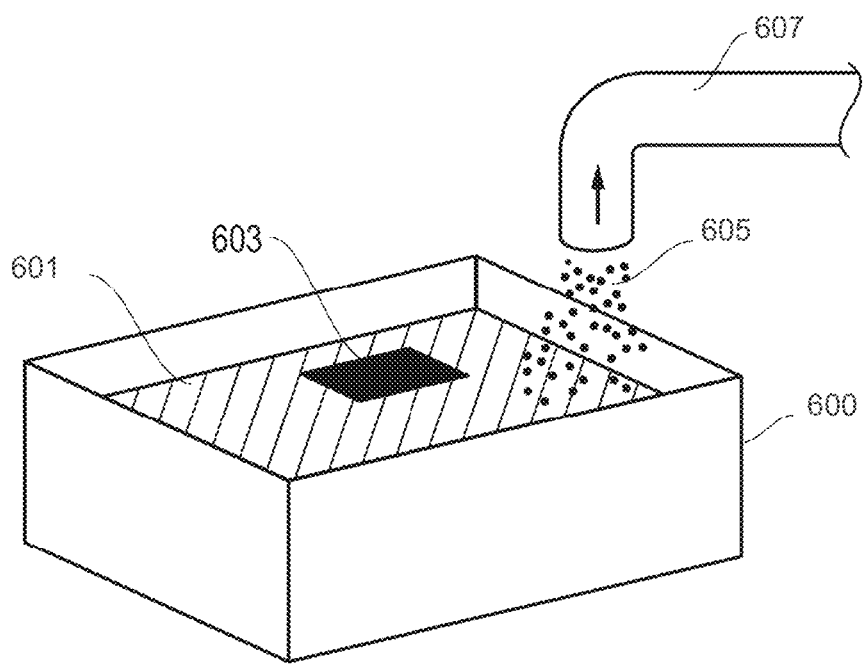
FIG. 6B includes an illustration of a process for capturing the loose powder according to an embodiment.

FIG. 6B includes an illustration of a process for capturing the loose powder after completing a forming operation to form the green body abrasive article. The loose powder 605 can be captured via a capturing mechanism 607, which may include suction or any other suitable means to remove the loose powder 605 and separate the green body abrasive article 603 from the portion of loose or unbound powder 601. The captured loose powder 605 can be stored in a container. Additionally, or alternatively, the loose powder 605, which may include some content of organic materials from the forming process (e.g., binder material), may be treated to remove a certain content of organic materials. Accordingly, the loose powder 605 can be recycled powder material that is suitable for use in a subsequent forming operation to form one or more green body abrasive articles.

Figure 6C:
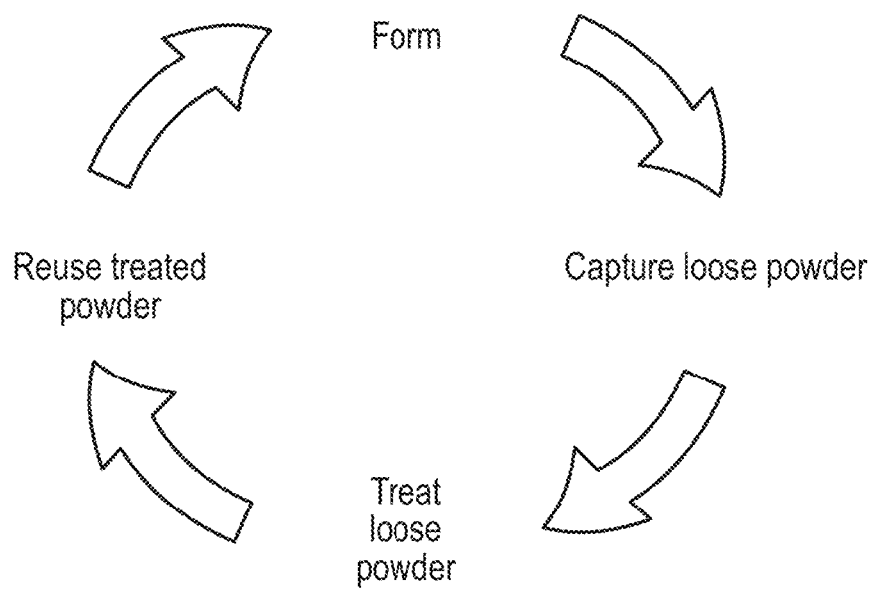
FIG. 6C includes a graphic representation of a process for recycling unused and loose powder material according to an embodiment.

FIG. 6C is a graphic representation of the process for recycling the unused and loose powder material.

Figure 7A:
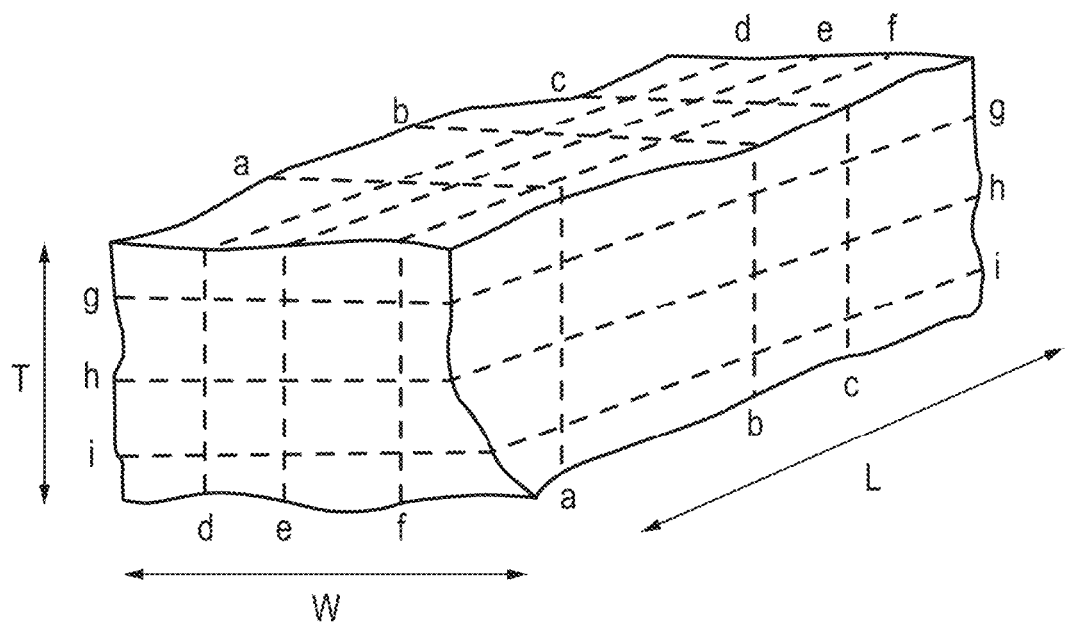
FIG. 7A includes a perspective view illustration of a body of an abrasive article according to an embodiment.

FIG. 7A is a perspective view illustration of a body of an abrasive article. As illustrated, the body has a length, width, and thickness and can be evaluated along any of these axes by destructive or non-destructive methods to evaluate one or more properties associated with the body or batch of abrasive bodies. Such properties can include, but are not limited to, density variation-L, density variation-W, density variation-T, dimensional variation-L, dimensional variation-W, dimensional variation-T, hardness variation-L, hardness variation-W, hardness variation-T, MOR variation-L, MOR variation-W, MOR variation-T, MOE variation-L, MOE variation-W, and MOE variation-T. FIG. 7B includes three cross-sectional images of cross-sections "a", "b," and "c" along a length of the body. Such cross-sections can be generated by cutting the samples for evaluation of one or more properties claimed herein. Alternatively, the cross-sections may be generated from 3D scans of the body to evaluate certain dimensional features and evaluate the quality and consistency of the geometric features of the body. FIG. 7C includes three cross-sectional images of cross-sections "d", "e," and "f" along the width of the body. FIG. 7D includes three cross-sectional images of cross-sections "g", "h," and "i" along the thickness of the body. In certain instances, the difference in cross-sectional area of each of the cross-sections may be used to quantify the geometric quality of the body.

In an embodiment, the body of the abrasive article may have density variation-L that may facilitate improved performance of the abrasive article. In an embodiment, the density variation-L may be not greater than 20% such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. The density variation-L is calculated by making multiple measurements of density spaced apart from each other along the length of the body. The density measurements may be evaluated by cross-sectional images taken in planes substantially perpendicular to the length of the body. Alternatively, ultrasonic or other non-destructive techniques may be used to create a map of the density variations in the body and used to measure density values and the change in density values of the body along the length of the body. The density variation-L can be the percent difference between an average density value of the body and a density value from a body having the greatest difference, plus or minus, in density from the average density value. The number of density values for a body or batch should be of a suitable statistically relevant sample size.

In an embodiment, the body of the abrasive article may have density variation-W that may facilitate improved performance of the abrasive article. In an embodiment, the density variation-W may be not greater than 20% such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. The density variation-W is calculated by making multiple measurements of density spaced apart from each other along the width of the body. The density measurements may be evaluated by cross-sectional images taken in planes substantially perpendicular to the width of the body at different positions spaced apart from each other along the dimension of width. Alternatively, ultrasonic or other non-destructive techniques may be used to create a map of the density variations in the body and used to measure density values and the change in density values of the body along the width of the body. The density variation-W can be the percent difference between an average density value of the body and a density value from a body having the greatest difference, plus or minus, in density from the average density value. The number of density values for a body or batch should be of a suitable statistically relevant sample size.

In an embodiment, the body of the abrasive article may have density variation-T that may facilitate improved performance of the abrasive article. In an embodiment, the density variation-T may be not greater than 20% such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. The density variation-T is calculated by making multiple measurements of density spaced apart from each other along the thickness of the body. The density measurements may be evaluated by cross-sectional images taken in planes substantially perpendicular to the thickness of the body at different positions spaced apart from each other along the dimension of thickness. Alternatively, ultrasonic or other non-destructive techniques may be used to create a map of the density variations in the body and used to measure density values and the change in density values of the body along the thickness of the body. The density variation-T can be the percent difference between an average density value of the body and a density value from a body having the greatest difference, plus or minus, in density from the average density value. The number of density values for a body or batch should be of a suitable statistically relevant sample size.

In an embodiment, the body of the abrasive article may have a hardness variation-L that may facilitate improved performance of the abrasive article. In an embodiment, the body of the abrasive article may have a hardness variation-L of not greater than 20% of an average hardness value of the body, wherein hardness variation-L is measured along a length of the body, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the hardness variation-L may be at least 0.00001% or at least 0.0001%. It will be appreciated that the hardness variation-L can be within a range including any of the minimum and maximum values noted above, including for example, but not limited to at least 0.0001%, and not greater than 20%, or within a range of at least 0.001%, and not greater than 10%.

In an embodiment, the body of the abrasive article may have a hardness variation-W that may facilitate improved performance of the abrasive article. In an embodiment, the body of the abrasive article may have a hardness variation-W of not greater than 20% of an average hardness value of the body, wherein hardness variation-W is measured along a width of the body, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the hardness variation-W may be at least 0.00001% or at least 0.0001%. It will be appreciated that the hardness variation-W can be within a range including any of the minimum and maximum values noted above, including for example, but not limited to at least 0.0001%, and not greater than 20%, or within a range of at least 0.001%, and not greater than 10%.

In an embodiment, the body of the abrasive article may have a hardness variation-T that may facilitate improved performance of the abrasive article. In an embodiment, the body of the abrasive article may have a hardness variation-T of not greater than 20% of an average hardness value of the body, wherein hardness variation-T is measured along a thickness of the body, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the hardness variation-T may be at least 0.00001% or at least 0.0001%. It will be appreciated that the hardness variation-T can be within a range including any of the minimum and maximum values noted above, including for example, but not limited to at least 0.0001%, and not greater than 20%, or within a range of at least 0.001%, and not greater than 10%.

In an embodiment, a batch of abrasive articles may have a batch hardness variation that may facilitate improved performance of the abrasive article. In an embodiment, the batch of abrasive articles may have a batch hardness variation of not greater than 20% of an average hardness value of the batch, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the batch hardness variation may be at least 0.00001% or at least 0.0001%. It will be appreciated that the batch hardness variation can be within a range including any of the minimum and maximum values noted above, including for example, but not limited to at least 0.0001%, and not greater than 20%, or within a range of at least 0.001%, and not greater than 10%. The batch hardness variation is calculated by measuring the hardness of each body of the plurality of bodies made via a single operation, wherein the batch hardness variation is a measure of the percent difference between an average hardness value of the batch and a hardness value from a body having the greatest difference, plus or minus, in hardness from the average hardness value of the batch. Note that multiple hardness values can be taken for each body of the plurality of bodies in the batch, and any of the hardness values taken from a body is relevant for comparison and calculation of the batch hardness variation. Each hardness value of the body may be averaged to create an average body hardness value for each discrete body in the batch. The average batch hardness value can be calculated by averaging the average hardness values for each body of the batch. The number of hardness values for a body or batch should be of a suitable statistically relevant sample size.

In an embodiment, the body of the abrasive article may have a dimensional variation-L that may facilitate improved performance of the abrasive article. In an embodiment, the dimensional variation-L may be not greater than 90% of an average dimensional value of the body, wherein dimensional variation-L is measured along a length of the body such as not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%. In still another embodiment, the dimensional variation-L is at least 0.0001% or at least 0.001% or at least 0.01% or at least 0.1%. It will be appreciated that the dimensional variation-L can be within a range including any of the minimum and maximum values noted above, including for example, but not limited to at least 0.0001%, and not greater than 90%, or within a range of at least 0.001%, and not greater than 80%.

It will be appreciated that a batch of abrasive articles may have a batch dimensional variation-L having a value of any of the values notes above including a range between any of the minimum and maximum values noted above with respect to the dimensional variation-L, wherein the batch dimensional variation-L is calculated by measuring the length of each body of the plurality of bodies made via a single operation, wherein the batch dimensional variation-L is the percent difference between an average length of same-shaped bodies of a batch and a length value of a body having the greatest difference, plus or minus, in length from the average length value of the batch. Note that multiple length values can be taken for each body of the plurality of bodies in the batch, and any of the length values taken from a body is relevant for comparison and calculation of the batch dimensional variation-L. More than one length measurement may be made on an individual body and averaged to create an average length value for each discrete body in the batch. An average length value of the batch can be calculated by averaging the average length values for each same-shaped body of the batch. The number of length values for a body or the batch should be of a suitable statistically relevant sample size.

In an embodiment, the body of the abrasive article may have a dimensional variation-W that may facilitate improved performance of the abrasive article. In an embodiment, the dimensional variation-W may be not greater than 90% of an average dimensional value of the body, wherein dimensional variation-W is measured along a width of the body such as not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%. In still another embodiment, the dimensional variation-W is at least 0.0001% or at least 0.001% or at least 0.01% or at least 0.1%. It will be appreciated that the dimensional variation-W can be within a range including any of the minimum and maximum values noted above, including for example, but not limited to at least 0.0001%, and not greater than 90%, or within a range of at least 0.001%, and not greater than 80%.

It will be appreciated that a batch of abrasive articles may have a batch dimensional variation-W having a value of any of the values notes above including a range between any of the minimum and maximum values noted above with respect to the dimensional variation-W, wherein the batch dimensional variation-W is calculated by measuring the width of each body of the plurality of bodies made via a single operation, wherein the batch dimensional variation-W is the percent difference between an average width of same-shaped bodies of a batch and a width value of a body having the greatest difference, plus or minus, in width from the average width value of the batch. Note that multiple width values can be taken for each body of the plurality of bodies in the batch, and any of the width values taken from a body is relevant for comparison and calculation of the batch dimensional variation-W. More than one width measurement may be made on an individual body and averaged to create an average width value for each discrete body in the batch. An average width value of the batch can be calculated by averaging the average width values for each same-shaped body of the batch. The number of width values for a body or the batch should be of a suitable statistically relevant sample size.

In an embodiment, the body of the abrasive article may have a dimensional variation-T that may facilitate improved performance of the abrasive article. In an embodiment, the dimensional variation-T may be not greater than 90% of an average dimensional value of the body, wherein dimensional variation-T is measured along a thickness of the body such as not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%. In still another embodiment, the dimensional variation-T is at least 0.0001% or at least 0.001% or at least 0.01% or at least 0.1%. It will be appreciated that the dimensional variation-T can be within a range including any of the minimum and maximum values noted above, including for example, but not limited to at least 0.0001%, and not greater than 90%, or within a range of at least 0.001%, and not greater than 80%.

It will be appreciated that a batch of abrasive articles may have a batch dimensional variation-T having a value of any of the values notes above including a range between any of the minimum and maximum values noted above with respect to the dimensional variation-T, wherein the batch dimensional variation-T is calculated by measuring the thickness of each body of the plurality of bodies made via a single operation, wherein the batch dimensional variation-T is the percent difference between an average thickness of same-shaped bodies of a batch and a thickness value of a body having the greatest difference, plus or minus, in thickness from the average thickness value of the batch. Note that multiple thickness values can be taken for each body of the plurality of bodies in the batch, and any of the thickness values taken from a body is relevant for comparison and calculation of the batch dimensional variation-T. More than one thickness measurement may be made on an individual body and averaged to create an average thickness value for each discrete body in the batch. An average thickness value of the batch can be calculated by averaging the average thickness values for each same-shaped body of the batch. The number of thickness values for a body or the batch should be of a suitable statistically relevant sample size.

In an embodiment, the body of the abrasive article may have a theoretical density that may facilitate improved performance of the abrasive article. In an embodiment, the theoretical density may be not greater than 99.9% or not greater than 99.5% or not greater than 99%. Still, in a non-limiting embodiment, the theoretical density may be at least 50% or at least 51% or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94% or at least 95% or at least 96% or at least 97% or at least 98% or at least 99%. It will be appreciated that the theoretical density can be within a range including any of the minimum and maximum values noted above, including for example, but not limited to within a range of at least 50% to not greater than 99.9% or within a range of at least 62% to not greater than 98%. It will be appreciated that each body of a plurality of bodies of a batch of abrasive article can have a theoretical density of any of the values noted above with respect to the theoretical density of the body.

In an embodiment, the body of the abrasive article may have a MOR variation-L that may facilitate improved performance of the abrasive article. In an embodiment, the MOR variation-L may be not greater than 20% of an average MOR value of the body, wherein MOR variation-L is measured along a length of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, the body of the abrasive article may have a MOR variation-W that may facilitate improved performance of the abrasive article. In an embodiment, the MOR variation-W may be not greater than 20% of an average MOR value of the body, wherein MOR variation-W is measured along a width of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, the body of the abrasive article may have a MOR variation-T that may facilitate improved performance of the abrasive article. In an embodiment, the MOR variation-T may be not greater than 20% of an average MOR value of the body, wherein MOR variation-T is measured along a thickness of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, a batch of abrasive articles may have a batch MOR variation that may facilitate improved performance of the abrasive article. In an embodiment, the batch MOR variation may be not greater than 20% of an average MOR value of the batch, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the batch MOR variation is at least 0.00001% or at least 0.0001%. It will be appreciated that the batch MOR variation can be within a range including any of the minimum and maximum values noted above, including for example, but not limited to at least 0.0001%, and not greater than 90%, or within a range of at least 0.001%, and not greater than 80%. The batch MOR variation is calculated by measuring the MOR of each body of the plurality of bodies made via a single operation, wherein the batch MOR variation is a measure of the percent difference between an average MOR value of the batch and a MOR value from a body having the greatest difference, plus or minus, in MOR from the average MOR value of the batch. The number of MOR values for a batch should be of a suitable statistically relevant sample size.

In an embodiment, the body of the abrasive article may have a MOE variation-L that may facilitate improved performance of the abrasive article. In an embodiment, the MOE variation-L may be not greater than 20% of an average MOE value of the body, wherein MOE variation-L is measured along a length of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, the body of the abrasive article may have a MOE variation-W that may facilitate improved performance of the abrasive article. In an embodiment, the MOE variation-W may be not greater than 20% of an average MOE value of the body, wherein MOE variation-W is measured along a width of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, the body of the abrasive article may have a MOE variation-T that may facilitate improved performance of the abrasive article. In an embodiment, the MOE variation-T may be not greater than 20% of an average MOE value of the body, wherein MOE variation-T is measured along a thickness of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, a batch of abrasive articles may have a batch MOE variation that may facilitate improved performance of the abrasive article. In an embodiment, the batch MOE variation may be not greater than 20% of an average MOE value of the batch, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the batch MOE variation is at least 0.00001% or at least 0.0001%. It will be appreciated that the batch MOE variation can be within a range including any of the minimum and maximum values noted above, including for example, but not limited to at least 0.0001%, and not greater than 90%, or within a range of at least 0.001%, and not greater than 80%. The batch MOR variation is calculated by measuring the MOE of each body of the plurality of bodies made via a single operation, wherein the batch MOE variation is a measure of the percent difference between an average MOE value of the batch and a MOE value from a body having the greatest difference, plus or minus, in MOE from the average MOE value of the batch. The number of MOE values for a batch should be of a suitable statistically relevant sample size.

In an embodiment, the abrasive article may include a particular porosity that may facilitate improved manufacturing of the abrasive article. In an embodiment, the porosity of the abrasive article may be at least 1 vol % based on the total volume of the abrasive article or at least 2 vol % such as at least 3 vol % or at least 4 vol % or at least 5 vol % or at least 10 vol % or at least 15 vol % or at least 20 vol % or at least 25 vol % or at least 30 vol % or at least 35 vol %. In another embodiment, the porosity of the abrasive article may be not greater than 90 vol % such as not greater than 80 vol % or not greater than 70 vol % or not greater than 60 vol % or not greater than 50 vol % or not greater than 45 vol % or not greater than 40 vol % or not greater than 30 vol % or not greater than 20 vol % or not greater than 10 vol % not greater than 8 vol % or not greater than 7 vol % or not greater than 6 vol % or not greater than 5 vol % or not greater than 4 vol % or not greater than 3 vol % or not greater than 2 vol % or not greater than 1 vol %. The porosity of the abrasive article can be a value between any of the minimum and maximum values noted above, including for example, but not limited to, within a range of at least 1 vol % to not greater than 90 vol % based on the total volume of the abrasive article, such as within a range of at least 10 vol % to not greater than 60 vol % based on the total volume of the abrasive article body.

Additionally, as illustrated the body has four major planar surfaces and two end surfaces. Any of the four major planar surfaces extending between the two smaller end surfaces can be used to evaluate certain properties as claimed herein, including for example, but not limited to, nWarp, nFlatness, nBow. In the instance of the property nDimensional variation, multiple measurements at random locations between two opposing major planar surfaces can be made to evaluate the nDimensional variation. Such a measurement can be made in the dimension of thickness in a direction generally perpendicular to the plane defined by the length and width of the body. A multitude of randomly selected points on the first major surface are selected and the shortest distance to the second major surface through the body is recorded as a dimension. The dimensions are averaged to define the average Dimensional variation. The average is then normalized to the surface area of the first major surface. If one of the major surfaces is smaller than the other, the smaller surface is used. The nDimensional variation is the average value of the dimensional variation normalized (divided) by the area of the smaller of the major planar surfaces.

In an embodiment, a major planar surface of the body may have a nWarp that may facilitate improved performance of the abrasive article. In an embodiment, the major planar surface of the body may have a nWarp of not greater than 50 $\mu m/cm^2$, wherein nWarp is the warp of the major planar surface normalized for the surface area of the major planar surface such as not greater than 40 $\mu m/cm^2$ or not greater than 30 $\mu m/cm^2$ or not greater than 20 $\mu m/cm^2$ or not greater than 10 $\mu m/cm^2$ or not greater than or not greater than 9 $\mu m/cm^2$ or not greater than 8 $\mu m/cm^2$ or not greater than 7 $\mu m/cm^2$ or not greater than 6 $\mu m/cm^2$ or not greater than 5 $\mu m/cm^2$ or not greater than 4 $\mu m/cm^2$ or not greater than 3 $\mu m/cm^2$ or not greater than 2 $\mu m/cm^2$ or not greater than 1 $\mu m/cm^2$ or not greater than 0.9 $\mu m/cm^2$ or not greater than 0.8 $\mu m/cm^2$ or not greater than 0.7 $\mu m/cm^2$ or not greater than 0.6 $\mu m/cm^2$ or not greater than 0.5 $\mu m/cm^2$ or not greater than 0.4 $\mu m/cm^2$ or not greater than 0.3 $\mu m/cm^2$ or not greater than 0.2 $\mu m/cm^2$ or not greater than 0.1 $\mu m/cm^2$ or not greater than 0.09 $\mu m/cm^2$ or not greater than 0.08 $\mu m/cm^2$ or not greater than 0.07 $\mu m/cm^2$ or not greater than 0.06 $\mu m/cm^2$ or not greater than 0.05 $\mu m/cm^2$ or not greater than 0.04 $\mu m/cm^2$ or not greater than 0.03 $\mu m/cm^2$ or not greater than 0.02 $\mu m/cm^2$ or not greater than 0.01 $\mu m/cm^2$. In still another embodiment, the nWarp may be at least 0.0001 $\mu m/cm^2$ or at least 0.0005 $\mu m/cm^2$ or at least 0.001 $\mu m/cm^2$ or at least 0.005 $\mu m/cm^2$ or at least 0.01 $\mu m/cm^2$ or at least 0.1 $\mu m/cm^2$. It will be appreciated that the nWarp can be within a range including any of the minimum and maximum values noted above, including for example, but not limited to within a range of at least 0.0001 $\mu m/cm^2$ to not greater than 50 $\mu m/cm^2$ or within a range of at least 0.001 $\mu m/cm^2$ to not greater than 10 $\mu m/cm^2$.

In an embodiment, a batch of abrasive articles may have a batch nWarp standard deviation that may facilitate improved performance of the abrasive article wherein batch nWarp variation is the standard deviation of nWarp for all bodies of the same shape in a batch. In an embodiment, the batch nWarp standard deviation may be not greater than 10, such as not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01. In still another embodiment, the batch nWarp standard deviation may be at least 0.0005 or at least 0.001 or at least 0.005 or at least 0.01 or at least 0.1. It will be appreciated that the batch nWarp standard deviation can be within a range including any of the minimum and maximum values noted above, including for example, but not limited to within a range of at least 0.01 to not greater than 10 or within a range of at least 0.1 to not greater than 5.

In an embodiment, a major planar surface of the body may have a nFlatness that may facilitate improved performance of the abrasive article. In an embodiment, the major planar surface of the body may have a nFlatness of not greater than 50 $\mu m/cm^2$, wherein nFlatness is the flatness of the major planar surface normalized for the surface area of the major planar surface, such as not greater than 40 $\mu m/cm^2$ or not greater than 30 $\mu m/cm^2$ or not greater than 20 $\mu m/cm^2$ or not greater than 10 $\mu m/cm^2$ or not greater than or not greater than 9 $\mu m/cm^2$ or not greater than 8 $\mu m/cm^2$ or not greater than 7 $\mu m/cm^2$ or not greater than 6 $\mu m/cm^2$ or not greater than 5 $\mu m/cm^2$ or not greater than 4 $\mu m/cm^2$ or not greater than 3 $\mu m/cm^2$ or not greater than 2 $\mu m/cm^2$ or not greater than 1 $\mu m/cm^2$ or not greater than 0.9 $\mu m/cm^2$ or not greater than 0.8 $\mu m/cm^2$ or not greater than 0.7 $\mu m/cm^2$ or not greater than 0.6 $\mu m/cm^2$ or not greater than 0.5 $\mu m/cm^2$ or not greater than 0.4 $\mu m/cm^2$ or not greater than 0.3 $\mu m/cm^2$ or not greater than 0.2 $\mu m/cm^2$ or not greater than 0.1 $\mu m/cm^2$ or not greater than 0.09 $\mu m/cm^2$ or not greater than 0.08 $\mu m/cm^2$ or not greater than 0.07 $\mu m/cm^2$ or not greater than 0.06 $\mu m/cm^2$ or not greater than 0.05 $\mu m/cm^2$ or not greater than 0.04 $\mu m/cm^2$ or not greater than 0.03 $\mu m/cm^2$ or not greater than 0.02 $\mu m/cm^2$ or not greater than 0.01 $\mu m/cm^2$. In still another embodiment, the nFlatness may be at least 0.0001 $\mu m/cm^2$ or at least 0.0005 $\mu m/cm^2$ or at least 0.001 $\mu m/cm^2$ or at least 0.005 $\mu m/cm^2$ or at least 0.01 $\mu m/cm^2$ or at least 0.1 $\mu m/cm^2$. It will be appreciated that the nFlatness can be within a range including any of the minimum and maximum values noted above, including for example, but not limited to within a range of at least 0.0001 $\mu m/cm^2$ to not greater than 50 $\mu m/cm^2$ or within a range of at least 0.001 $\mu m/cm^2$ to not greater than 10 $\mu m/cm^2$.

In an embodiment, a batch of abrasive articles may have a batch nFlatness standard deviation that may facilitate improved performance of the abrasive article wherein batch nFlatness variation is the standard deviation of nFlatness for all bodies of the same shape in a batch. In an embodiment, the batch nFlatness standard deviation may be not greater than 10, such as not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01. In still another embodiment, the batch nFlatness standard deviation may be at least 0.0005 or at least 0.001 or at least 0.005 or at least 0.01 or at least 0.1. It will be appreciated that the batch nFlatness standard deviation can be within a range including any of the minimum and maximum values noted above, including for example, but not limited to within a range of at least 0.01 to not greater than 10 or within a range of at least 0.1 to not greater than 5.

In an embodiment, a major planar surface of the body may have a nBow that may facilitate improved performance of the abrasive article. In an embodiment, the major planar surface of the body may have a nBow of not greater than 50 $\mu m/cm^2$, wherein nBow is the bow of the major planar surface normalized for the surface area of the major planar surface, such as not greater than 40 $\mu m/cm^2$ or not greater than 30 $\mu m/cm^2$ or not greater than 20 $\mu m/cm^2$ or not greater than 10 $\mu m/cm^2$ or not greater than or not greater than 9 $\mu m/cm^2$ or not greater than 8 $\mu m/cm^2$ or not greater than 7 $\mu m/cm^2$ or not greater than 6 $\mu m/cm^2$ or not greater than 5 $\mu m/cm^2$ or not greater than 4 $\mu m/cm^2$ or not greater than 3

μm/cm² or not greater than 2 μm/cm² or not greater than 1 μm/cm² or not greater than 0.9 μm/cm² or not greater than 0.8 μm/cm² or not greater than 0.7 μm/cm² or not greater than 0.6 μm/cm² or not greater than 0.5 μm/cm² or not greater than 0.4 μm/cm² or not greater than 0.3 μm/cm² or not greater than 0.2 μm/cm² or not greater than 0.1 μm/cm² or not greater than 0.09 μm/cm² or not greater than 0.08 μm/cm² or not greater than 0.07 μm/cm² or not greater than 0.06 μm/cm² or not greater than 0.05 μm/cm² or not greater than 0.04 μm/cm² or not greater than 0.03 μm/cm² or not greater than 0.02 μm/cm² or not greater than 0.01 μm/cm². In still another embodiment, the nBow may be at least 0.0001 μm/cm² or at least 0.0005 μm/cm² or at least 0.001 μm/cm² or at least 0.005 μm/cm² or at least 0.01 μm/cm² or at least 0.1 μm/cm². It will be appreciated that the nBow can be within a range including any of the minimum and maximum values noted above, including for example, but not limited to within a range of at least 0.0001 μm/cm² to not greater than 50 μm/cm² or within a range of at least 0.001 μm/cm² to not greater than 10 μm/cm².

In an embodiment, a batch of abrasive articles may have a batch nBow standard deviation that may facilitate improved performance of the abrasive article wherein batch nBow variation is the standard deviation of nBow for all bodies of the same shape in a batch. In an embodiment, the batch nBow standard deviation may be not greater than 10, such as not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01. In still another embodiment, the batch nBow standard deviation may be at least 0.0005 or at least 0.001 or at least 0.005 or at least 0.01 or at least 0.1. It will be appreciated that the batch nBow standard deviation can be within a range including any of the minimum and maximum values noted above, including for example, but not limited to within a range of at least 0.01 to not greater than 10 or within a range of at least 0.1 to not greater than 5.

In an embodiment, the distance between the first major planar surface and second major planar surface of the body may have a nDimensional Variation that may facilitate improved performance of the abrasive article. In an embodiment, the distance between the first major planar surface and second major planar surface may have a nDimensional variation of not greater than 100 μm/cm², herein nDimensional variation is the variation in the dimension between the first and second major planar surfaces normalized to the area of the first or second major planar surfaces, such as not greater than 90 μm/cm² or not greater than 80 μm/cm² or not greater than 70 μm/cm² or not greater than 60 μm/cm² or not greater than 50 μm/cm² or not greater than 40 μm/cm² or not greater than 30 μm/cm² or not greater than 20 μm/cm² or not greater than 10 μm/cm² or not greater than 9 μm/cm² or not greater than 8 μm/cm² or not greater than 7 μm/cm² or not greater than 6 μm/cm² or not greater than 5 μm/cm² or not greater than 4 μm/cm² or not greater than 3 μm/cm² or not greater than 2 μm/cm² or not greater than 1 μm/cm² or not greater than 0.9 μm/cm² or not greater than 0.8 μm/cm² or not greater than 0.7 μm/cm² or not greater than 0.6 μm/cm² or not greater than 0.5 μm/cm² or not greater than 0.4 μm/cm² or not greater than 0.3 μm/cm² or not greater than 0.2 μm/cm² or not greater than 0.1 μm/cm² or not greater than 0.09 μm/cm² or not greater than 0.08 μm/cm² or not greater than 0.07 μm/cm² or not greater than 0.06 μm/cm² or not greater than 0.05 μm/cm² or not greater than 0.04 μm/cm² or not greater than 0.03 μm/cm² or not greater than 0.02 μm/cm² or not greater than 0.01 μm/cm². In still another embodiment, the nDimensional Variation may be at least 0.0001 μm/cm² or at least 0.0005 μm/cm² or at least 0.001 μm/cm² or at least 0.005 μm/cm² or at least 0.01 μm/cm² or at least 0.1 μm/cm² or at least 1 μm/cm² or at least 5 μm/cm². It will be appreciated that the nDimensional Variation can be within a range including any of the minimum and maximum values noted above, including for example, but not limited to within a range of at least 0.0001 μm/cm² to not greater than 50 μm/cm² or within a range of at least 0.001 μm/cm² to not greater than 10 μm/cm².

In an embodiment, a batch of abrasive articles may have a batch nDimensional standard deviation that may facilitate improved performance of the abrasive article wherein batch nDimensional standard deviation is the standard deviation of nDimensional variation for all bodies of the same shape in a batch. In an embodiment, the batch nDimensional standard deviation may be not greater than 10, such as not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01. In still another embodiment, the batch nDimensional standard deviation may be at least 0.0005 or at least 0.001 or at least 0.005 or at least 0.01 or at least 0.1. It will be appreciated that the batch nDimensional standard deviation can be within a range including any of the minimum and maximum values noted above, including for example, but not limited to within a range of at least 0.01 to not greater than 10 or within a range of at least 0.1 to not greater than 5.

In an embodiment, the volume of the plurality of bodies of the batch may include a batch volume that may facilitate improved performance of the abrasive article. In an embodiment, the batch volume may be at least 10 cm³ or at least 11 cm³ or at least 12 cm³ or at least 13 cm³ or at least 14 cm³ or at least 15 cm³ or at least 16 cm³ or at least 17 cm³ or at least 18 cm³ or at least 19 cm³ or at least 20 cm³ or at least 21 cm³ or at least 22 cm³ or at least 23 cm³ or at least 24 cm³ or at least 25 cm³ or at least 26 cm³ or at least 27 cm³ or at least 28 cm³ or at least 29 cm³ or at least 30 cm³ or at least 31 cm³ or at least 32 cm³ or at least 33 cm³ or at least 34 cm³ or at least 35 cm³ or at least 36 cm³ or at least 37 cm³ or at least 38 cm³ or at least 39 cm³, or at least 40 cm³ or at least 42 cm³ or at least 44 cm³ or at least 46 cm³ or at least 48 cm³ or at least 50 cm³. In still another embodiment, the batch volume may be not greater than 5000 cm³ or not greater than 4000 cm³ or not greater than 3000 cm³ or not greater than 2000 cm³ or not greater than 1000 cm³ or not greater than 800 cm³ or not greater than 600 cm³ or not greater than 500 cm³. It will be appreciated that the batch v can be within a range including any of the minimum and maximum values noted above, including for example, but not limited to within a range of at least 10 cm³ to not greater than 100 cm³ or within a range of at least 100 cm³ to not greater than 5000 cm³.

According to another embodiment, the body of an abrasive article, which may be in the form of a green body abrasive article or a finally-formed abrasive article may have a particular volumetric form factor that may be achieved through one or more forming processes of the embodiments herein and facilitate improved abrasive operations. In one embodiment, for a single abrasive article (green body or finally-formed body), the volumetric form factor can be a comparison between the shape of the body in three-dimensions as compared to an intended shape. In certain aspects, abrasive articles are intended to comply with strict dimensional tolerances, and deviations from the intended dimensional tolerances must be addressed by one or more methods, typically a post-forming subtractive process. In some instances, depending upon the severity of the deviation of the body from an intended shape, the body may be scrapped.

Figure 8A:
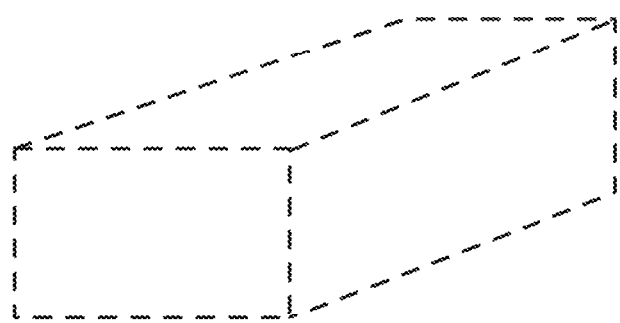
FIG. 8A includes a perspective view illustration of an intended shape of an abrasive article according to an embodiment.
Figure 8B:
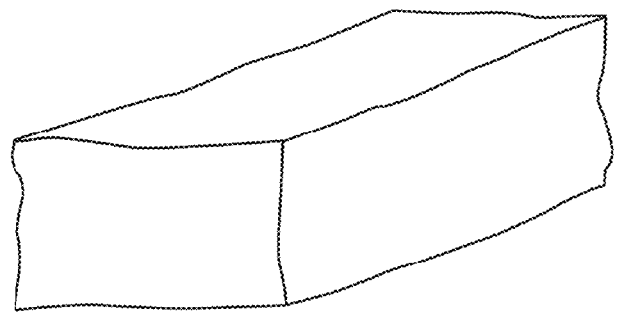
FIG. 8B includes a perspective view illustration of a formed abrasive article according to an embodiment.
Figure 8C:
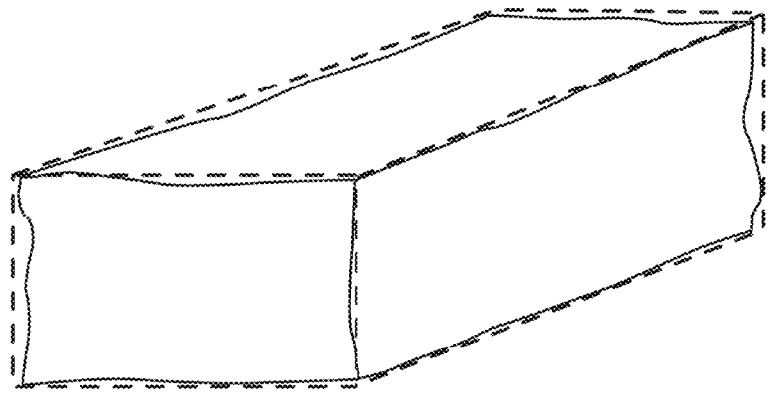
FIG. 8C includes an illustration of a formed abrasive article compared to an intended shape of an abrasive article according to an embodiment.

FIG. 8A includes a perspective view illustration of an intended shape of an abrasive article. The intended shape may be a well-known standard that may be stored as electronic data, such as in the form of a three-dimensional model on a computer-readable medium. FIG. 8B includes a perspective view illustration of a formed abrasive article. The volumetric form factor for a single abrasive article can be a value of how well the formed abrasive article (e.g., FIG. 8B) matches to the intended shape (e.g., FIG. 8A). One such comparison is illustrated as FIG. 8C.

According to one aspect, a detailed three-dimensional scan can be conducted on the body via 3D tomography with X-ray radiation to create a representative three-dimensional model of the abrasive article. The model of the abrasive article can be compared to the model of the intended shape. The model of the abrasive article can be compared to the model of the intended shape using slices of the body and measuring the deviations in one or more select planes through the model of the abrasive article. Additionally, or alternatively, the deviations between the two models may be evaluated for the whole of the volume.

Figure 9A:
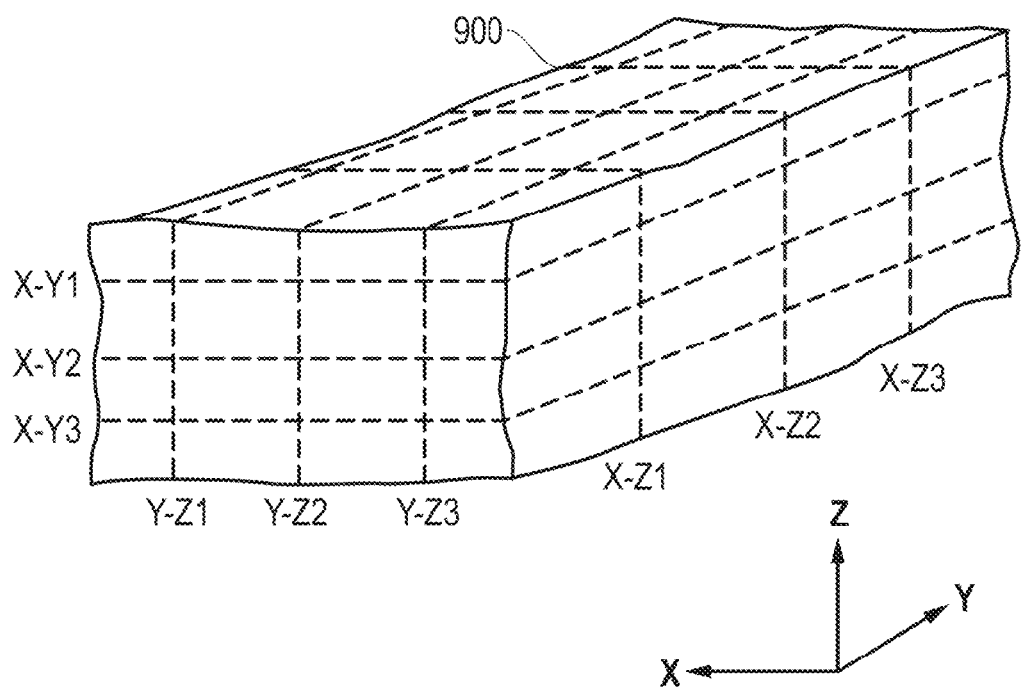
FIG. 9A includes a perspective view illustration of an abrasive article according to an embodiment.
Figure 9B:
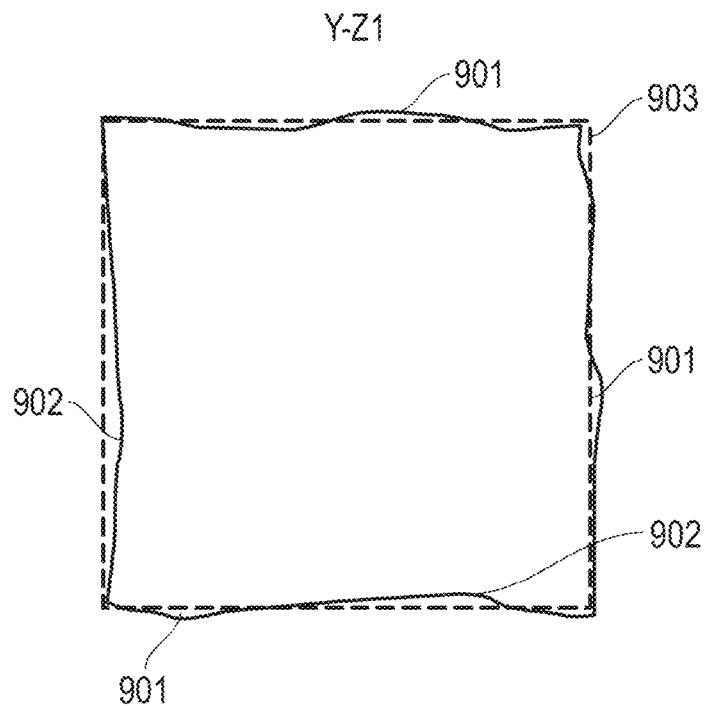
FIG. 9B includes a cross-section view illustration of an abrasive article according to an embodiment.

In one particular embodiment, at least three scans are completed in three different planes on the model of the abrasive article as shown in FIG. 9A. FIG. 9A illustrates nine total planes, spaced apart from each other, and cutting through the model of the abrasive article 900 for the planes X-Y, X-Z, and Y-Z. The scanned images can be extracted as 2D images of the body and can be compared to corresponding 2D data (e.g., 903) from the model of the intended shape. Image analysis software can compare the differences in the 2D images of the abrasive article and intended shape and evaluate the difference in area between the images for each of the nine planes. As shown in FIG. 9B, additional area 901 outside of an intended surface can be given a positive value. Negative area 902 on the model of the abrasive article relative to the model of the intended shape can be given a negative value. The total of positive and negative area is summed for each scan. The values for each of the nine scans are averaged and recorded as the average volumetric form value of the model of the abrasive article. The volumetric form factor is calculated as the absolute value of the ratio of the average volumetric form value divided by the volumetric form value of the model of the intended shape. That is, Vff=|Vav/Vmi|, wherein Vff represents the volumetric form factor, Vav represents the average volumetric form value and Vmi represents the volumetric form value of the model of the intended shape.

According to one embodiment, the Vff can be at least 0.1, such as at least 0.2 or at least 0.25 or at least 0.3 or at least 0.35 or at least 0.4 or at least 0.45 or at least 0.5 or at least 0.55 or at least 0.6 or at least 0.65 or at least 0.7 or at least 0.71 or at least 0.72 or at least 0.73 or at least 0.74 or at least 0.75 or at least 0.76 or at least 0.77 or at least 0.78 or at least 0.79 or at least 0.80 or at least 0.81 or at least 0.72 or at least 0.73 or at least 0.74 or at least 0.75 or at least 0.76 or at least 0.77 or at least 0.78 or at least 0.79 or at least 0.80 or at least 0.81 or at least 0.82 or at least 0.83 or at least 0.84 or at least 0.85 or at least 0.86 or at least 0.87 or at least 0.88 or at least 0.89 or at least 0.90 or at least 0.91 or at least 0.92 or at least 0.93 or at least 0.94 or at least 0.95 or at least 0.96 or at least 0.97 or at least 0.98 or at least 0.99 or at least 1.0 or at least 1.01 or at least 1.02 or at least 1.03 or at least 1.04 or at least 1.05 or at least 1.06 or at least 1.07 or at least 1.08 or at least 1.09 or at least 1.10 or at least 1.11 or at least 1.12 or at least 1.13 or at least 1.14 or at least 1.15 or at least 1.16 or at least 1.17 or at least 1.18 or at least 1.19 or at least 1.20 or at least 1.21 or at least 1.22 or at least 1.23 or at least 1.24 or at least 1.25 or at least 1.26 or at least 1.27 or at least 1.28 or at least 1.29 or at least 1.30 or at least 1.31 or at least 1.32 or at least 1.33 or at least 1.34 or at least 1.35 or at least 1.36 or at least 1.37 or at least 1.38 or at least 1.39 or at least 1.40 or at least 1.45 or at least 1.50 or at least 1.55 or at least 1.60 or at least 1.65 or at least 1.70 or at least 1.75 or at least 1.80 or at least 1.85 or at least 1.90 or at least 1.95 or at least 2.00. Still, in a non-limiting embodiment, the Vff can be not greater than 10, such as not greater than 9.5 or not greater than 9 or not greater than 8.5 or not greater than 8 or not greater than 7.5 or not greater than 7 or not greater than 6.5 or not greater than 6 or not greater than 5.5 or not greater than 5 or not greater than 4.5 or not greater than 4 or not greater than 3.5 or not greater than 3 or not greater than 2.5 or not greater than 2 or not greater than 1.5 or not greater than 1.45 or not greater than 1.40 or not greater than 1.39 or not greater than 1.38 or not greater than 1.37 or not greater than 1.36 or not greater than 1.35 or not greater than 1.34 or not greater than 1.33 or not greater than 1.32 or not greater than 1.31 or not greater than 1.30 or not greater than 1.29 or not greater than 1.28 or not greater than 1.27 or not greater than 1.26 or not greater than 1.25 or not greater than 1.24 or not greater than 1.23 or not greater than 1.22 or not greater than 1.21 or not greater than 1.20 or not greater than 1.19 or not greater than 1.18 or not greater than 1.17 or not greater than 1.16 or not greater than 1.15 or not greater than 1.14 or not greater than 1.13 or not greater than 1.12 or not greater than 1.11 or not greater than 1.10 or not greater than 1.09 or not greater than 1.08 or not greater than 1.07 or not greater than 1.06 or not greater than 1.05 or not greater than 1.04 or not greater than 1.03 or not greater than 1.02 or not greater than 1.01 or not greater than 1.00 or not greater than 0.99 or not greater than 0.98 or not greater than 0.97 or not greater than 0.96 or not greater than 0.95 or not greater than 0.94 or not greater than 0.93 or not greater than 0.92 or not greater than 0.91 or not greater than 0.90 or not greater than 0.89 or not greater than 0.88 or not greater than 0.87 or not greater than 0.86 or not greater than 0.85 or not greater than 0.84 or not greater than 0.83 or not greater than 0.82 or not greater than 0.81 or not greater than 0.80 or not greater than 0.79 or not greater than 0.78 or not greater than 0.77 or not greater than 0.76 or not greater than 0.75 or not greater than 0.74 or not greater than 0.73 or not greater than 0.72 or not greater than 0.71 or not greater than 0.70. It will be appreciated that the Vff can be within a range including any of the minimum and maximum values noted above, including for example, but not limited to at least 0.10, and not greater than 10, or within a range of at least 0.50, and not greater than 1.50, or within a range of at least 0.80, and not greater than 1.2, or within a range including at least 0.90, and not greater than 1.10, or even within a range including at least 0.95, and not greater than 1.05.

It will be appreciated that a single forming operation may form a plurality of discrete green body abrasive articles, which can be formed into a plurality of finally-formed abrasive articles. A plurality of abrasive articles may be referred to as a batch of abrasive articles and may be green bodies or finally-formed abrasive articles. In one embodiment, the abrasive articles of a batch can be formed in a single forming process within the same build box. The properties noted in the foregoing and claimed herein can be used to evaluate the abrasive articles on a batch basis. That is, evaluation of one or more geometric features and/or properties of each body within a batch can be compared to evaluate the quality of a batch as a whole. According to one embodiment, a batch may include a certain minimum size or volume of material, such as described in any of the embodiments herein. In another non-limiting embodiment, a batch may include a plurality of abrasive articles formed in a single additive manufacturing build cycle, which may include a plurality of abrasive articles (green or finally-formed) that are formed in the same build box during the same build cycle.

The embodiments herein are based on empirical studies. Significant challenges exist when using certain additive manufacturing processes, including for example, binder jetting to form abrasive articles on a commercial scale. While prior disclosures have disclosed the formation of abrasive articles via additive manufacturing, such products are not widely available because of the notable difficulties in scaling the process. The embodiments here are specifically developed based on empirical studies to advance the technology of additive manufacturing into a commercially viable option.

According to one aspect, one embodiment is a method for forming a batch of abrasive articles, particularly in the context of commercial-scale sized batches that may also include large-sized abrasive articles. According to a particular embodiment, the process can include a binder jetting operation that may include at least the steps of a) forming a plurality of green body abrasive articles defining a batch, wherein each of the green body abrasive articles comprise a precursor bond material and abrasive particles, wherein forming is conducted by: i) creating one or more layers of powder material, ii) selectively binding portions of the one or more layers with a binder material, and iii) converting the binder material to at least partially solidify the binder material and bind portions of powder material from the one or more layers.

In one particular embodiment, the process may include controlling the position and/or orientation of at least two abrasive articles relative to each other within the build box. In the development of a batch of abrasive articles in a commercially viable manner and scope it has been found that the placement of the abrasive articles within the build box and with respect to each other can impact the quality and/or properties of the abrasive articles. The quality and properties can include any of the qualities and properties of any green or finally-formed abrasive articles or batches of the same. In one particular embodiment, the process may include controlling at least one of a batch density variation and/or a batch volumetric form factor of the batch of abrasive articles based on the position and/or orientation of at least two of the abrasive articles relative to each other.

Figure 10:
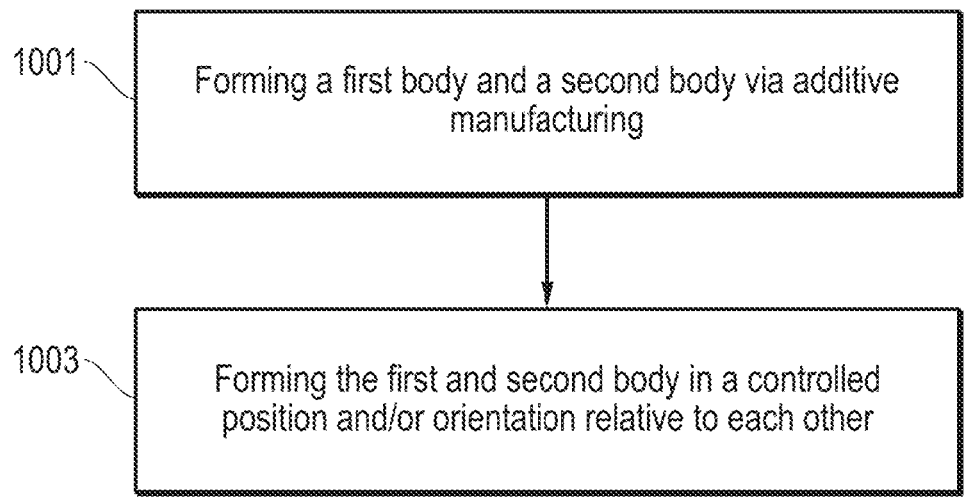
FIG. 10 includes a method for forming an abrasive article according to one embodiment.

FIG. 10 includes a method for forming an abrasive article according to one embodiment. The process may optionally include step 1001, forming a first body and a second body via additive manufacturing which may include evaluating placement characteristic data of at least a first and second abrasive article (also referred to herein as "bodies"). Placement characteristic data may include data about an abrasive article or plurality of abrasive articles that may impact their placement in the build box and/or position and/or orientation of the abrasive article. For example, in one embodiment, evaluating placement characteristic data may include accessing placement characteristic data related to a first abrasive article including at least one of a two-dimensional shape of the first abrasive article, a three-dimensional shape of the first abrasive article, a volume of the first abrasive article, an intended density of the first abrasive article, historical data, batch size, or any combination thereof.

In still another embodiment, evaluating placement characteristic data may include accessing placement characteristic data related to at least one of a two-dimensional shape of a second abrasive article, a three-dimensional shape of the second abrasive article, a volume of the second abrasive article, an intended density of the second abrasive article, historical data, batch size, or any combination thereof.

In still another embodiment, the method may include evaluating the placement characteristic data including accessing placement characteristic data for two or more abrasive articles to be formed, comparing the placement characteristic data to historical data and creating a packing model for the batch of abrasive articles based on the placement characteristic data, build box dimensions, direction of translation of a compacting object used during manufacturing and historical data or any combination thereof. In a particular embodiment, the packing model is used to control the selective deposition of a binder material onto one or more layers of powder material to form at least a portion of a green abrasive article. In an embodiment, selecting the first and second positions in the build box may be part of a process for building a packing model for the batch of abrasive articles.

In certain instances, evaluating may be aided or controlled by a computing device. FIG. 11B includes a schematic of a system that may be used to facilitate formation of abrasive articles via additive manufacturing. FIG. 11B includes a computing device 1151, a memory 1152, a processor 1153, and a packing model 1154 that may be included as hardware or software in the computing device 1151. According to one embodiment, the memory 1152 and the processor 1153 may be communicatively coupled to an additive manufacturing apparatus and/or controller of an additive manufacturing device 1155 and configured to provide instructions or control one or more operations associated with the additive manufacturing process. For example, in one embodiment, the memory 1152 may store placement characteristic data, historical data, and data related to the additive manufacturing process in a machine-readable format. In another embodiment, the processor 1153 may contain one or more computer programs that are configured to evaluate the placement characteristic data. In one non-limiting embodiment, the processor 1153 may be configured to compare the placement characteristic data of one or more of the abrasive articles to historical data to create a packing model 1154 for the batch of abrasive articles. According to another embodiment, a packing model for the batch of abrasive articles may be created based on the placement characteristics, historical data, and build box dimensions. In yet another embodiment, the process of creating a packing model for the batch of abrasive articles can be based on the placement characteristics, historical data, build box dimensions, and direction of translation of a compacting object used during manufacturing.

The packing model may be a scheme or plan used to build a batch of abrasive articles, and in particular, may include data on the placement and/or orientation of the abrasive articles relative to each other during the additive manufacturing process. In one embodiment, the packing model can be in a machine readable format and configured to be used by one or more controllers of the additive manufacturing process, including for example, but not limited to the movement and deposition characteristics of a printhead configured to selectively deposit binder material onto one or more layers of the powder material. In one instance, the packing model may also be presented in a format suitable for a person to evaluate and confirm the proposed scheme or plan prior to it being implemented by the additive manufacturing system.

In another non-limiting embodiment, the packing model may be developed or evolve via a machine learning algorithm or artificial intelligence. In one embodiment, the processor 1153 may use placement characteristic data of one or more abrasive articles to develop an initial packing model. For another embodiment, the initial packing model can be compared to historical data, which may include prior packing model data and the resulting properties and characteristics of the abrasive articles formed therefrom. In certain optional instances, the processor 1153 may edit the initial packing model based on the historical data to develop a final packing model to be used to form the batch of abrasive articles.

According to one embodiment, the historical data may include information of prior additive manufacturing operations including data related to the features of the abrasive articles and properties of the abrasive articles. In a more particular embodiment, data related to features of the abrasive articles may include data related to the size, shape, composition, and microstructure of the abrasive articles. In another non-limiting embodiment, the properties of the abrasive articles may include data related to the density, strength, hardness, modulus or rupture (MOR), volumetric form factor, and any other properties of the green bodies or finally-formed bodies according to the embodiments herein.

Figure 11A:
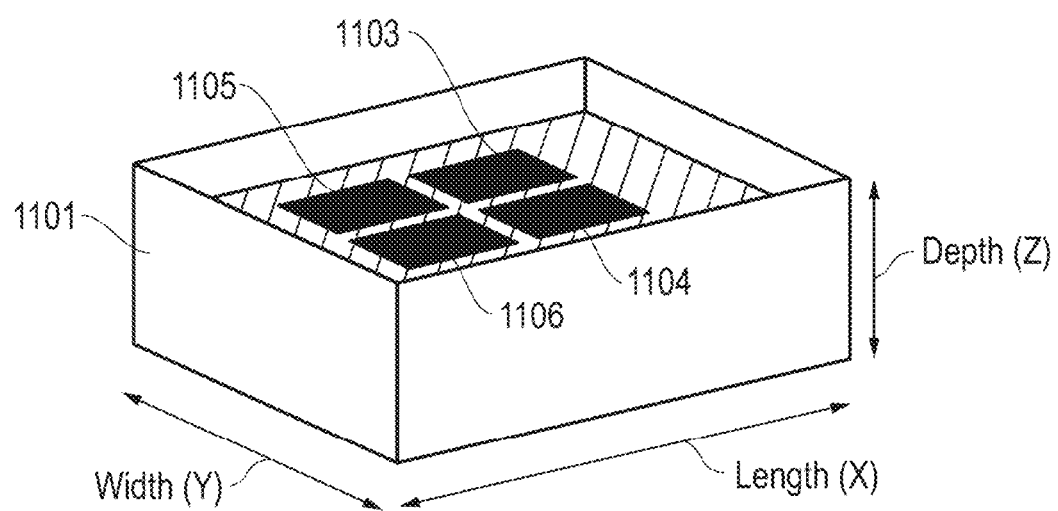
FIG. 11A includes a perspective view illustration of an apparatus used to form a batch of abrasive articles via additive manufacturing according to an embodiment.
Figure 11B:
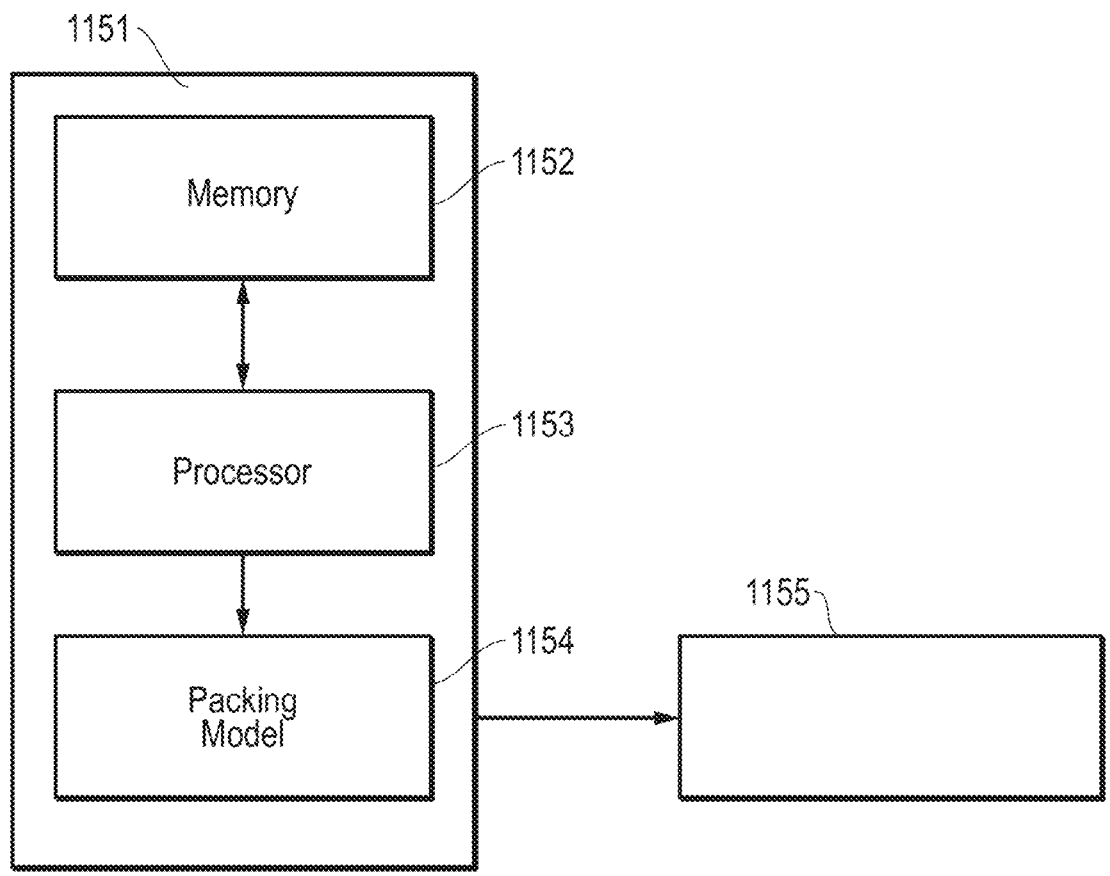
FIG. 11B includes a schematic of a system that may be used to facilitate formation of abrasive articles via additive manufacturing according to an embodiment.

FIG. 11A includes a perspective view illustration of an apparatus used to form a batch of abrasive articles via additive manufacturing according to an embodiment. In particular, the apparatus can include a build box 1101 configured to contain loose powder material that can be formed in one or more layers and further processed (e.g., selective deposition of a binder material) to form abrasive articles (or bodies) including, for example, a first body 1103, a second body 1104, a third body 1105 and a fourth body 1106 (the bodies 1103-1106) contained in a build box 1101. According to an embodiment herein, the placement and/or orientation of the bodies 1103-1106 within in the build box 1101 may be carefully selected to minimize undesirable manufacturing defects. Studies conducted by the Applicants have surprisingly demonstrated that products made in large-sized build beds can have different part quality based upon their position in the build box and relative to each other. As a single dimension (e.g., length, width or depth) of the build box changes, the change on the area and volume of powder that must be correctly processed increases exponentially.

According to one aspect, the process can continue at step 1003, forming the first body and the second body in a controlled position and/or orientation relative to each other which may include selecting a first position in the build box for a first abrasive article and selecting a second position in the build box for a second abrasive article, where the first position and second position are based on evaluating the placement characteristic data. In one embodiment, each abrasive article (e.g., bodies 1103-1106) of the batch may have a particular three-space position and orientation within the build box 1101, such that each abrasive article 1103-1106 may have a particular position in an X-Y plane defined by the length and the width dimensions of the build box 1101, a position in an X-Z plane defined by the length and depth dimensions of the build box 1101, and a position in a Y-Z plane defined by the width and depth dimensions of the build box 1101.

Figure 12A:
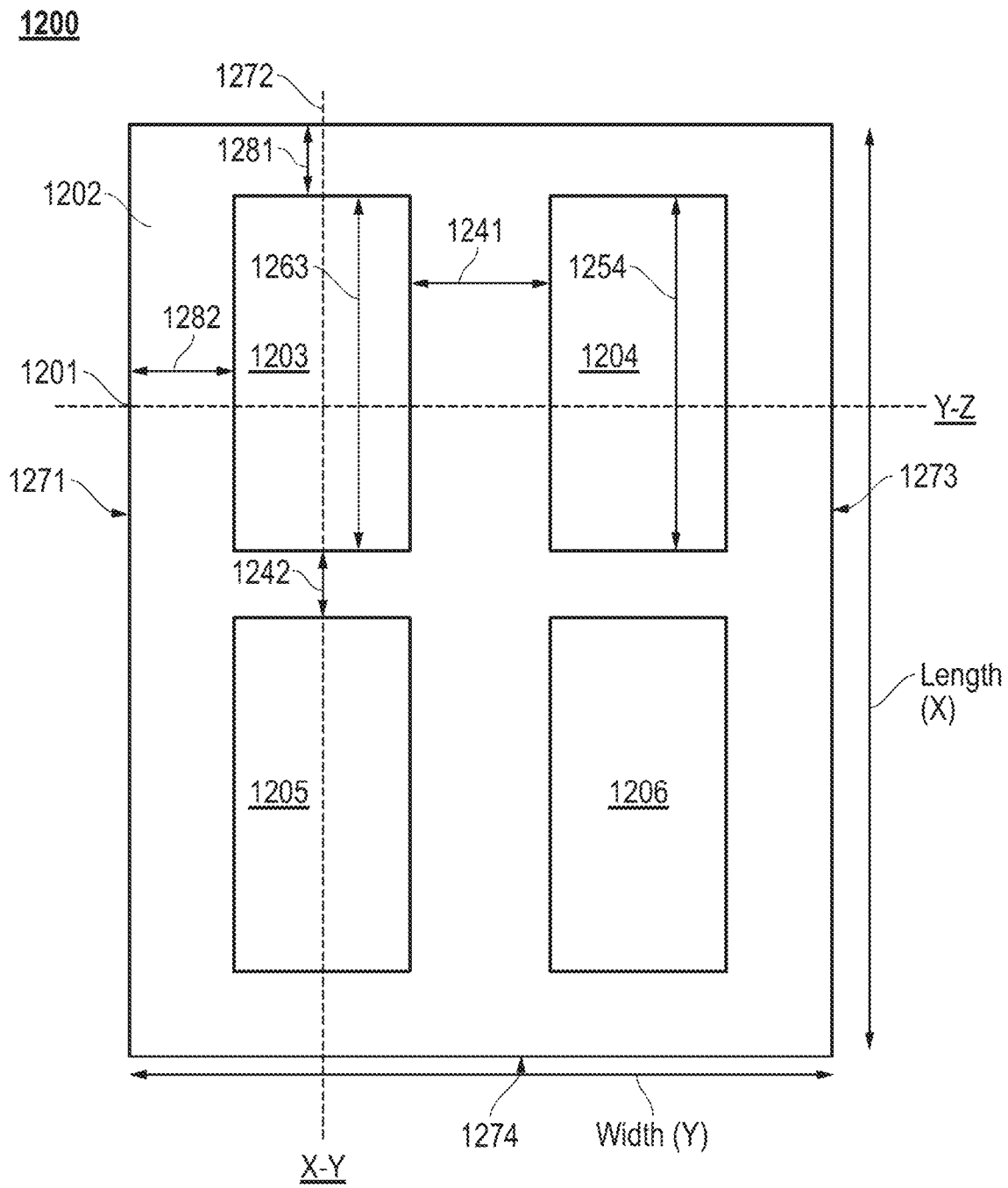
FIG. 12A includes a top-down view illustration of an apparatus for forming abrasive articles according to an additive manufacturing process.

FIG. 12A includes a top-down view illustration of an apparatus 1200 for forming abrasive articles according to an additive manufacturing process. The apparatus 1200 includes a build box 1201 including a bed of loose powder 1202 and abrasive articles 1203, 1204, 1205, and 1206 (i.e., the bodies 1203-1206) contained in the bed of loose powder 1202. The bodies 1203-1206 may be portions of the bed of loose powder 1202 that have been bound via a binder that is selectively deposited in the regions of the bed of loose powder 1202 that define the bodies 1203-1206.

In an embodiment, the thickness of the green body may facilitate improved manufacturing and/or performance of the abrasive article. In an embodiment, the thickness of the green body may be at least 0.1 microns such as at least 0.5 microns or at least 1 micron or at least 2 microns or at least 5 microns or at least 10 microns or at least 20 microns or at least 30 microns or at least 40 microns or at least 50 microns or at least 100 microns or at least 200 microns or at least 300 microns or at least 500 microns or at least 1000 microns or at least 3000 microns or at least 5000 microns or at least 1 cm or at least 5 cm or at least 10 cm or at least 15 cm or at least 25 cm or at least 30 cm or at least 40 cm or at least 50 cm. In still other embodiment, the length of the green body may be not greater than 100 cm or not greater than 90 cm or not greater than 80 cm or not greater than 70 cm. It will be appreciated the green body may have a thickness between any of the minimum and maximum values noted above, including for example, but not limited to, within a range of at least 0.1 microns to not greater than 100 cm or within a range of at least 0.5 microns to not greater than 70 cm. It will be appreciated that each body of a plurality of abrasive bodies in a batch of abrasive articles may have a thickness of any of the values noted above with respect to the thickness of the green body.

In an embodiment, the length of the green body may facilitate improved manufacturing and/or performance of the abrasive article. In an embodiment, the length of the green body may be at least 1 cm or at least 3 cm or at least 4 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm. In still other embodiment, the length of the green body may be not greater than 100 cm such as not greater than 90 cm or not greater than 80 cm or not greater than 70 cm or not greater than 60 cm or not greater than 50 cm or not greater than 40 cm or not greater than 30 cm or not greater than 25 cm. It will be appreciated the green body may have a length between any of the minimum and maximum values noted above, including for example, but not limited to, within a range of at least 1 cm to not greater than 100 cm or within a range of at least 8 cm to not greater than 50 cm. It will be appreciated that each body of a plurality of abrasive bodies in a batch of abrasive articles may have a length of any of the values noted above with respect to the length of the green body.

In an embodiment, the width of the green body may facilitate improved manufacturing and/or performance of the abrasive article. In an embodiment, the width of the green body may be at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm. In still other embodiment, the length of the green body may be not greater than 500 cm such as not greater than 450 cm or not greater than 400 cm or not greater than 350 cm or not greater than 300 cm or not greater than 250 cm or not greater than 200 cm or not greater than 150 cm or not greater than 100 cm. It will be appreciated the green body may have a width between any of the minimum and maximum values noted above, including for example, but not limited to, within a range of at least 1 cm to not greater than 100 cm or within a range of at least 8 cm to not greater than 50 cm. It will be appreciated that each body of a plurality of abrasive bodies in a batch of abrasive articles may have a width of any of the values noted above with respect to the width of the green body.

In an embodiment, the green body may have a primary aspect ratio (length:width) that may facilitate improved manufacturing and/or performance of the abrasive article. In an embodiment, the green body may have a primary aspect ratio (length:width) of at least 1:1 such as at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1. In still other embodiment, the green body may have a primary aspect ratio (length:width) of not greater than 10000:1 or not greater than 5000:1 or not greater than 1000:1 or not greater than 500:1 or not greater than 200:1 or not greater than 100:1 or not greater than 50:1. It will be appreciated the green body may have a primary aspect ratio (length:width) between any of the minimum and maximum values noted above, including for example, but not limited to, within a range of at least 1:1 to not greater than 10000:1 cm or within a range of at least 6:1 to not greater than 200:1. It will be appreciated that each body of a plurality of abrasive bodies in a batch of abrasive articles may have a primary aspect ratio (length:width) of any of the values noted above with respect to the primary aspect ratio (length:width) of the green body.

In an embodiment, the green body may have a secondary aspect ratio (length:thickness) that may facilitate improved manufacturing and/or performance of the abrasive article. In an embodiment, the green body may have a secondary aspect ratio (length:thickness) of at least 1:1 such as at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1. In still other embodiment, the green body may have a secondary aspect ratio (length:thickness) of not greater than 10000:1 or not greater than 5000:1 or not greater than 1000:1 or not greater than 500:1 or not greater than 200:1 or not greater than 100:1 or not greater than 50:1. It will be appreciated the green body may have a secondary aspect ratio (length:thickness) between any of the minimum and maximum values noted above, including for example, but not limited to, within a range of at least 1:1 to not greater than 10000:1 cm or within a range of at least 6:1 to not greater than 200:1. It will be appreciated that each body of a plurality of abrasive bodies in a batch of abrasive articles may have a secondary aspect ratio (length:thickness) of any of the values noted above with respect to the secondary aspect ratio (length:thickness) of the green body.

In an embodiment, the green body may have a tertiary aspect ratio (width:thickness) that may facilitate improved manufacturing and/or performance of the abrasive article. In an embodiment, the green body may have a tertiary aspect ratio (width:thickness) of at least 1:1 such as at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1. In still other embodiment, the green body may have a tertiary aspect ratio (width:thickness) of not greater than 10000:1 or not greater than 5000:1 or not greater than 1000:1 or not greater than 500:1 or not greater than 200:1 or not greater than 100:1 or not greater than 50:1. It will be appreciated the green body may have a tertiary aspect ratio (width:thickness) between any of the minimum and maximum values noted above, including for example, but not limited to, within a range of at least 1:1 to not greater than 10000:1 or within a range of at least 6:1 to not greater than 200:1. It will be appreciated that each body of a plurality of abrasive bodies in a batch of abrasive articles may have a tertiary aspect ratio (width:thickness) of any of the values noted above with respect to the tertiary aspect ratio (width:thickness) of the green body.

In still another embodiment, the green body has a length, a width, and a thickness, and wherein length≥width≥thickness. In still another embodiment, each body of the plurality of bodies has a length, a width, and a thickness, and wherein length≥width≥thickness.

In an embodiment, the green body may have a solid volume that may facilitate improved manufacturing and/or performance of the abrasive article. In an embodiment, the green body may have a solid volume of at least 9 cm$^3$ such as at least 10 cm$^3$ or at least 11 cm$^3$ or at least 12 cm$^3$ or at least 13 cm$^3$ or at least 14 cm$^3$ or at least 15 cm$^3$ or at least 16 cm$^3$ or at least 17 cm$^3$ or at least 18 cm$^3$ or at least 19 cm$^3$ or at least 20 cm$^3$ or at least 21 cm$^3$ or at least 22 cm$^3$ or at least 23 cm$^3$ or at least 24 cm$^3$ or at least 25 cm$^3$ or at least 26 cm$^3$ or at least 27 cm$^3$ or at least 28 cm$^3$ or at least 29 cm$^3$ or at least 30 cm$^3$ or at least 31 cm$^3$ or at least 32 cm$^3$ or at least 33 cm$^3$ or at least 34 cm$^3$ or at least 35 cm$^3$ or at least 36 cm$^3$ or at least 37 cm$^3$ or at least 38 cm$^3$ or at least 39 cm$^3$, or at least 40 cm$^3$ or at least 42 cm$^3$ or at least 44 cm$^3$ or at least 46 cm$^3$ or at least 48 cm$^3$ or at least 50 cm$^3$. In still other embodiment, the green body may have a solid volume of not greater than 5000 cm$^3$ or not greater than 4000 cm$^3$ or not greater than 3000 cm$^3$ or not greater than 2000 cm$^3$ or not greater than 1000 cm$^3$ or not greater than 800 cm$^3$ or not greater than 600 cm$^3$ or not greater than 500 cm$^3$. It will be appreciated the green body may have a solid volume between any of the minimum and maximum values noted above, including for example, but not limited to, within a range of at least 9 cm$^3$ to not greater than 5000 cm$^3$ or within a range of at least 25 cm$^3$ to not greater than 1000 cm$^3$.

In an embodiment, the length of the build box may facilitate improved manufacturing and/or performance of the abrasive article. In an embodiment, the length of the build box may be at least 160 mm such as at least 170 mm or at least 180 mm or at least 190 mm or at least 200 mm or at least 210 mm or at least 220 mm or at least 230 mm or at least 240 mm or at least 250 mm or at least 260 mm or at least 270 mm or at least 280 mm or at least 290 mm or at least 300 mm or at least 310 mm or at least 320 mm or at least 330 mm or at least 340 mm or at least 350 mm or at least 360 mm or at least 370 mm or at least 380 mm or at least 390 mm or at least 400 mm. In still other embodiment, the length of the build box may be not greater than 3000 mm such as or not greater than 2000 mm or not greater than 1000 mm. It will be appreciated the build box may have a length between any of the minimum and maximum values noted above, including for example, but not limited to, within a range of at least 160 mm to not greater than 3000 mm or within a range of at least 200 mm to not greater than 1000 mm.

In an embodiment, the width of the build box may facilitate improved manufacturing and/or performance of the abrasive article. In an embodiment, the width of the build box may be at least 65 mm or at least 70 mm or at least 80 mm or at least 90 mm or at least 100 mm or at least 110 mm or at least 120 mm or at least 130 mm or at least 140 mm or at least 150 mm or at least 160 mm or at least 170 mm or at least 180 mm or at least 190 mm or at least 200 mm or at least 210 mm or at least 220 mm or at least 230 mm or at least 240 mm or at least 250 mm. In still other embodiment, the length of the build box may be not greater than 2000 mm such as or not greater than 1500 mm or not greater than 1000 mm. It will be appreciated the build box may have a width between any of the minimum and maximum values noted above, including for example, but not limited to, within a range of at least 65 mm to not greater than 2000 mm or within a range of at least 200 mm to not greater than 1000 mm.

In an embodiment, the depth of the build box may facilitate improved manufacturing and/or performance of the abrasive article. In an embodiment, the depth of the build box may be at least 65 mm or at least 70 mm or at least 80 mm or at least 90 mm or at least 100 mm or at least 110 mm or at least 120 mm or at least 130 mm or at least 140 mm or at least 150 mm or at least 160 mm or at least 170 mm or at least 180 mm or at least 190 mm or at least 200 mm or at least 210 mm or at least 220 mm or at least 230 mm or at least 240 mm or at least 250 mm. In still other embodiment, the length of the build box may be not greater than 2000 mm such as or not greater than 1500 mm or not greater than 1000 mm. It will be appreciated the build box may have a depth between any of the minimum and maximum values noted above, including for example, but not limited to, within a range of at least 65 mm to not greater than 2000 mm or within a range of at least 200 mm to not greater than 1000 mm. In an embodiment, the depth of the build box may facilitate improved manufacturing and/or performance of the abrasive article. In an embodiment, the depth of the build box may be at least 65 mm or at least 70 mm or at least 80 mm or at least 90 mm or at least 100 mm or at least 110 mm or at least 120 mm or at least 130 mm or at least 140 mm or at least 150 mm or at least 160 mm or at least 170 mm or at least 180 mm or at least 190 mm or at least 200 mm or at least 210 mm or at least 220 mm or at least 230 mm or at least 240 mm or at least 250 mm. In still other embodiment, the length of the build box may be not greater than 2000 mm such as or not greater than 1500 mm or not greater than 1000 mm. It will be appreciated the build box may have a depth between any of the minimum and maximum values noted above, including for example, but not limited to, within a range of at least 65 mm to not greater than 2000 mm or within a range of at least 200 mm to not greater than 1000 mm.

For another aspect, the batch of plurality of abrasive articles, such as green-body abrasive articles, can include a first abrasive article 1203 (e.g., green body abrasive article or body 1203) at a first position in the build box 1201 having a three space position defined by the body in one or more X-Y planes, the X-Z planes and the Y-Z planes as defined by the dimension of the build box 1201. The batch of abrasive articles may further include a second abrasive article 1204 having a second position in the build box 1201 having a three space position defined by the body in one or more X-Y planes, the X-Z planes, and the Y-Z planes as defined by the dimension of the build box 1201. For example, in one embodiment, the abrasive articles can have at least one of an X-Y spacing distance, an X-Z spacing distance, a Y-Z spacing distance or a combination thereof with respect to each other. According to an embodiment, the abrasive articles 1203 and 1204 may be formed in the build box 1201 such that they have a controlled distance between each other, and in particular, an X-Y spacing distance 1241 defined as the shortest distance between the immediately adjacent abrasive articles 1203 and 1204 in an X-Y plane that is substantially parallel to the dimensions of length and width of the build box 1201. In another embodiment, the abrasive articles 1203 and 1205 may be formed in the build box 1201 such that they have a controlled distance between each other, and in particular, an X-Y spacing distance 1242 defined as the shortest distance between the immediately adjacent abrasive articles 1203 and 1205 in an X-Y plane that is substantially parallel to the dimensions of length and width of the build box 1201.

According to one embodiment, any two immediately adjacent abrasive articles can have a spacing distance (X-Y spacing distance, X-Z spacing distance, or Y-Z spacing distance) that can be at least 0.01% of the length 1253 of the first abrasive article 1203 or the length 1254 of the second abrasive article 1204, whichever is the greater value. In yet another non-limiting embodiment, any one or more spacing distances between two immediately adjacent abrasive articles can be at least 0.1% or at least 1% or at least 5% or at least 10% or at least 15% or at least 20% or at least 25% or at least 30% or at least 35% or at least 40% or at least 45% or at least 50% or at least 60% or at least 65% or at least 70% or at least 75% or at least 80% or at least 85% or at least 90% or at least 95% or at least 100% or at least 125% or at least 150% or at least 175% or at least 200%. In another non-limiting embodiment, the spacing distance between any two or more immediately adjacent abrasive articles can be not greater than 2000% of the length of the first abrasive article or the second abrasive article (whichever is greater), such as not greater than 1500% or not greater than 1000% or not greater than 800% or not greater than 500% or not greater than 200% or not greater than 100% or not greater than 90% or not greater than 80% or not greater than 70%. It will be appreciated that the spacing distance can be within a range including any of the minimum and maximum values noted above.

According to another embodiment, the position of the abrasive articles relative to one or more immediately adjacent walls (e.g., walls 1271, 1272, 1273, and 1274) of the build box 1201 can be controlled to improve the properties of the abrasive articles. In one aspect, the process further includes controlling at least one of a batch density variation and/or a batch volumetric form factor of the batch of abrasive articles based on the relative position and/or orientation of at least two of the abrasive articles relative to one or more walls of a build box. For example, a first abrasive article 1203 can be at a first position in the build box 1201 having a three space position defined by the body in one or more X-Y planes, the X-Z planes, and the Y-Z planes as defined by the dimension of the build box 1201. The first abrasive article 1203 may also be spaced away from an interior surface of the wall 1272 by an X-Y wall spacing distance 1281, which is defined as the shortest distance between any point on the abrasive article 1203 and the interior surface of the wall 1272 in the X-Y plane defined by the length and width of the build box 1201.

According to one embodiment, any wall spacing distance (X-Y spacing distance, X-Z spacing distance, or Y-Z spacing distance) for any abrasive article in the build box relative to a wall (wall or bottom surface) of the build box can be at least 0.01% of the length of the abrasive article. In yet another non-limiting embodiment, any wall spacing distance can be at least 0.1% or at least 1% or at least 5% or at least 10% or at least 15% or at least 20% or at least 25% or at least 30% or at least 35% or at least 40% or at least 45% or at least 50% or at least 60% or at least 65% or at least 70% or at least 75% or at least 80% or at least 85% or at least 90% or at least 95% or at least 100% or at least 125% or at least 150% or at least 175% or at least 200%. In another non-limiting embodiment, the wall spacing distance can be not greater than 2000% of the length of the abrasive article, such as not greater than 1500% or not greater than 1000% or not greater than 800% or not greater than 500% or not greater than 200% or not greater than 100% or not greater than 90% or not greater than 80% or not greater than 70%. It will be appreciated that the wall spacing distance can be within a range including any of the minimum and maximum values noted above.

In an embodiment, the green body or plurality of green bodies defining a batch may have a volume that is at least 1% of the volume of the build box such as at least 2% or at least 3% or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% of the volume of the build box. In still other embodiment, the green body or plurality of green bodies defining a batch may have a volume that is not greater than 99% of the volume of the build box such as not greater than 90% or not greater than 85% or not greater than 80% or not greater than 75% or not greater than 70% or not greater than 65% or not greater than 60% of the volume of the build box. In an embodiment, the green body or plurality of green bodies defining a batch may have a volume that is within a range of at least 1% of the volume of the build box to not greater than 99% of the volume of the build box or within a range at least 10% to not greater than 60% of the volume of the build box.

Figure 12B:
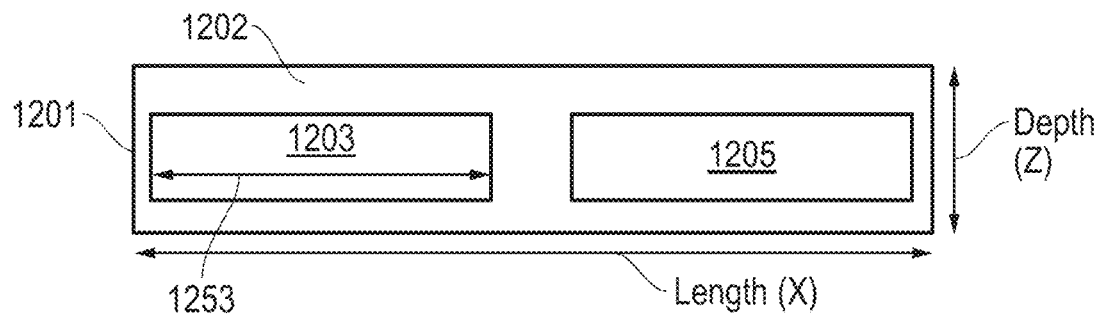
FIG. 12B includes an illustration along a plane X-Z of the apparatus of for forming abrasive articles according to an additive manufacturing process.
Figure 12C:
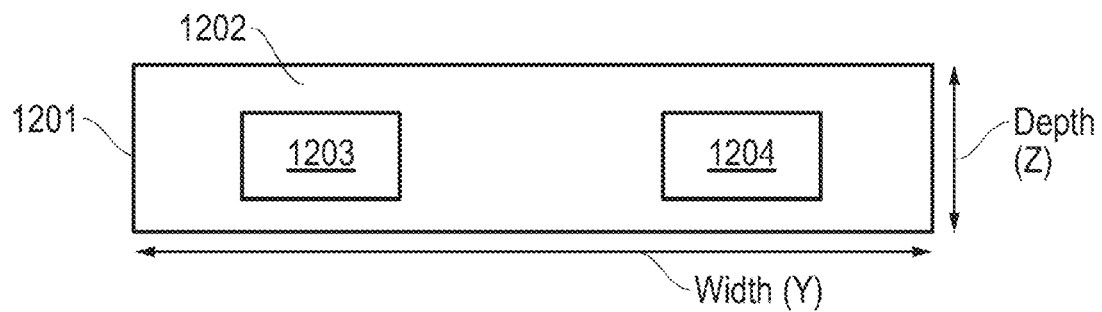
FIG. 12C includes an illustration along a plane Y-Z of the apparatus of for forming abrasive articles according to an additive manufacturing process.

According to another embodiment, the batch of abrasive articles may further include one or more abrasive articles having a controlled rotational orientation in any of the planes (i.e., X-Y planes, the X-Z planes, and the Y-Z planes). The rotational orientation of the abrasive article can be the angle between a longitudinal axis of the abrasive article and the longest dimension of reference for a given plane. For example, referring to FIG. 12A, the abrasive article 1203 has a length defined by the longitudinal axis 1253 which has an X-Y plane rotational orientation of 0 degrees, as the longitudinal axis 1253 is aligned with the longest dimension (length) of the X-Y plane. Using the illustrations of FIGS. 12B and 12C, the abrasive article 1203 has an X-Z rotational orientation of 0 degrees (i.e., a longitudinal axis 1253 aligned with the length of the build box). See, FIG. 12B as a view of the apparatus 1200 of FIG. 12A along the plane X-Z. The abrasive article 1203 has a Y-Z rotational orientation of 90 degrees, as the longitudinal axis 1253 is substantially perpendicular to the width (extending out of the page), which is the longer dimension of the build box in the Y-Z plane. See, FIG. 12C as a view of the apparatus 1200 of FIG. 12A along the plane Y-Z.

The processes of the embodiments herein are developed by empirical studies that have identified certain elements leading to improved abrasive articles. One non-limiting example of a property of the abrasive articles (green or finally-formed) that may be improved includes batch density variation. According to one embodiment, the process may facilitate formation of a batch of abrasive articles having a batch density variation of not greater than 20% of an average density value of the batch or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the batch density variation mat be at least 0.00001% or at least 0.0001%. It will be appreciated the batch density variation may be between any of the minimum and maximum values noted above, including for example, but not limited to, within a range of at least 0.00001% to not greater than 20% of an average density value of the batch or within a range of at least 0.0001% to not greater than 10% of an average density value of the batch The batch density variation is calculated by measuring the density of each body of the plurality of bodies made via a single operation, wherein the batch density variation is a measure of the percent difference between an average density value of the batch and a density value from a body having the greatest difference, plus or minus, in density from the average density value of the batch. Note that multiple density values can be taken for each body of the plurality of bodies in the batch, and any of the density values taken from a body is relevant for comparison and calculation of the batch density variation. Each density value of the body may be averaged to create an average body density value for each discrete body in the batch. The average batch density value can be calculated by averaging the average density values for each body of the batch. The number of density values for a body or batch should be of a suitable statistically relevant sample size.

The method for forming a batch of abrasive articles as described in the embodiments herein may also be suitable for minimizing a batch volumetric form factor. Some data indicates that the batch volumetric form factor of the abrasive articles may be impacted by the position and/or orientation of the abrasive articles relative to each other and/or the position and/orientation of the abrasive articles relative to the walls of the build box. According to one embodiment, the embodiments herein may facilitate formation of a batch of abrasive articles having a batch volumetric form factor (batch Vff) of not greater than 0.30, such as not greater than 0.25 or not greater than 0.20 or not greater than 0.18 or not greater than 0.16 or not greater than 0.14 or not greater than 0.12 or not greater than 0.10 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01 or not greater than 0.009 or not greater than 0.008 or not greater than 0.007 or not greater than 0.006 or not greater than 0.005. Still, in another non-limiting embodiment, the batch Vff can be at least 0.00001 or at least 0.0001 or at least 0.0005 or at least 0.001 or at least 0.01 or at least 0.1 or at least 0.2 or at least 0.4 or at least 0.6. It will be appreciated that the batch Vff can be within a range including any of the minimum and maximum values noted above, including for example, but not limited to within a range of at least 0.00001, and not greater than 0.3, such as within a range of at least 0.00001 and not greater than 0.2, or within a range of at least 0.00001 and not greater than 0.05, or even within a range of at least 0.00001 and not greater than 0.01. The batch Vff can be measured as described herein.

According to another aspect, a batch of abrasive articles, which may be green body abrasive articles or finally-formed abrasive articles may have a particular batch volumetric form factor variation. The batch volumetric form factor variation (batch Vff) can be the standard deviation of the volumetric form factor for a batch of abrasive articles. According to one embodiment, the batch Vff can be not greater than 0.30, such as not greater than 0.25 or not greater than 0.20 or not greater than 0.18 or not greater than 0.16 or not greater than 0.14 or not greater than 0.12 or not greater than 0.10 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01 or not greater than 0.009 or not greater than 0.008 or not greater than 0.007 or not greater than 0.006 or not greater than 0.005. Still, in one non-limiting embodiment, the batch Vff can be at least 0.00001 or at least 0.0001 or at least 0.0005 or at least 0.001 or at least 0.01 or at least 0.1 or at least 0.2 or at least 0.4 or at least 0.6. It will be appreciated that the batch Vff can be within a range including any of the minimum and maximum values noted above, including for example, but not limited to within a range of at least 0.00001 and not greater than 0.3, such as within a range of at least 0.00001 and not greater than 0.2 or within a range of at least 0.00001 and not greater than 0.05 or even within a range of at least 0.00001 and not greater than 0.01.

According to one embodiment, the process may include using at least 10% of the total volume of powder material in the build box to form a batch of abrasive articles while minimizing at least one of a batch density variation and/or a batch volumetric form factor of the batch of abrasive articles. In another embodiment, the method for forming the batch of abrasive articles may include using at least 15% of the total volume of the powder material in the build box to form the batch, such as at least 20% or at least 25% or at least 30% or at least 35% or at least 40% or at least 45% or at least 50% or at least 55% or at least 60% or at least 65% or at least 70% or at least 75% or at least 80% or at least 85%. Still, in one non-limiting embodiment, the method may include using not greater than 99% of the total volume of powder material in the build box to form a batch of abrasive articles, such as not greater than 95% or not greater than 90% or not greater than 85% or not greater than 80%. It will be appreciated that the volume of powder material used to form the batch of abrasive articles may be within a range including any of the minimum and maximum percentages noted above.

In one non-limiting embodiment, the method may include controlling the position and/or orientation of two or more abrasive articles of a batch relative to each other in the build box and more particularly with respect to a direction of translation of a compacting object. It will be appreciated that for any of the embodiments herein a compaction object can be configured to traverse one or more layers of powder material and apply a force sufficient to compact the one or more layers and reduce the thickness of the one or more layers. As used herein, a direction of translation of the compacting object is generally in a direction that is parallel to the length of the build box or in a direction that is parallel to a width of the build box.

According to one embodiment, the process can include forming one or more bodies each having a longitudinal axis that is substantially parallel to a direction of translation of a compaction object. For example, referring to FIG. 12A, the longitudinal axes 1253 and 1254 are substantially parallel to the direction of the length of the build box 1201, wherein the dimension of length may also define the direction of translation of a compaction object. Still, in an alternative embodiment, one or more bodies may each have a longitudinal axis that is substantially perpendicular to a direction of translation of a compaction object. Substantially perpendicular is used to mean the same thing as described in other embodiments herein. For example, referring again to FIG. 12A, if the direction of translation is parallel to the width, the longitudinal axes 1253 and 1254 are substantially perpendicular. In still another non-limiting embodiment, one or more bodies can be formed such that their longitudinal axes are angled with respect to a direction of translation of a compaction object within a range of at least 6 degrees and not greater than 84 degrees.

As described in embodiments herein, it will be appreciated that the method can include forming a green body abrasive article comprising the precursor bond material and abrasive particles, wherein forming is conducted by a) creating one or more layers of the powder material; b) selectively binding portions of the one or more layers with a binder material, and c) converting the binder material to at least partially solidify the binder material and bind portions of powder material from the one or more layers.

According to one embodiment, the method may further include moving a compaction object over the one or more layers of powder material to apply a force sufficient to compact the layer to a compacted layer thickness that is less than the thickness of the layer prior to compaction. In another non-limiting aspect, the method may further include controlling at least one of the following: a) a force applied by a compaction object to the layer or a plurality of layers of powder; b) a traverse speed of a compaction object; c) average thickness of the layer prior to compaction; d) a particle size distribution of the powder; e) number of previously formed layers underlying the layer of powder; f) the number of compacted layers underlying the layer of powder; g) the density of any layers underlying the layer of powder; h) the amount of binder in any layers underlying the layer of powder; i) the relative dimensions of the layer relative to one or more layers underlying the layer; or any combination of a)-i). In certain instances, the method may include selecting the relative positions and/or orientations of a first abrasive article and a second abrasive article based on any one or more elements of a)-i) noted above.

In another non-limiting embodiment, the distribution of any one or more features of the abrasive articles can be evaluated. The shape of the distribution for such measured features, particularly dimensional features, may be evaluated via kurtosis.

The methods of the embodiments herein facilitate improved formation of abrasive articles. Notably, the empirical studies conducted by the Applicant facilitate methods that have a superior forming ratio (Add/Sub), which can define the ratio of the material added to form the body versus the material subtracted in any post-forming finishing techniques. The methods of the embodiments herein facilitate a forming ratio that is advantageous compared to conventional forming techniques and/or less sophisticated additive manufacturing techniques.

The improvement in forming ratio is also evident in the limited residual stress and/or subsurface damage on one or more exterior surfaces of the finally-formed abrasive articles. Given the enhancements in the forming process, much less effort, if any, is needed to finish the abrasive articles to suitable shapes and/or tolerances for their intended applications. Accordingly, the amount of residual stress and/or subsurface damage in the finally-formed abrasive articles is less as compared to conventional products or other less sophisticated additive manufacturing techniques.

In a particular embodiment, the body or method for forming the body defines a forming ratio (Add/Sub) of at least 10, wherein "Add" defines the volume of solid material (cm3) formed via additive processes used to form the body and "Sub" defines the volume (cm3) of solid material formed via a subtractive process to finish the finally-formed body, such as at least 20 or at least 50 or at least 80 or at least 100 or at least 200 or at least 300 or at least 400 or at least 500 or at least 600 or at least 700 or at least 800 or at least 1000 or at least 5000 or at least 10000.

In an embodiment, the finally-formed abrasive articles of a batch may have a residual stress in an exterior surface from post-forming operations that is at least 1% less than residual stress in conventionally-formed abrasive articles, such as at least 2% less or at least 3% less or at least 4% less or at least 5% less or at least 6% less or at least 7% less or at least 8% less or at least 9% less or at least 10% less or at least 11% less or at least 12% less or at least 13% less or at least 14% less or at least 15% less or at least 16% less or at least 17% less or at least 18% less or at least 19% less or at least 20% less or at least 25% less or at least 30% less or at least 35% less or at least 40% less or at least 45% less or at least 50% less or at least 55% less or at least 60% less or at least 65% less or at least 70% less or at least 75% less or at least 80% less or at least 85% less or at least 90% less or at least 95% less or at least 100% less. In still another embodiment, the finally-formed abrasive articles of a batch may have a residual stress in an exterior surface from post-forming operations that is not greater than 500% less than residual stress in conventionally-formed abrasive articles, such as not greater than 400% less or not greater than 300% less or not greater than 200% less or not greater than 100% less or not greater than 90% less.

In an embodiment, the finally-formed abrasive articles of a batch may have subsurface damage or residual stress that extends for at least 0.01% and not greater than 200% of an average particle size (D50) of the abrasive particles, such as at least 0.05% of the D50 of the abrasive particles or at least 0.08% or at least 0.1% or at least 0.5% or at least 1% or at least 2% or at least 3% or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% or at least 100% or at least 102% or at least 105% or at least 108% or at least 110% or at least 115% or at least 120% or at least 125% or at least 130% or at least 140% or at least 150% or at least 160% or at least 170% or at least 180% of the D50 of the abrasive particles. In still another embodiment, the subsurface damage or residual stress extends for a distance below an exterior surface of the body for not greater than 190% of the D50 of the abrasive particles or not greater than 180% or not greater than 170% or not greater than 160% or not greater than 150% or not greater than 140% or not greater than 130% or not greater than 120% or not greater than 110% or not greater than 100% or not greater than 90% or not greater than 80% or not greater than 70% or not greater than 60% or not greater than 50% or not greater than 40% or not greater than 30% or not greater than 20% or not greater than 10% of the D50 of the abrasive particles.

In an embodiment, an abrasive article made herein may include a fixed abrasive such as a bonded abrasive article having abrasive particles contained in a three-dimensional volume of bond material, where the bond material substantially surrounds a majority of the abrasive particles. In still another embodiment, an abrasive article made herein may include a fixed abrasive such as a single-layered abrasive article wherein a substantially single layer of abrasive particles is contained in a layer of bond material.

The foregoing properties of the abrasive articles of the embodiments herein provide various methods to define the quality and size of the abrasive articles capable of being formed using the methods of the embodiments herein.

EMBODIMENTS

Embodiment 1. A method for forming a batch of abrasive articles via additive manufacturing from a powder bed of raw material, wherein the process includes controlling at least one of a batch density variation and/or a batch volumetric form factor of the batch of abrasive articles based on the position and/or orientation of at least two of the abrasive articles relative to each other.

Embodiment 2. The method of Embodiment 1, wherein the process includes:
  evaluating placement characteristic data of one or more abrasive articles in the batch of abrasive articles;
  selecting a first position in the build box for a first abrasive article and selecting a second position in the build box for a second abrasive article, wherein the first position and second position are based on evaluating the placement characteristic data.

Embodiment 3. The method of Embodiment 2, wherein evaluating placement characteristic data includes accessing placement characteristic data related to at least one of a two-dimensional shape of the first abrasive article, a three-dimensional shape of the first abrasive article, a volume of the first abrasive article, an intended density of the first abrasive article, historical data, batch size, or any combination thereof.

Embodiment 4. The method of Embodiment 3, wherein historical data includes information of prior additive manufacturing operations including data related to the features of the abrasive articles and properties of the abrasive articles.

Embodiment 5. The method of Embodiment 4, wherein the features include data related to the size, shape, composition, and microstructure of the abrasive articles.

Embodiment 6. The method of Embodiment 4, wherein the properties include data related to the density, strength, hardness, modulus or rupture (MOR), volumetric form factor, and any other properties of the green bodies or finally-formed bodies according to the embodiments herein.

Embodiment 7. The method of Embodiment 2, wherein evaluating placement characteristic data includes accessing placement characteristic data related to at least one of a two-dimensional shape of the second abrasive article, a three-dimensional shape of the second abrasive article, a volume of the second abrasive article, an intended density of the second abrasive article, historical data, batch size, or any combination thereof.

Embodiment 8. The method of Embodiment 2, wherein selecting the first and second positions in the build box is part of a process for building a packing model for the batch of abrasive articles.

Embodiment 9. The method of Embodiment 2, further comprising:
    evaluating the placement characteristic data includes accessing placement characteristic data for two or more abrasive articles to be formed;
    comparing the placement characteristic data to historical data; and creating a packing model for the batch of abrasive articles based on the placement characteristic data and historical data.

Embodiment 10. The method of Embodiment 9, wherein the packing model is used to control the selective deposition of a binder material onto one or more layers of powder material to form at least a portion of a green abrasive article.

Embodiment 11. The method of Embodiment 9, further comprising creating a packing model for the batch of abrasive articles based on the placement characteristics, historical data, and build box dimensions.

Embodiment 12. The method of Embodiment 9, further comprising creating a packing model for the batch of abrasive articles based on the placement characteristic data, historical data, build box dimensions, and direction of translation of a compacting object used during manufacturing.

Embodiment 13. The method of Embodiment 2, wherein the first position includes at least a position in an X-Y plane defined by a length and a width of a build box.

Embodiment 14. The method of Embodiment 2, wherein the first position includes at least a position in an X-Z plane defined by a length and a depth of a build box.

Embodiment 15. The method of Embodiment 2, wherein the first position includes at least a position in a Y-Z plane defined by a width and a depth of a build box.

Embodiment 16. The method of Embodiment 2, wherein the second position includes at least a position in an X-Y plane defined by a length and a width of a build box.

Embodiment 17. The method of Embodiment 2, wherein the second position includes at least a position in an X-Z plane defined by a length and a depth of a build box.

Embodiment 18. The method of Embodiment 2, wherein the second position includes at least a position in a Y-Z plane defined by a width and a depth of a build box.

Embodiment 19. The method of Embodiment 2, wherein the first position and the second position can each have at least one of an X-Y spacing distance, an X-Z spacing distance, a Y-Z spacing distance, or a combination thereof with respect to each other.

Embodiment 20. The method of Embodiment 2, wherein the first abrasive article at the first position and the second abrasive article at the second position can each have an X-Y plane rotational orientation, an X-Z plane rotational orientation, a Y-Z plane rotational orientation.

Embodiment 21. The method of Embodiment 9, wherein the process further includes controlling at least one of a batch density variation and/or a batch volumetric form factor of the batch of abrasive articles based on the relative position and/or orientation of at least two of the abrasive articles relative to one or more walls of a build box.

Embodiment 22. The method of Embodiment 21, wherein the first position further includes an X-Y wall spacing distance, an X-Z wall spacing distance, a Y-Z wall spacing distance, or a combination thereof.

Embodiment 23. The method of Embodiment 1, further comprising using at least 10% of the total volume of powder material in a build box to form a batch of abrasive articles while minimizing at least one of a batch density variation and/or a batch volumetric form factor of the batch of abrasive articles.

Embodiment 24. The method of Embodiment 1, wherein the batch density variation is not greater than 20% of an average density value of the batch or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 25. The method of Embodiment 1, wherein the batch volumetric form factor (batch Vff) is not greater than 0.30, such as not greater than 0.25 or not greater than 0.20 or not greater than 0.18 or not greater than 0.16 or not greater than 0.14 or not greater than 0.12 or not greater than 0.10 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01 or not greater than 0.009 or not greater than 0.008 or not greater than 0.007 or not greater than 0.006 or not greater than 0.005.

Embodiment 26. The method of Embodiment 25, wherein the batch Vff can be at least 0.00001 or at least 0.0001 or at least 0.0005 or at least 0.001 or at least 0.01 or at least 0.1 or at least 0.2 or at least 0.4 or at least 0.6.

Embodiment 27. The method of Embodiment 1, further comprising forming a green body abrasive article comprising the precursor bond material and abrasive particles, wherein forming is conducted by:
    a) creating one or more layers of the powder material;
    b) selectively binding portions of the one or more layers with a binder material; and
    c) converting the binder material to at least partially solidify the binder material and bind portions of powder material from the one or more layers.

Embodiment 28. The method of Embodiment 27, further comprising moving a compaction object over the one or more layers of powder material to apply a force sufficient to compact the layer to a compacted layer thickness that is less than the thickness of the layer prior to compaction.

Embodiment 29. The method of Embodiment 28, further comprising controlling at least one of:
    a) a force applied by a compaction object to the layer or a plurality of layers of powder;
    b) a traverse speed of a compaction object;
    c) average thickness of the layer prior to compaction;
    d) a particle size distribution of the powder;

e) number of previously formed layers underlying the layer of powder;
f) the number of compacted layers underlying the layer of powder;
g) the density of any layers underlying the layer of powder;
h) the amount of binder in any layers underlying the layer of powder;
i) the relative dimensions of the layer relative to one or more layers underlying the layer; and
j) any combination of a)-i).

Embodiment 30. The method of Embodiment 29, further comprising selecting the placement and orientation of a first position of a first abrasive article and a second position of a second abrasive article based at least in part on any one or more elements of a)-i).

EXAMPLES

The following non-limiting examples illustrate the present invention.

Example 1

A mixture is prepared by combining two individual dry powder materials: a precursor bond material and abrasive particles. The precursor bond material is a oxide-containing material that forms a vitreous phase material upon further processing.

The additive manufacturing process is conducted according to embodiments described herein. The additive manufacturing process may be characterized as a binder jetting operation, wherein layers of the powder material are deposited into a build box, the layers are smoothed, compacted, and selectively bound with a binder material to form a batch of green body abrasive articles contained a bed of unbound or loose powder. Each of the green body abrasive articles has any one or more of the features claimed in the embodiments herein. The batch of green body abrasive articles has any one or more of the features claimed in the embodiments herein. The green body abrasive article is converted to finally-formed abrasive article via heating as provided below. Example 1 was formed using an ExOne Innovent+. The printing conditions are summarized in Table 1.

TABLE 1

| Parameter | Samples S1 |
| --- | --- |
| Saturation (%) | 10-200% |
| Layer Thickness [μm] | 1-1000 |
| Foundation Layer Count | 0-200 |
| Oscillator on Delay (sec) | 0-20 |
| Dispenser Delay | |
| Dispense coverage parameter (% of bed length for dispensing powder material) | 0-100% |
| Binder Set Time (sec) | 0-30 |
| Recoater Dry Speed (mm/s) | 1-120 |
| Target Bed Temperature (° C.) | 20-100 |
| Recoat Speed (mm/s) | 1-200 |
| Smoothing Roller Rotation Rate(rpm) | 1-1000 |
| Smoothing Roller Speed (mm/s) | 1-200 |
| Binder Droplet Volume (pL)— | 10-80 |
| Binder Droplet Frequency (Hz)— | 955-10,000 |
| Compaction Roller Speed (mm/s) | 1-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm$^3$. The green body abrasive article has a thickness of at least 1 mm.

After forming, the green body is heated at a rate of 5° C./min up to temperature of 550° C. under air, and held for one hour at 550° C. to remove the binder. Thereafter, the air is replaced with argon and the body is heated at a ramp rate of 5° C./min up to a maximum temperature of 1000° C. The temperature is held for four hours at 1000° C., and cooling is conducted at a rate of 5° C./minute.

Example 2

A mixture is prepared by combining two individual dry powder materials: a precursor bond material and abrasive particles. The precursor bond material is a metal-containing material. The process for forming the green body abrasive article of Example 2 is conducted using an ExOne25 Pro. Printing conditions are provided in Table 2 below.

TABLE 2

| Parameter | Samples S2 |
| --- | --- |
| Saturation (%) | 10-200% |
| Layer Thickness [μm] | 1-1000 |
| Foundation Layer Count | 0-200 |
| Oscillator on Delay (sec) | 0-20 |
| Dispenser Delay | |
| Dispense coverage parameter (% of bed length for dispensing powder material) | 0-100% |
| Binder Set Time (sec) | 0-30 |
| Recoater Dry Speed (mm/s) | 1-120 |
| Target Bed Temperature (° C.) | 20-100 |
| Recoat Speed (mm/s) | 1-200 |
| Smoothing Roller Rotation Rate(rpm) | 1-1000 |
| Smoothing Roller Speed (mm/s) | 1-200 |
| Binder Droplet Volume (pL) | 10-80 |
| Binder Droplet Frequency (Hz) | 955-10,000 |
| Compaction Roller Speed (mm/s) | 1-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm$^3$. The green body abrasive article has a thickness of at least 1 mm.

Comparative Example 1

Figure 15:
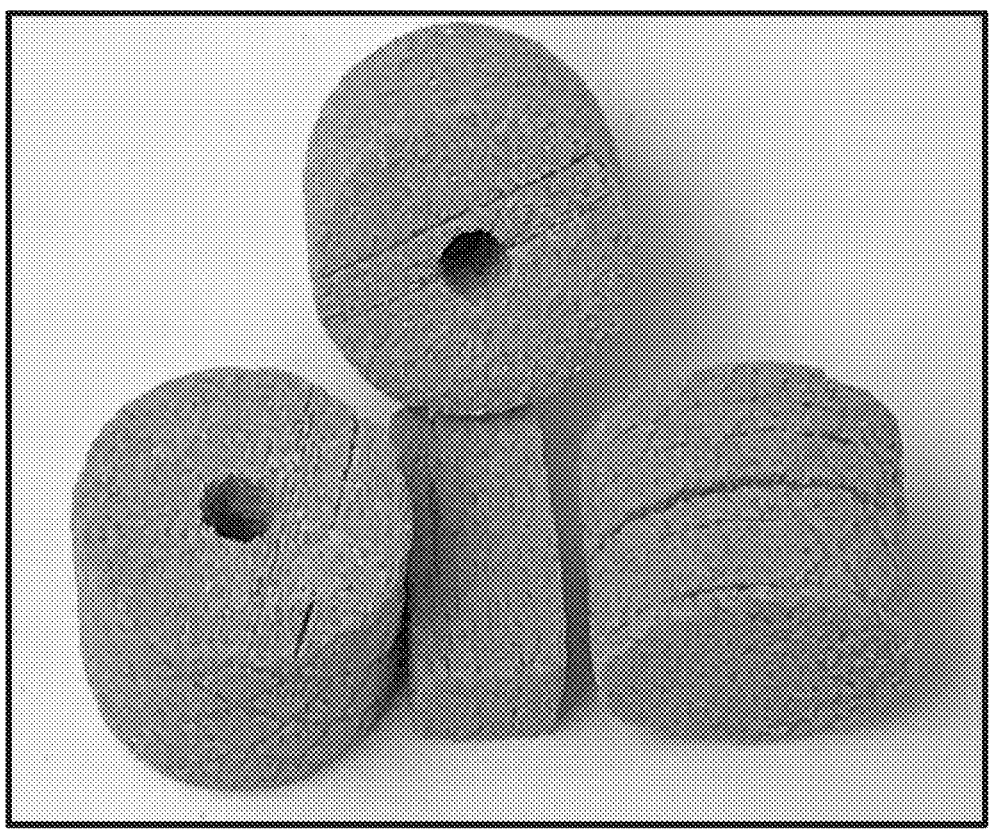
FIG. 15 includes an image of a comparative sample CS1.

A sample was prepared using a binder jetting operation as generally described in Example 1. However, the powder material was 20 wt % of SP1086 glass powder from Specialty Glass Inc., in Oldsmar, Florida, and 80 wt % of 200/230 Mesh, D76 diamond powder from Pinnacle Abrasives (Santa Rosa, CA). The binder used was PM-B-SR1-04 from ExOne. The forming conditions are detailed below in Table 3 and were formed using a Innovent ExOne Printer. FIG. 15 includes images of CS1 samples.

TABLE 3

| Parameter | Samples CS1 |
| --- | --- |
| Saturation (%) | 70 |
| Layer Thickness [μm] | 100 |
| Foundation Layer Count | 5 |
| Oscillator on Delay (sec) | 2 |
| Binder Set (sec) | 1 |
| Dry Time (sec) | 45 |
| Target Temperature (° C.) | 60 |
| Recoat Speed (rpm) | 10 |
| Oscillator Speed (rpm) | 2800 |
| Roller Speed (rpm) | 60 |
| Roller Speed (mm/s) | 1 |

The body was then cured in an ambient atmosphere oven for 2 hours at 195° C. After curing and cooling to 23° C. the cured bodies are placed into a furnace and burned out at 400° C. for 2 hours, followed by sintering at 700° C. for 4 hours, to produce comparative sample CS1.

Sdr and Surface Roughness

The Sdr and surface roughness (Sa) of transverse surfaces and other surfaces of representative samples ("Sample") and Sample CS1 were measured and detailed below in Table 4.

TABLE 4

| Sample | Sdr[%] Transverse | Sdr[%] Top | Sdr[%] Difference | Sa[microns] Transverse | Sa[microns] Top |
| --- | --- | --- | --- | --- | --- |
| Sample | 76.5 | 64.7 | 11.8 | 11 | 9.112 |
| CS1 | 130 | 100 | 30 | | |

Notably, Sample had a much smaller transverse Sdr and Sdr difference than CS1.

Example 3

A mixture is prepared by combining two individual dry powder materials: a precursor bond material and abrasive particles. The precursor bond material is a oxide-containing material that forms a vitreous phase material upon further processing.

The additive manufacturing process is conducted according to embodiments described herein. The additive manufacturing process may be characterized as a binder jetting operation, wherein layers of the powder material are deposited into a build box, the layers are smoothed, compacted, and selectively bound with a binder material to form a batch of green body abrasive articles contained a bed of unbound or loose powder. Each of the green body abrasive articles has any one or more of the features claimed in the embodiments herein. The batch of green body abrasive articles has any one or more of the features claimed in the embodiments herein. The green body abrasive article is converted to finally-formed abrasive article via heating as provided below. Example 3 was formed using an ExOne Innovent+. The printing conditions are summarized in Table 5.

TABLE 5

| Parameter | Samples S3 |
| --- | --- |
| Saturation (%) | 10-200% |
| Layer Thickness [μm] | 1-1000 |
| Foundation Layer Count | 0-200 |
| Oscillator on Delay (sec) | 0-20 |
| Dispenser Delay | |

TABLE 5-continued

| Parameter | Samples S3 |
| --- | --- |
| Dispense coverage parameter (% of bed length for dispensing powder material) | 0-100% |
| Binder Set Time (sec) | 0-30 |
| Recoater Dry Speed (mm/s) | 1-120 |
| Target Bed Temperature (° C.) | 20-100 |
| Recoat Speed (mm/s) | 1-200 |
| Smoothing Roller Rotation Rate(rpm) | 1-1000 |
| Smoothing Roller Speed (mm/s) | 1-200 |
| Binder Droplet Volume (pL)— | 10-80 |
| Binder Droplet Frequency (Hz)— | 955-10,000 |
| Compaction Roller Speed (mm/s) | 1-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm$^3$. The green body abrasive article has a thickness of at least 1 mm.

After forming, the green body is heated at a rate of 5° C./min up to temperature of 375° C. under air and held for one hour at 375° C. to remove the binder. Thereafter, the air is replaced with argon and the body is heated at a ramp rate of 5° C./min up to a maximum temperature of 1500° C. The temperature is held for four hours at 1500° C., and cooling is conducted at a rate of 5° C./minute.

Figure 13A:
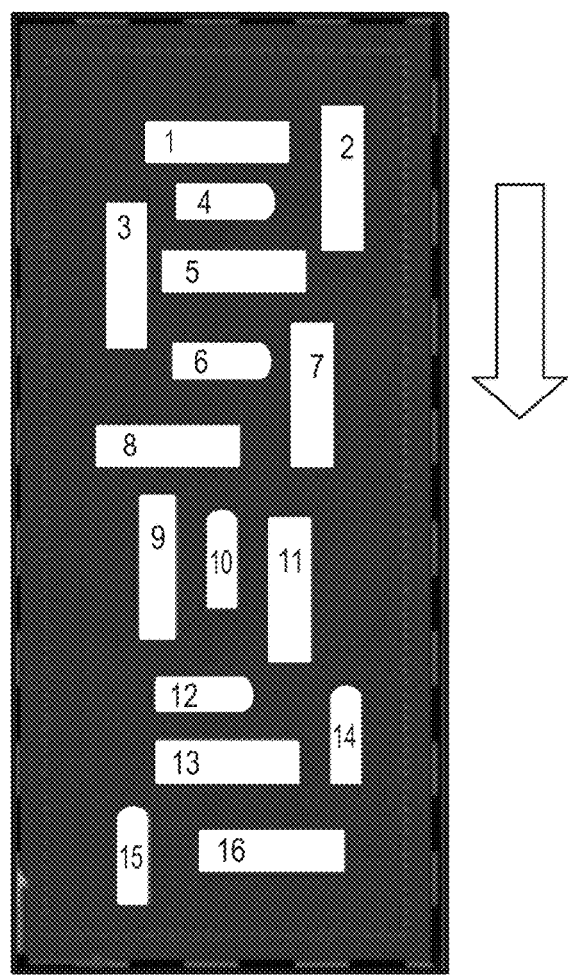
FIG. 13A includes a top-down view image of abrasive articles as arranged in a bed of powder material.
Figure 13B:
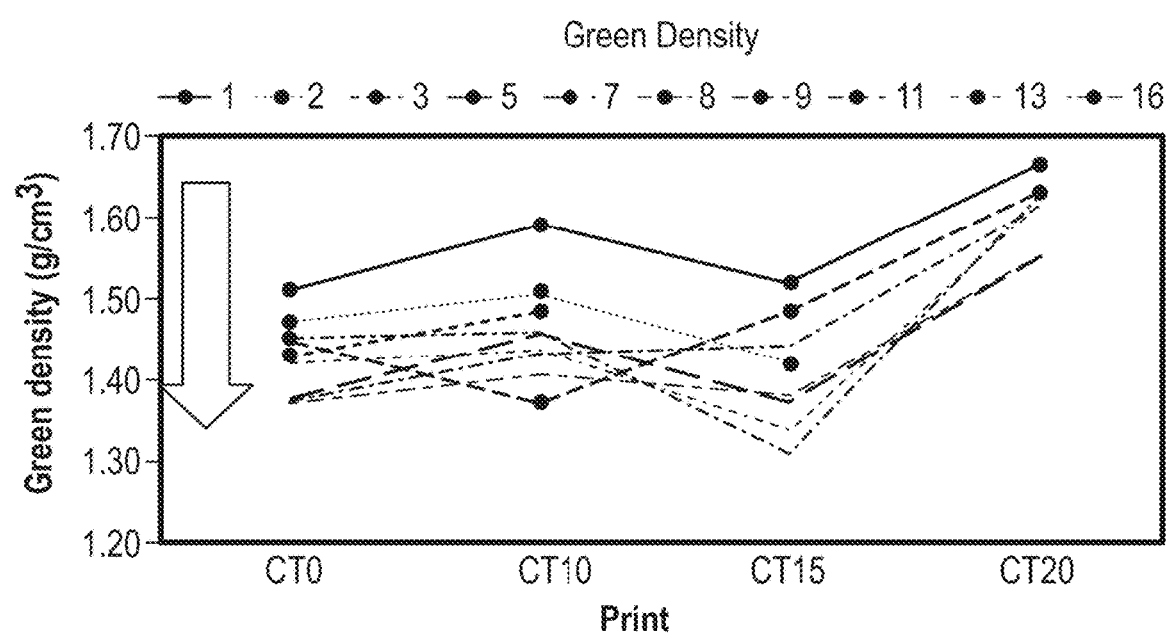
FIG. 13B includes a plot of green density versus print location for the samples of FIG. 13A.

FIG. 13A includes a top-down view image of abrasive articles as arranged in a bed of powder material. FIG. 13B includes a plot of green density versus print location for the samples of FIG. 13A for a number of different additive manufacturing processes. As indicated by the data, the green density can vary notably between samples within the same additive manufacturing operation as well as between abrasive samples from different batches made from different additive manufacturing processes.

Figure 14:
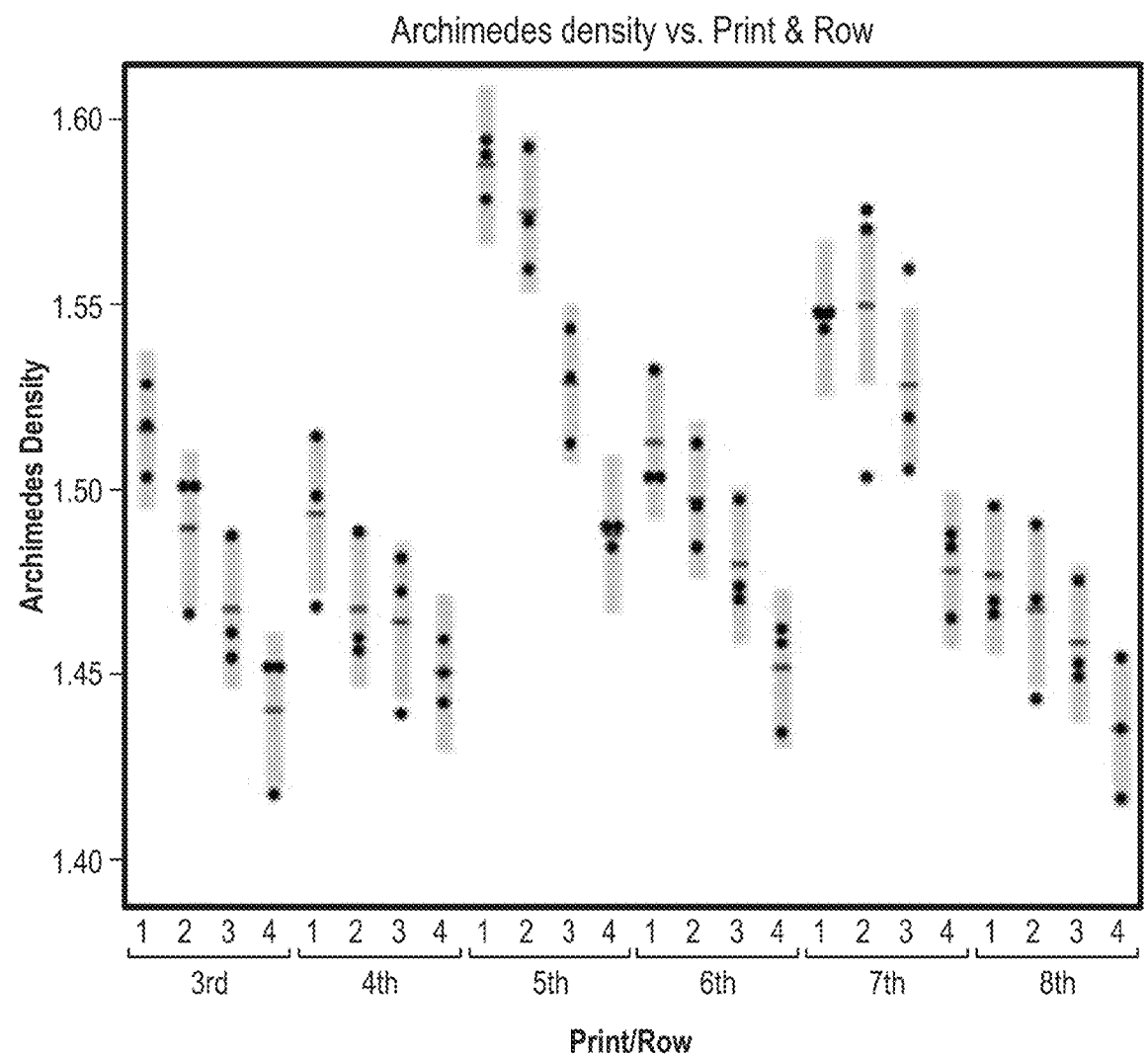
FIG. 14 includes a plot of density versus print/row for a number of different additive manufacturing processes.

FIG. 14 includes plot of density versus print/row for a number of different additive manufacturing processes as further evidence of the notable variation in the density between abrasive products of the same batch as well as the variation between batches. It is believed that the abrasive articles of the present invention are of superior quality to those of the comparative samples. Certain parameters related to the abrasive articles of the present invention including volumetric form factor, volumetric form factor variation, density variation-L, density variation-W, density variation-T, dimensional variation-L, dimensional variation-W, dimensional variation-T, hardness variation-L, hardness variation-W, hardness variation-T, MOR variation-L, MOR variation-W, MOR variation-T, MOE variation-L, MOE variation-W, and MOE variation-T are in the process of being measured and compared to those parameters of the comparative samples.

According to the embodiments herein, abrasive articles may be created that have a controlled difference in surface features (e.g., Sdr, etc.) between two surfaces, notably two different exterior surfaces of the abrasive articles. Research into the process variables that may be used to control difference in such surface features are complex and not predictable. Certain surface features, such as the difference in Sdr are understood to be related to build direction and orientation of the body during the forming process. Accordingly, the empirical data generated demonstrates that it is possible to engineer abrasive articles having selective surface features on various surfaces by controlling the build direction and build parameters. Such surface features are thought to be technically beneficial with respect to improved abrasive performance and/or anchoring of the abrasive articles with a bond system or other component for formation of a fixed abrasive article.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method for forming a batch of abrasive articles via additive manufacturing from a powder bed of raw material, wherein the method comprises controlling at least one of a batch density variation and/or a batch volumetric form factor of the batch of abrasive articles based on the position and/or orientation of at least two of the abrasive articles relative to each other.

2. The method of claim 1, wherein the method includes:
evaluating placement characteristic data of one or more abrasive articles in the batch of abrasive articles;
selecting a first position for a first abrasive article in a build box and selecting a second position for a second abrasive article in the build box, wherein the first position and second position are based on evaluating the placement characteristic data.

3. The method of claim 2, wherein evaluating placement characteristic data includes accessing placement characteristic data related to at least one of a two-dimensional shape of the first abrasive article, a three-dimensional shape of the first abrasive article, a volume of the first abrasive article, an intended density of the first abrasive article, historical data, batch size, or any combination thereof.

4. The method of claim 3, wherein the historical data includes information of prior additive manufacturing operations including data related to the features and properties of the abrasive articles of the prior additive manufacturing operations.

5. The method of claim 2, wherein selecting the first and second positions in the build box is part of a process for building a packing model for the batch of abrasive articles.

6. The method of claim 2, further comprising:
wherein evaluating the placement characteristic data includes accessing placement characteristic data for two or more abrasive articles to be formed;
comparing the placement characteristic data to historical data; and
creating a packing model for the batch of abrasive articles based on the placement characteristic data and historical data.

7. The method of claim 2, wherein the first position includes at least a position in an X-Y plane defined by a length and a width of the build box, at least a position in an X-Z plane defined by a length and a depth of the build box and at least a position in a Y-Z plane defined by a width and a depth of the build box.

8. The method of claim 2, wherein the second position includes at least a position in an X-Y plane defined by a length and a width of the build box, at least a position in an X-Z plane defined by a length and a depth of the build box, and at least a position in a Y-Z plane defined by a width and a depth of the build box.

9. The method of claim 2, wherein the first position and the second position can each have at least one of an X-Y spacing distance, an X-Z spacing distance, a Y-Z spacing distance, or a combination thereof with respect to each other.

10. The method of claim 2, wherein the first abrasive article at the first position and the second abrasive article at the second position can each have an X-Y plane rotational orientation, an X-Z plane rotational orientation, a Y-Z plane rotational orientation.

11. The method of claim 6, wherein the method further includes controlling at least one of a batch density variation and/or a batch volumetric form factor of the batch of abrasive articles based on the relative position and/or orientation of at least two of the abrasive articles relative to one or more walls of the build box.

12. The method of claim 11, wherein the first position further includes an X-Y wall spacing distance, an X-Z wall spacing distance, a Y-Z wall spacing distance, or a combination thereof.

13. The method of claim 1, further comprising using at least 10% of the total volume of powder material in a build box to form a batch of abrasive articles while minimizing at least one of a batch density variation and/or a batch volumetric form factor of the batch of abrasive articles.

14. The method of claim 1, wherein the batch density variation is not greater than 20% of an average density value of the batch.

15. The method of claim 1, wherein the batch volumetric form factor (batch Vff) is not greater than 0.30.

16. The method of claim 15, wherein the batch Vff can be at least 0.00001.

17. The method of claim 1, further comprising forming a green body abrasive article comprising the precursor bond material and abrasive particles, wherein forming is conducted by:
creating one or more layers of the powder material;
selectively binding portions of the one or more layers with a binder material; and
converting the binder material to at least partially solidify the binder material and bind portions of powder material from the one or more layers.

18. The method of claim 17, further comprising moving a compaction object over the one or more layers of powder material to apply a force sufficient to compact the layer to a compacted layer thickness that is less than the thickness of the layer prior to compaction.

19. The method of claim 18, further comprising controlling at least one of:
a) a force applied by a compaction object to the layer or a plurality of layers of powder;
b) a traverse speed of a compaction object;
c) average thickness of the layer prior to compaction;
a particle size distribution of the powder;
number of previously formed layers underlying the layer of powder;
the number of compacted layers underlying the layer of powder;
the density of any layers underlying the layer of powder;
the amount of binder in any layers underlying the layer of powder;
the relative dimensions of the layer relative to one or more layers underlying the layer;
and any combination of a)-i).

20. The method of claim 19, further comprising selecting the placement and orientation of a first position of a first abrasive article and a second position of a second abrasive article based at least in part on any one or more elements of a)-i).

* * * * *